R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 1.
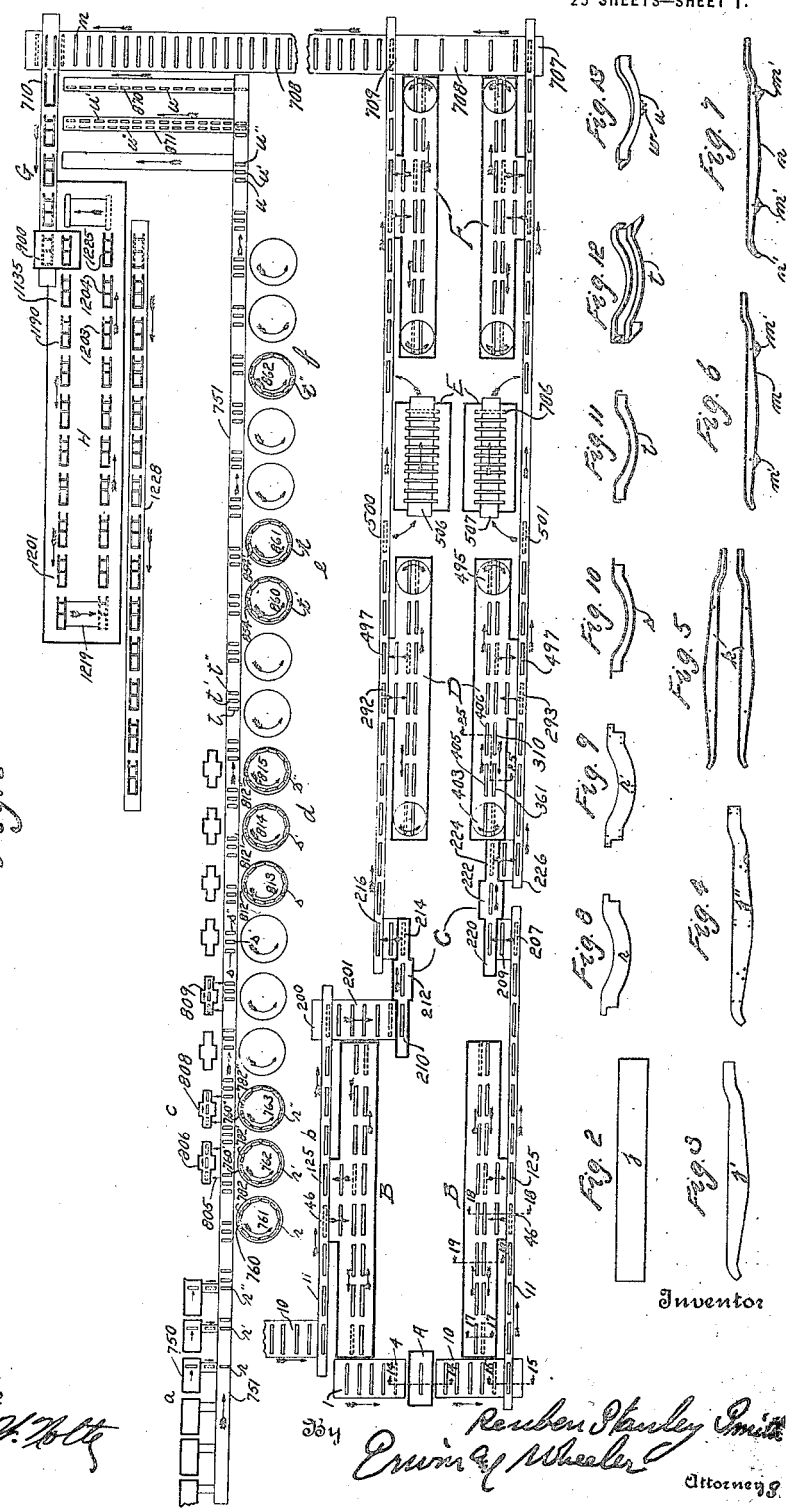

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 2.
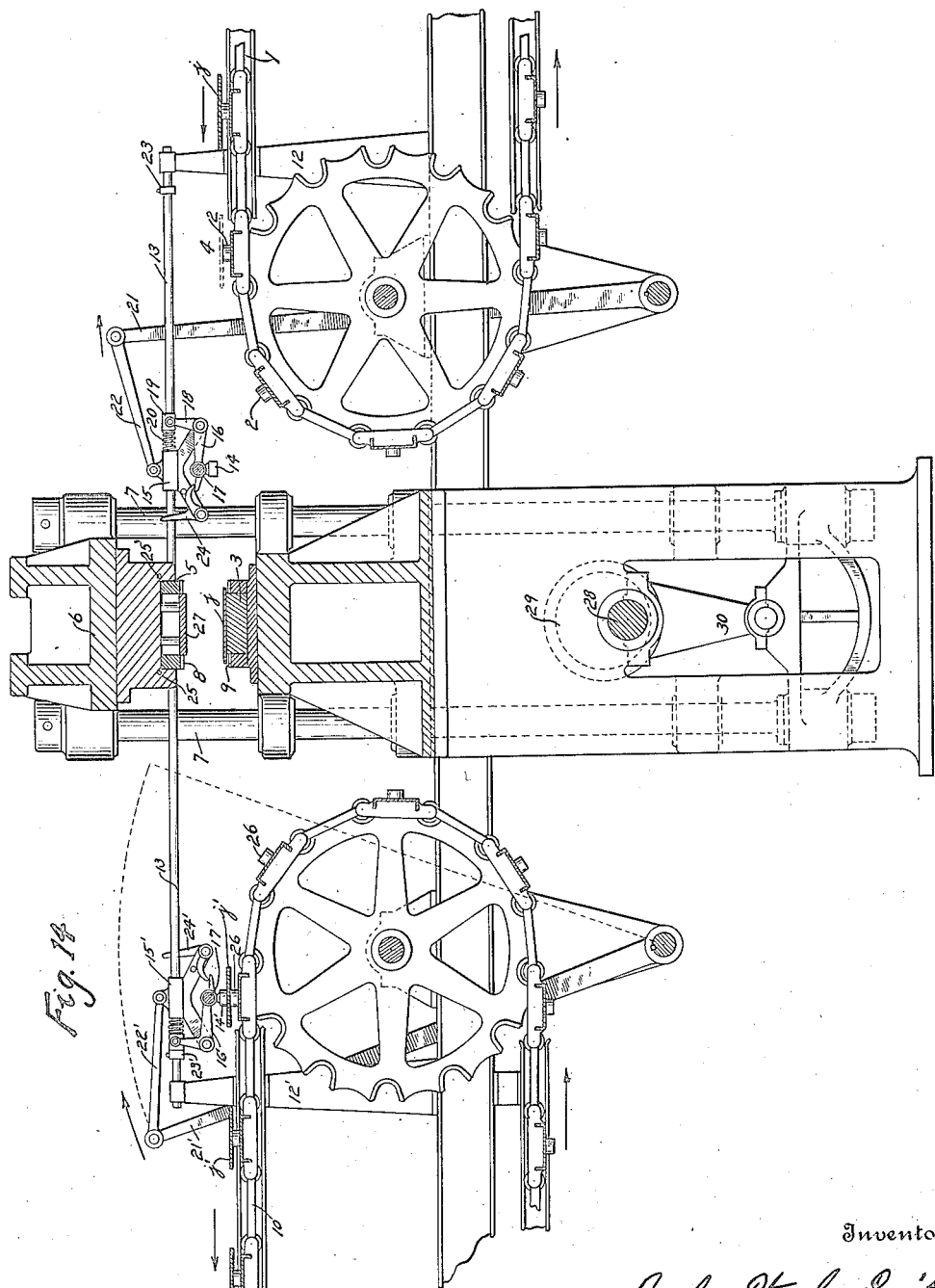

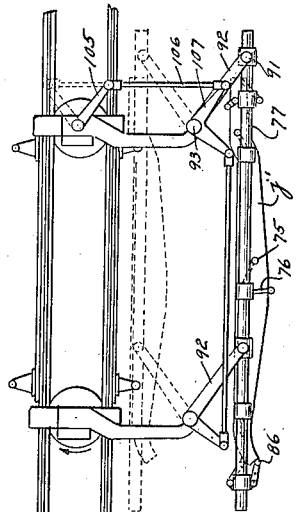

R. S. SMITH.
METHOD OF AND APPARATUS FOR FORMING AND ASSEMBLING METAL ELEMENTS.
APPLICATION FILED JAN. 21, 1918.

1,397,020.

Patented Nov. 15, 1921.
25 SHEETS—SHEET 4.

Witness
Arthur H. Riebe
Frederick W. Nolte

Inventor
Reuben Stanley Smith
By Erwin & Wheeler
Attorneys

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 5.
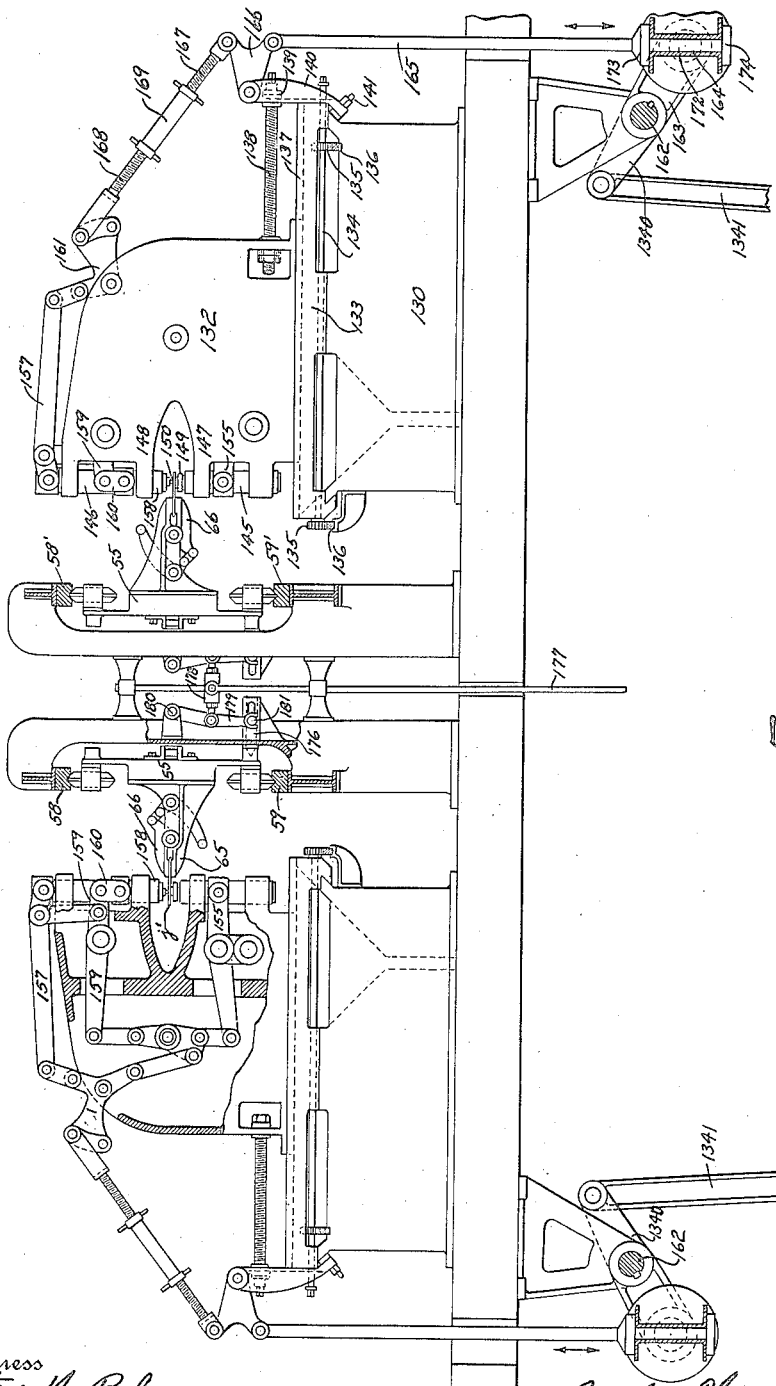

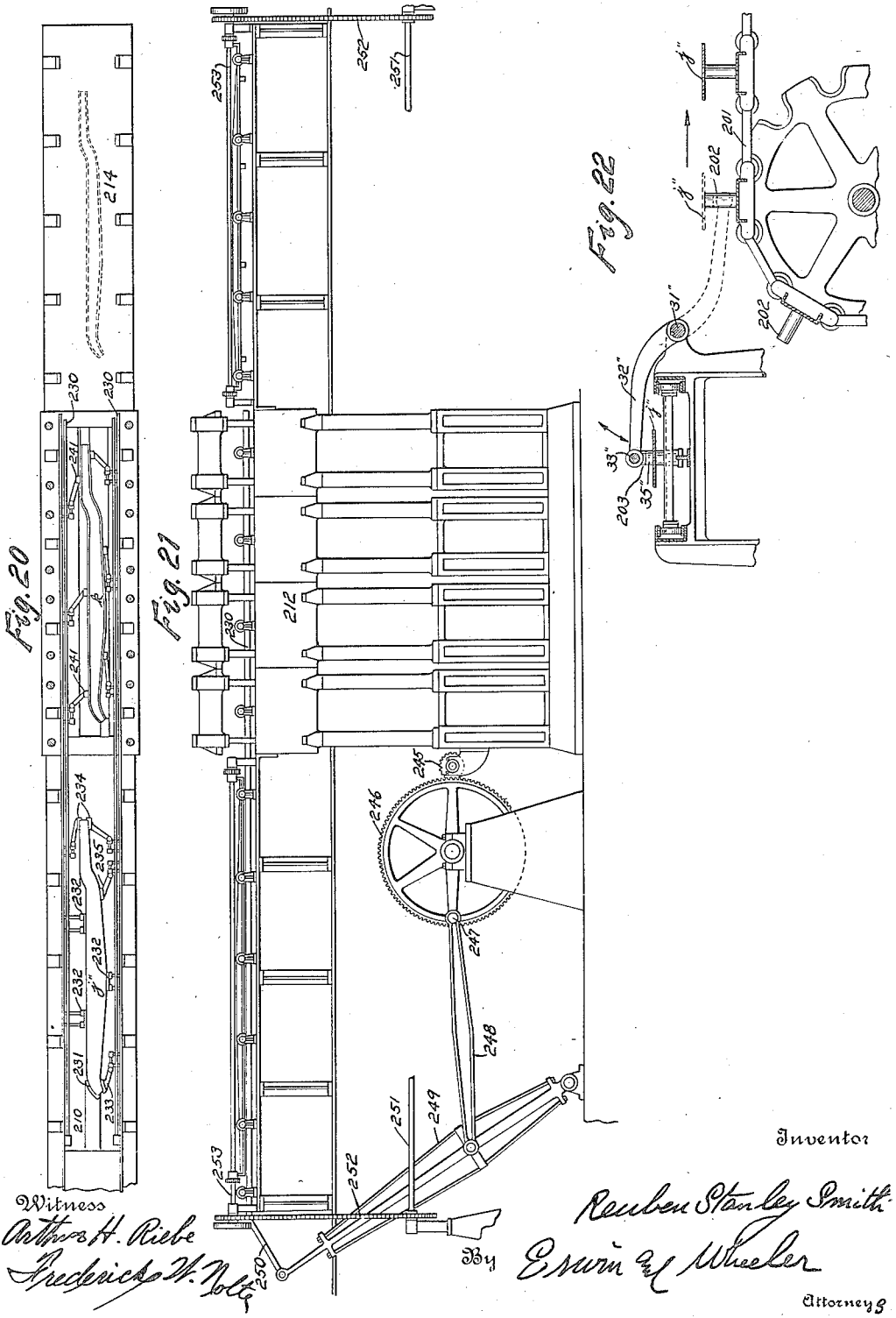

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 7.
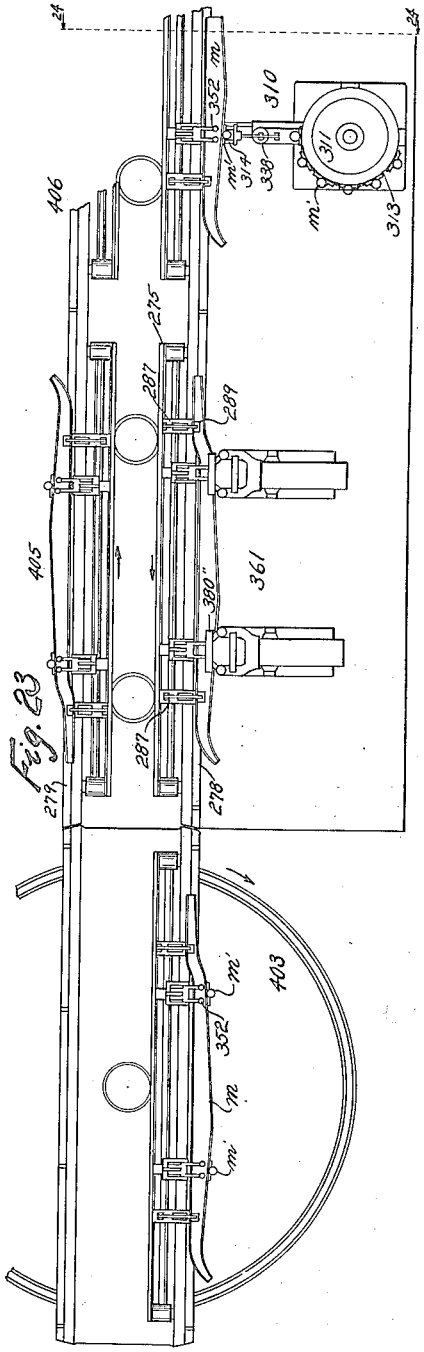
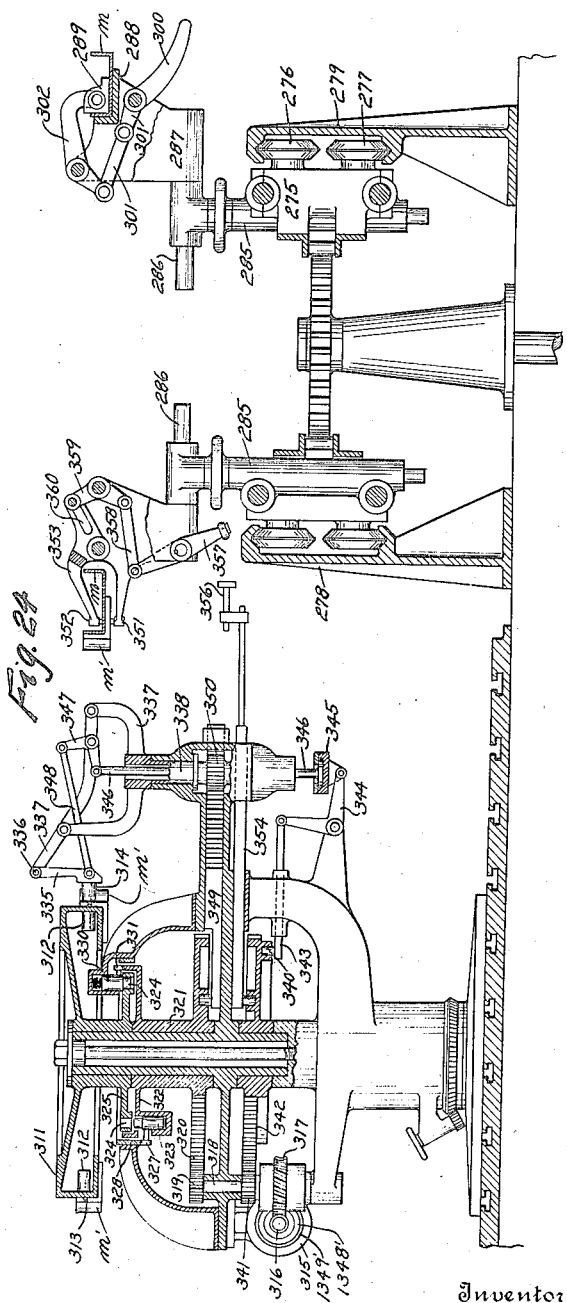
Witness
Arthur H. Riebe
Frederick V. Holte
Inventor
Reuben Stanley Smith
By Erwin & Wheeler
Attorneys

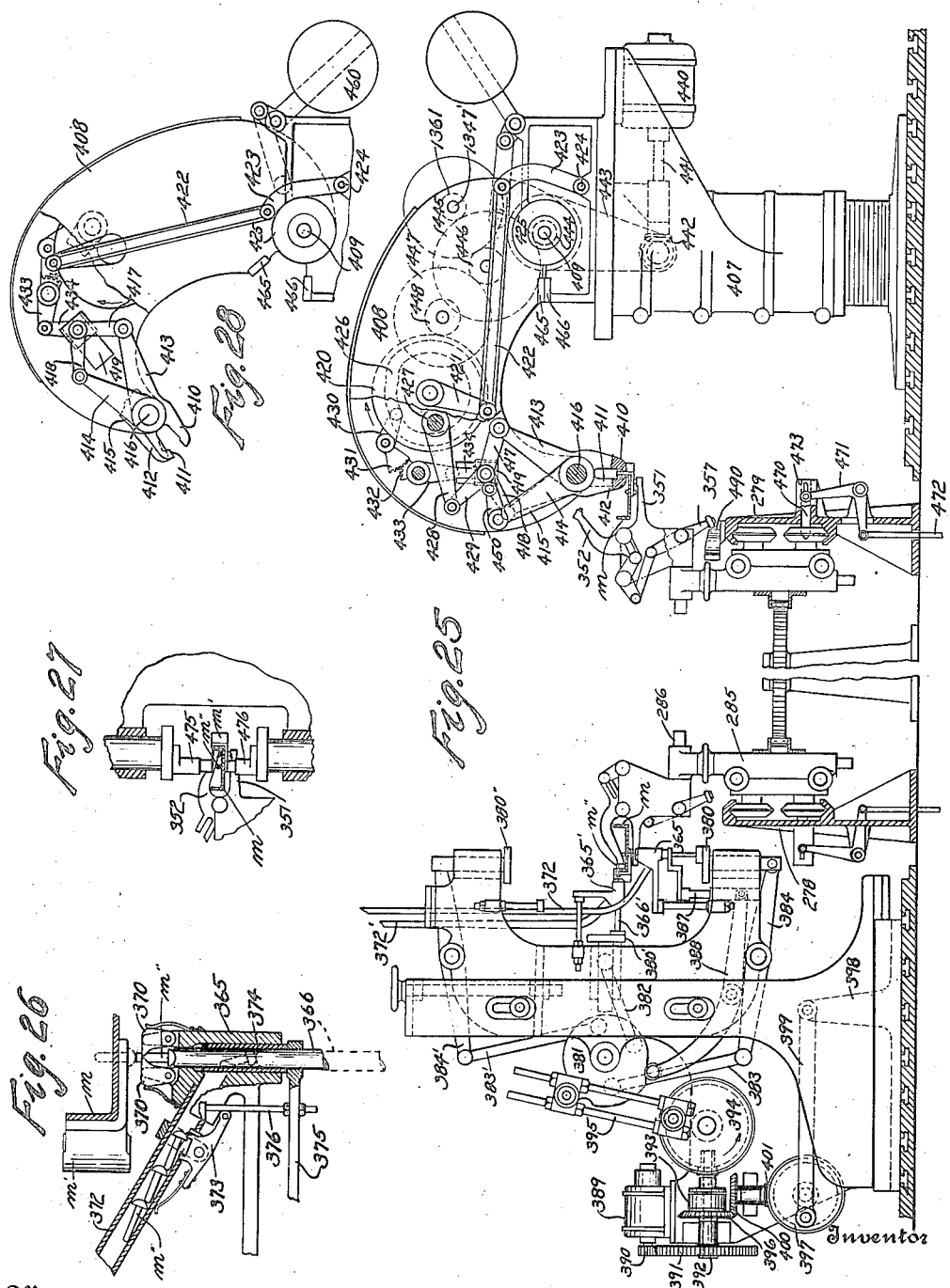

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 9.
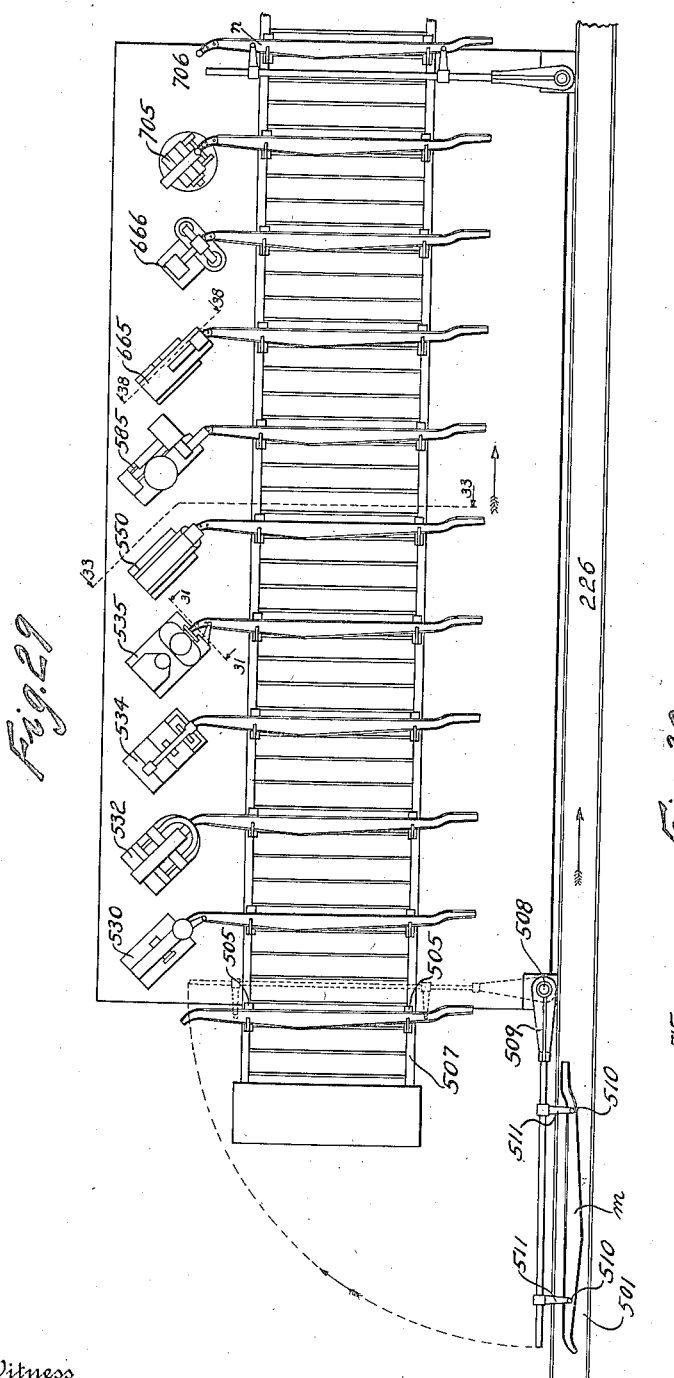
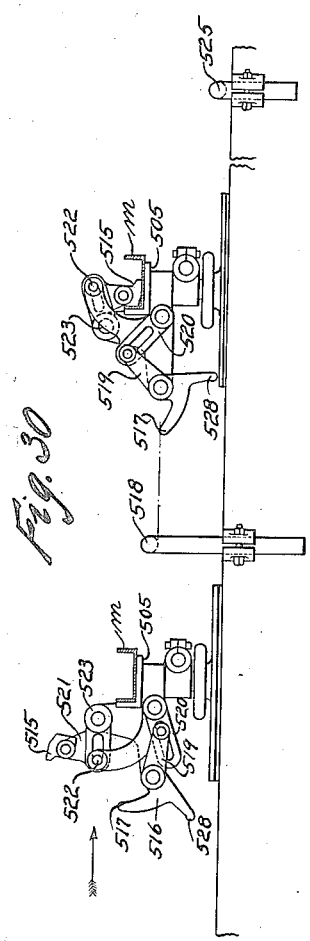

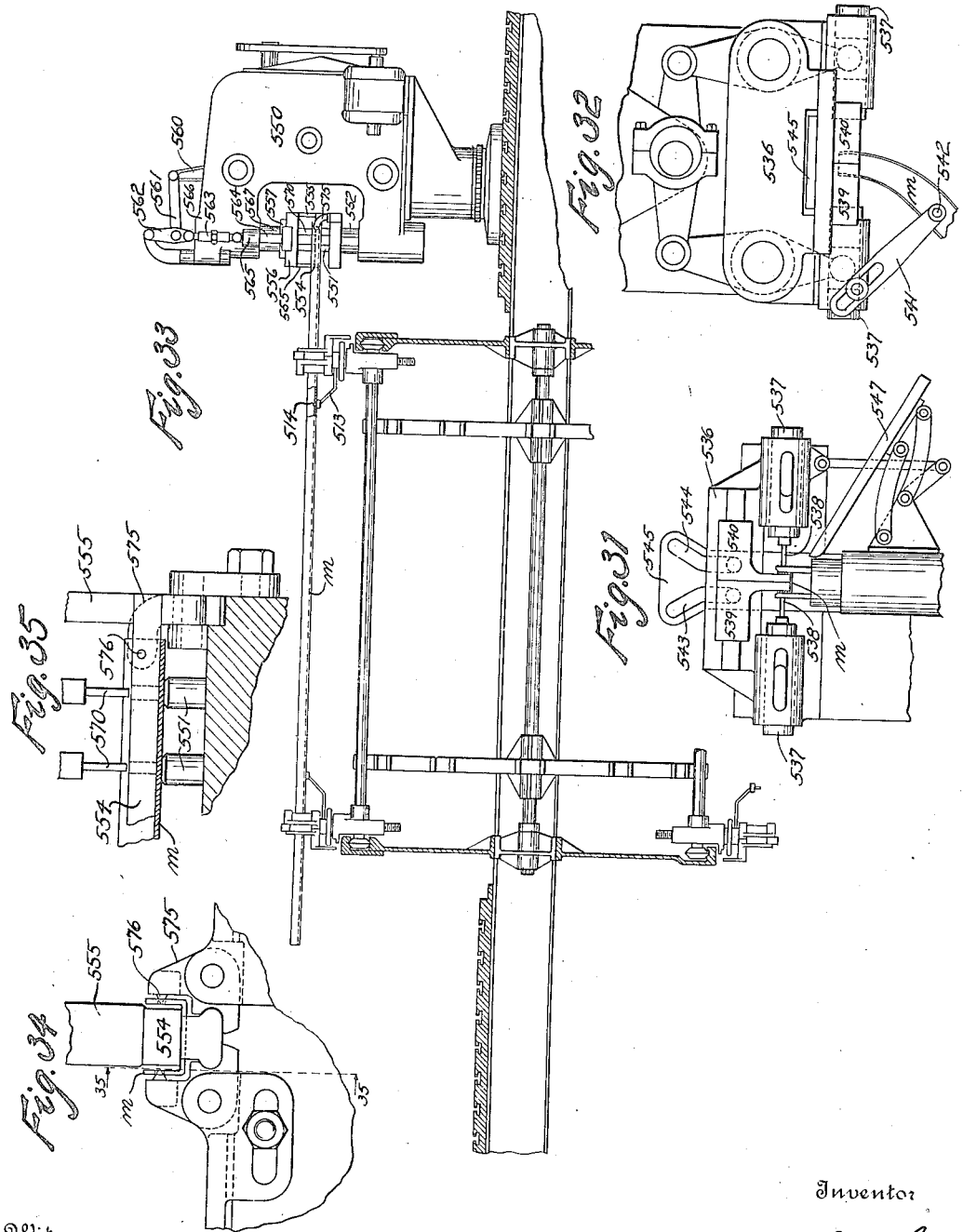

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 11.
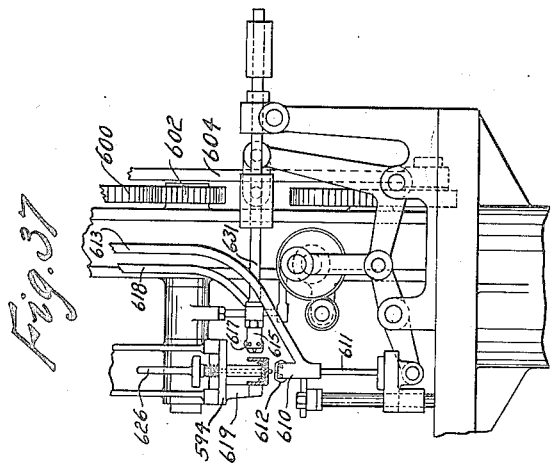
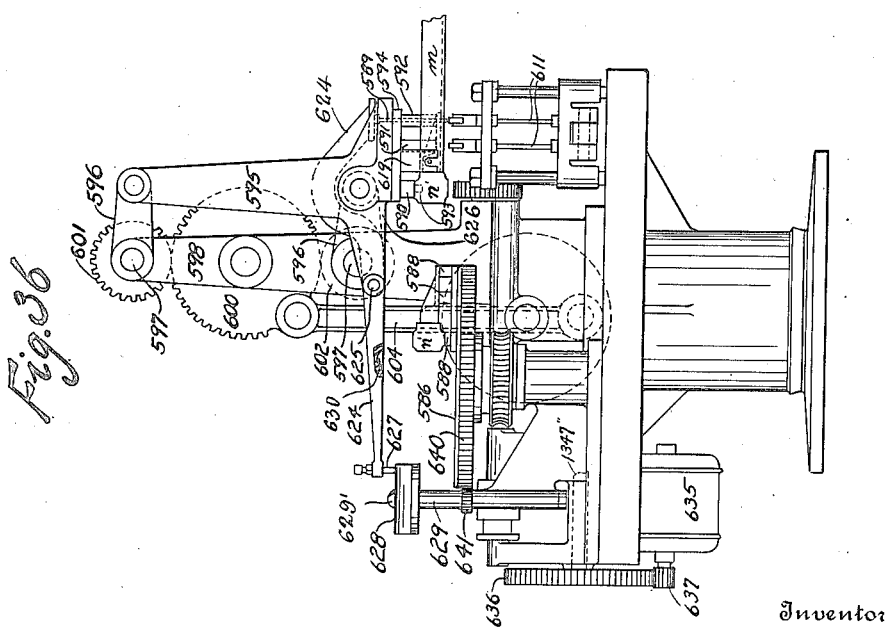

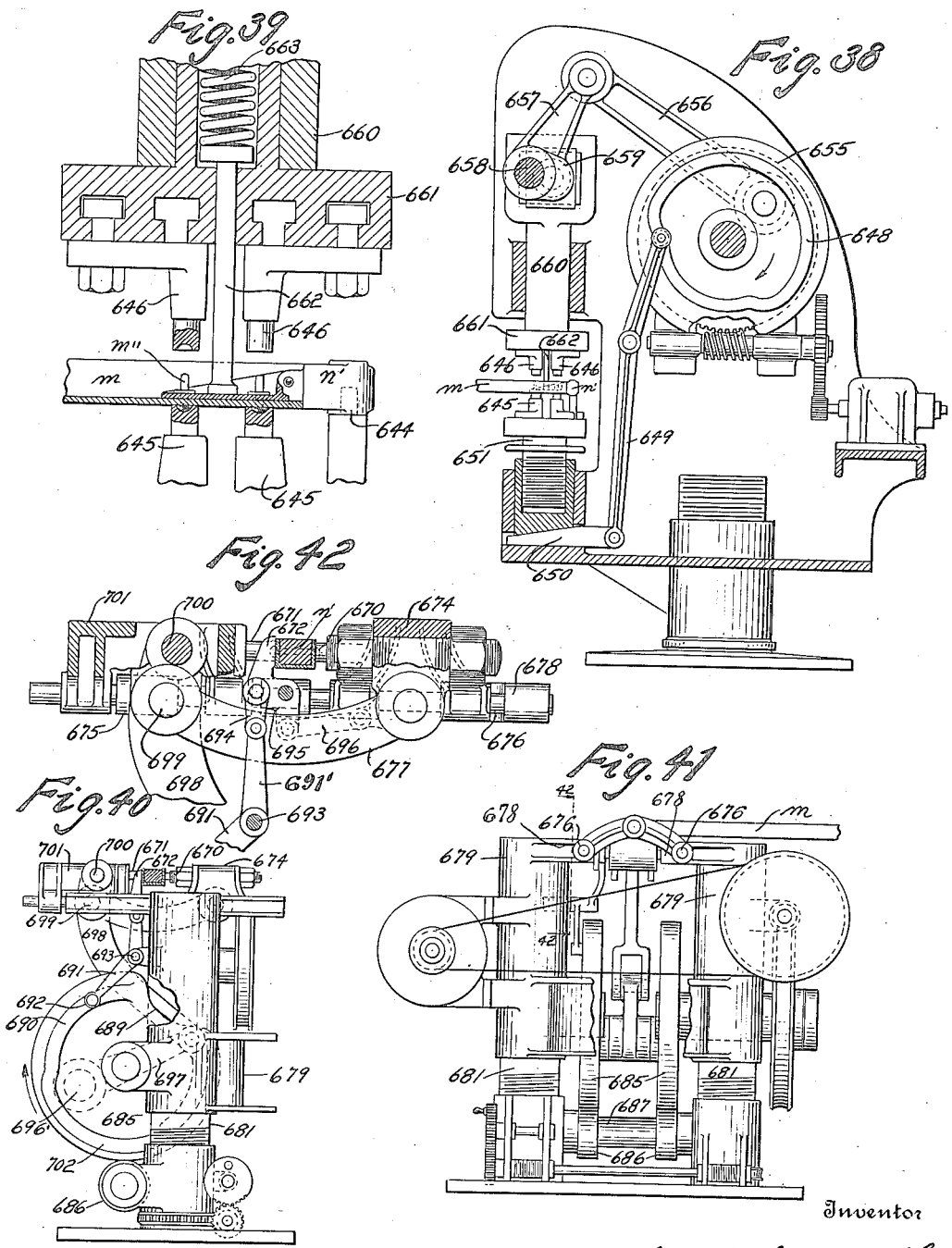

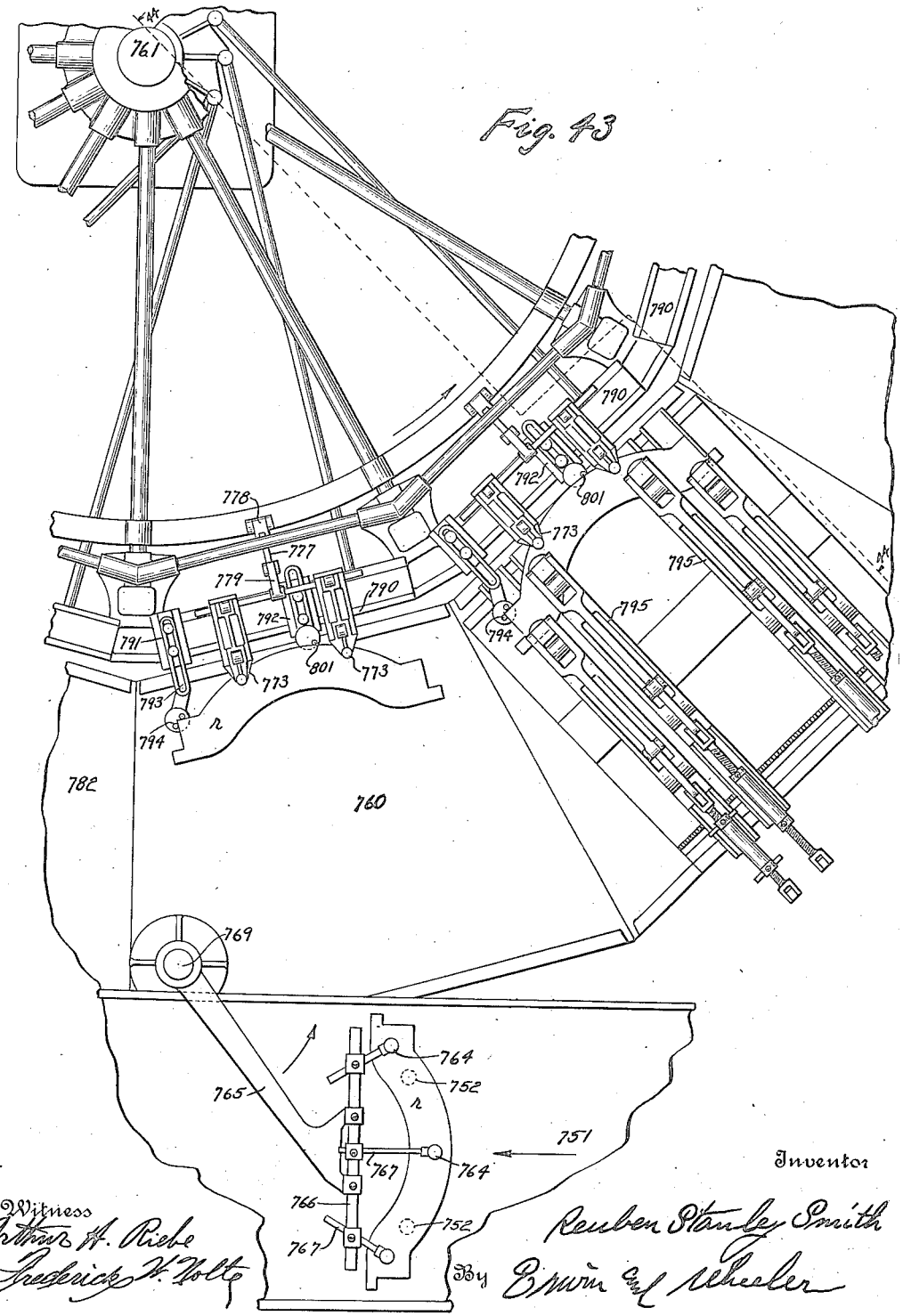

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 14.
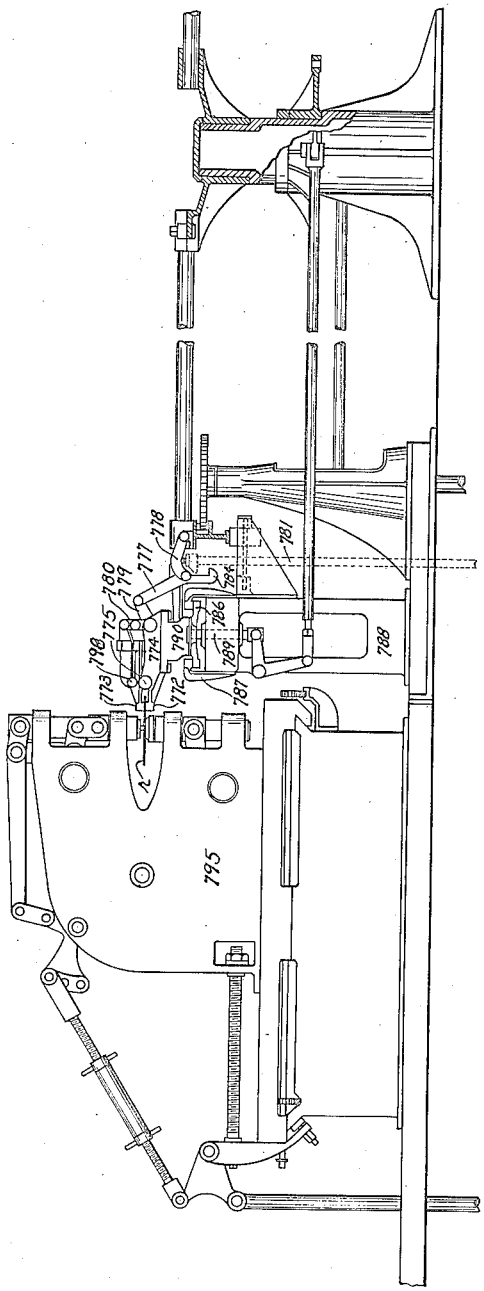
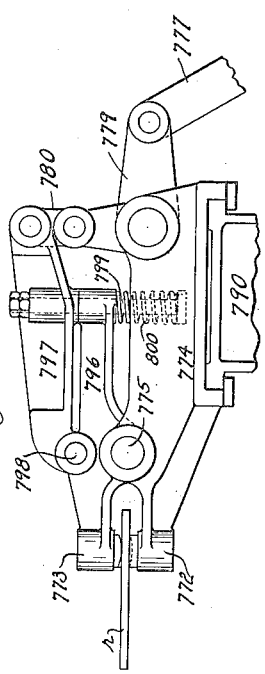

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 15.
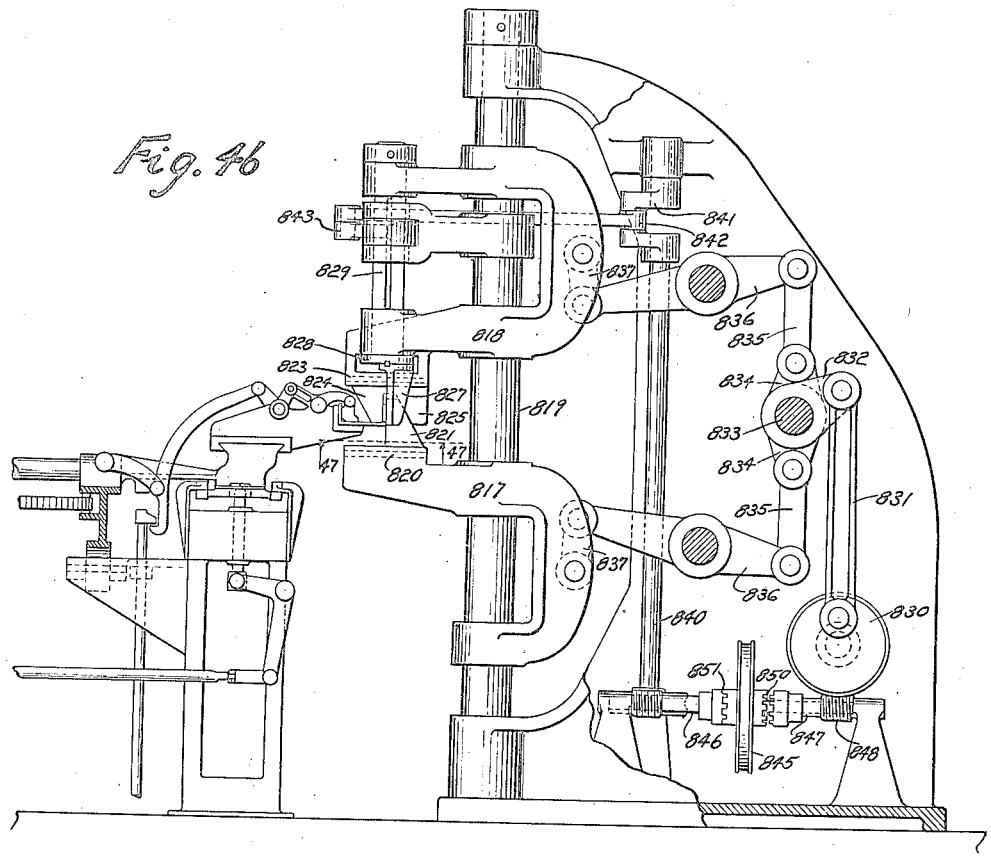
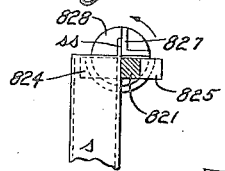
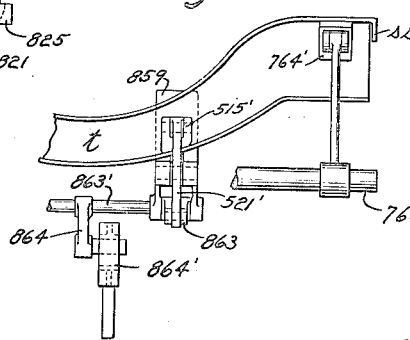
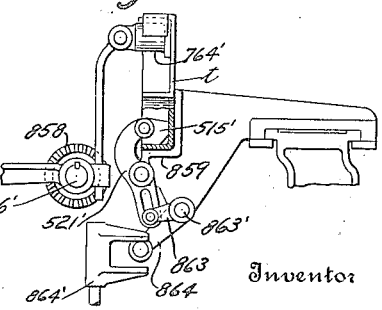

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 16.
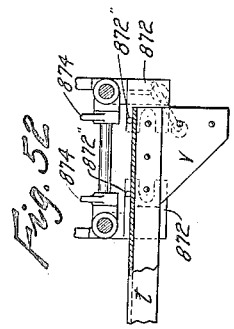
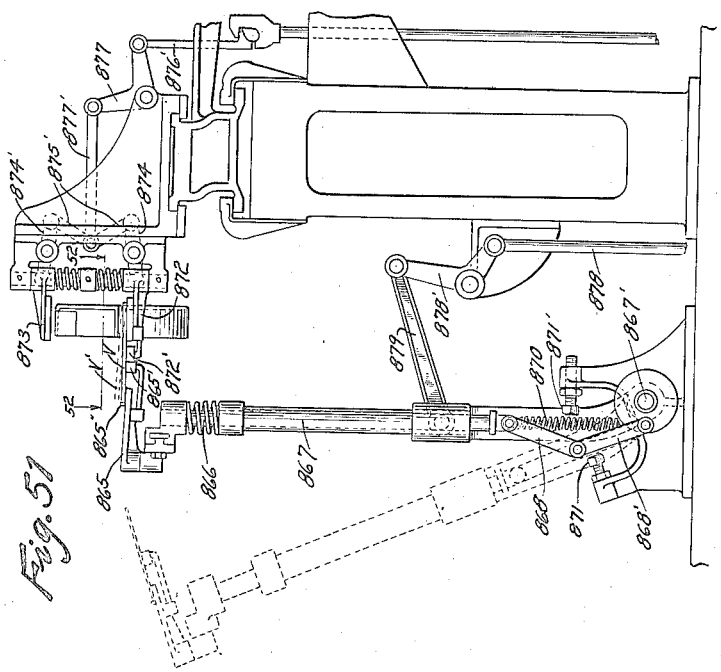
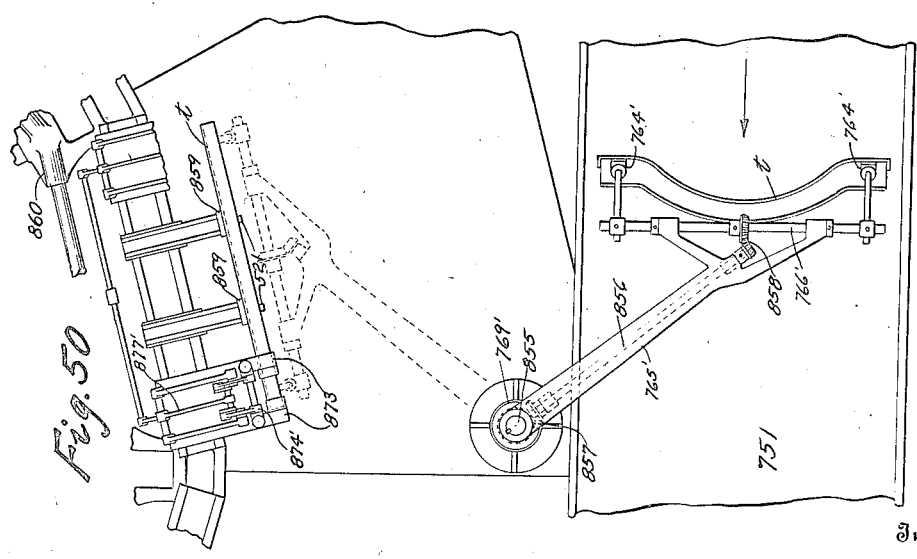

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 17.
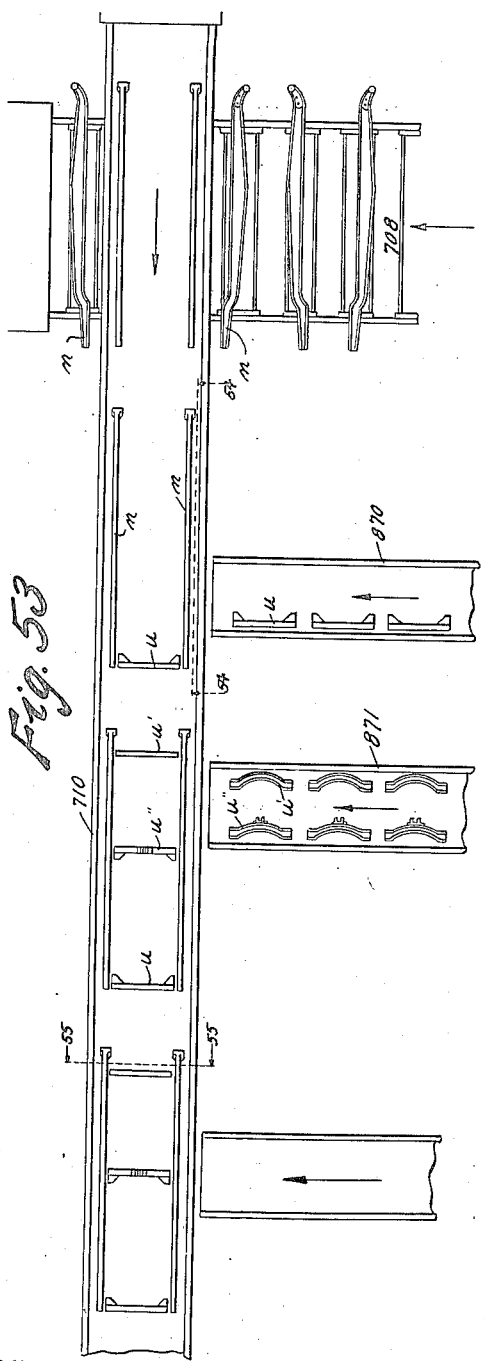
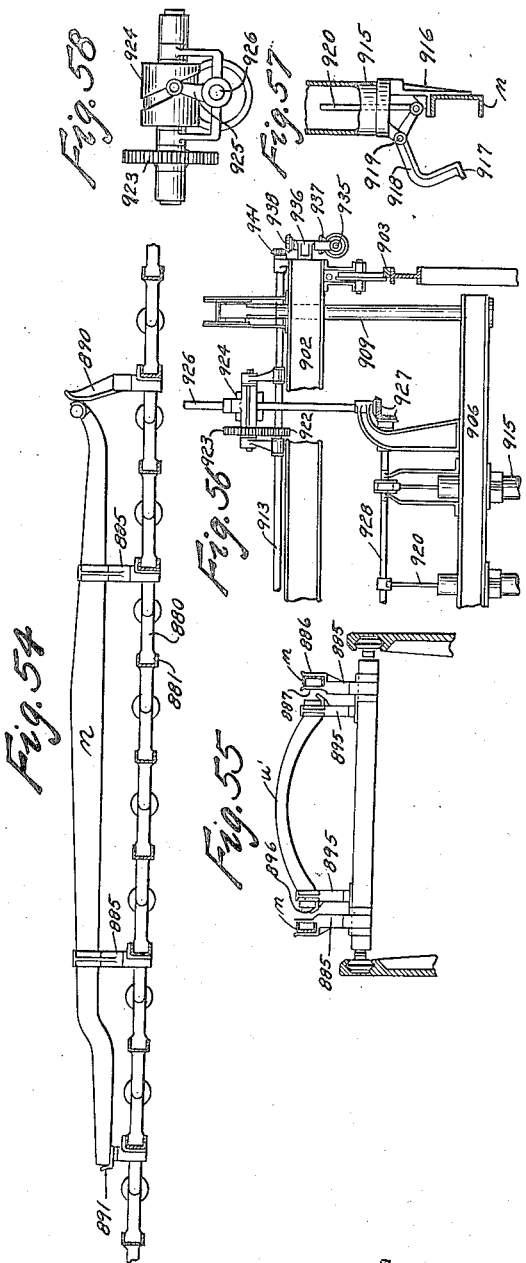

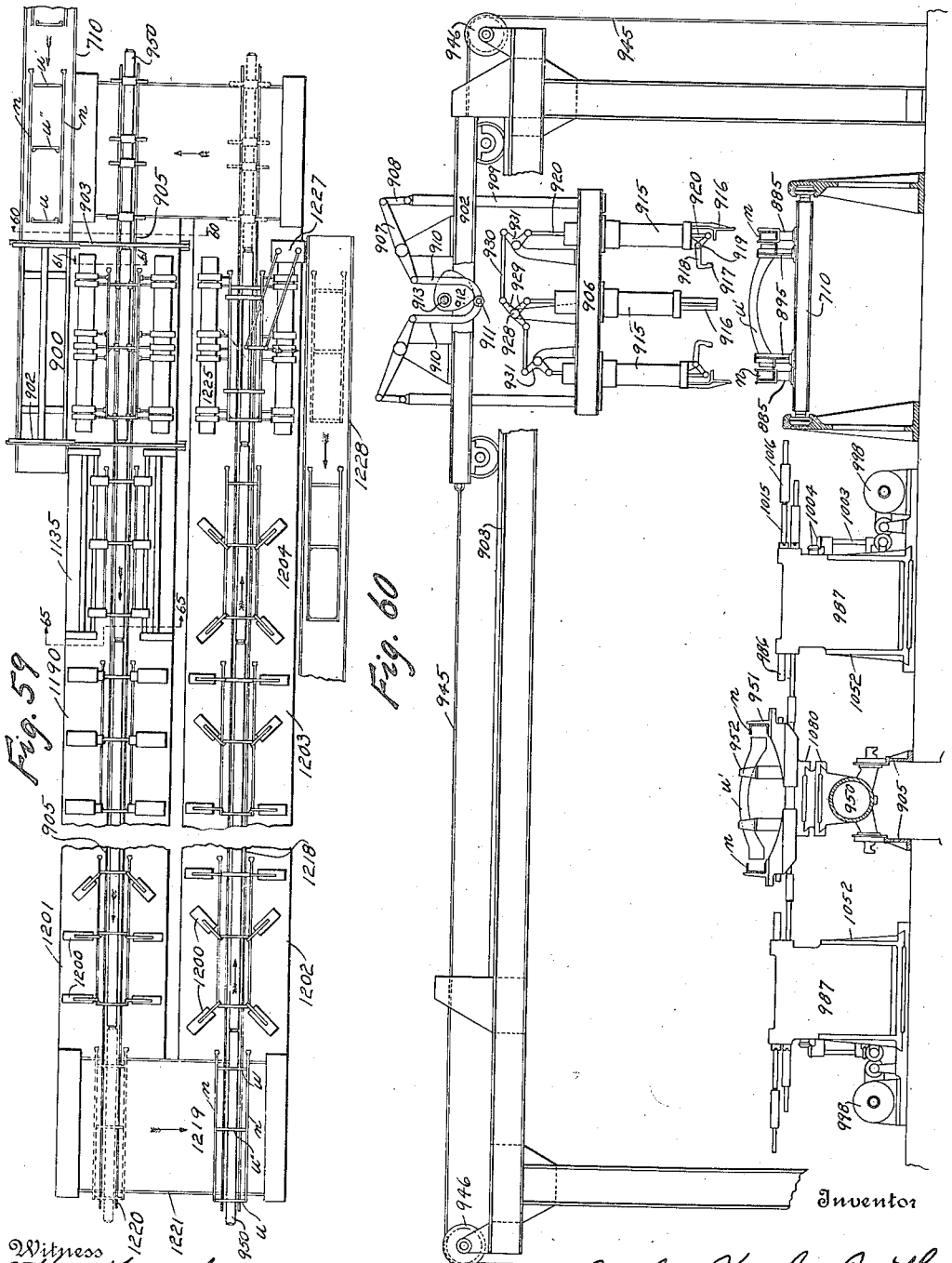

R. S. SMITH.
METHOD OF AND APPARATUS FOR FORMING AND ASSEMBLING METAL ELEMENTS.
APPLICATION FILED JAN. 21, 1918.
1,397,020.                        Patented Nov. 15, 1921.
25 SHEETS—SHEET 19.
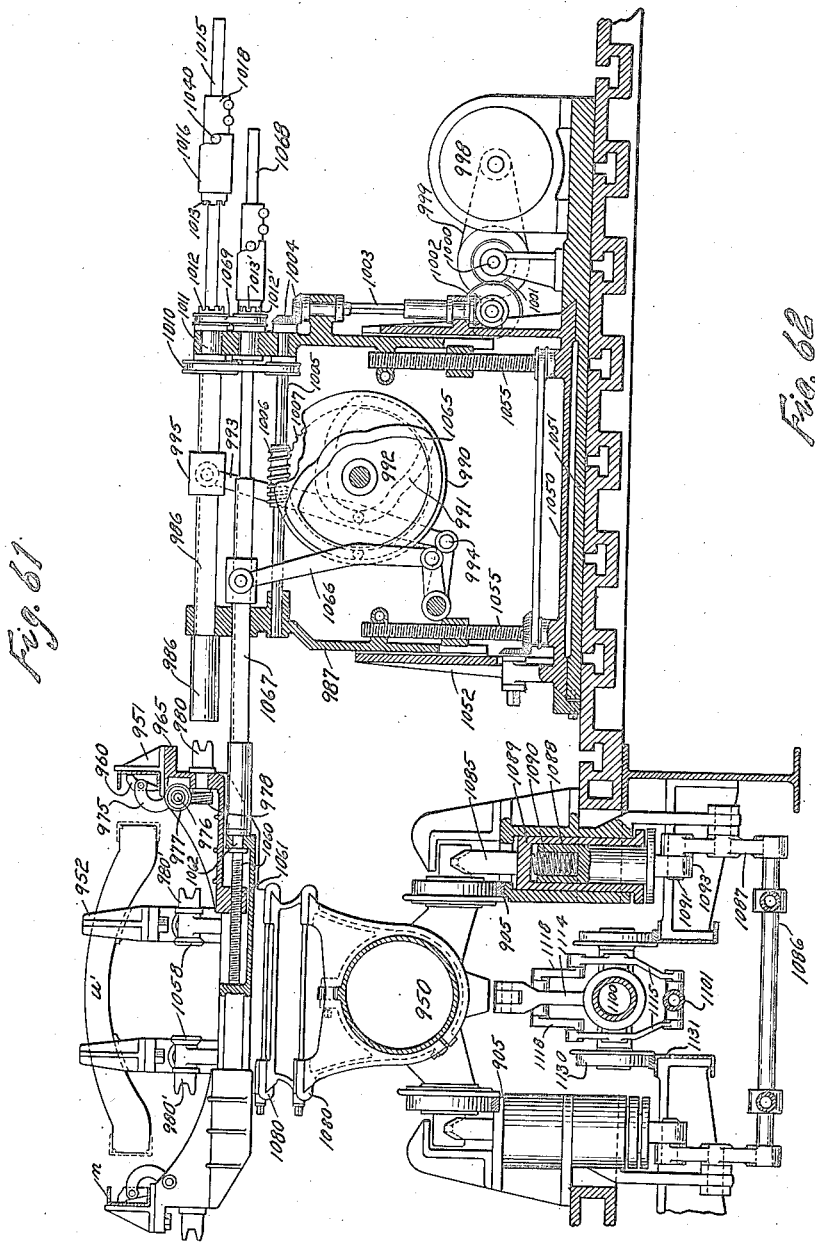
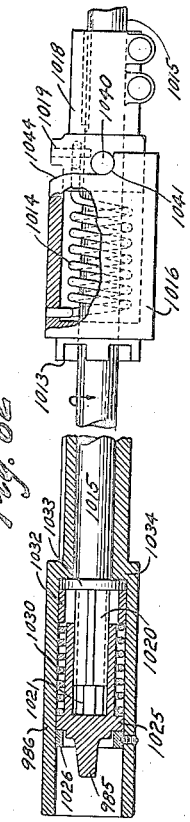

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 20.
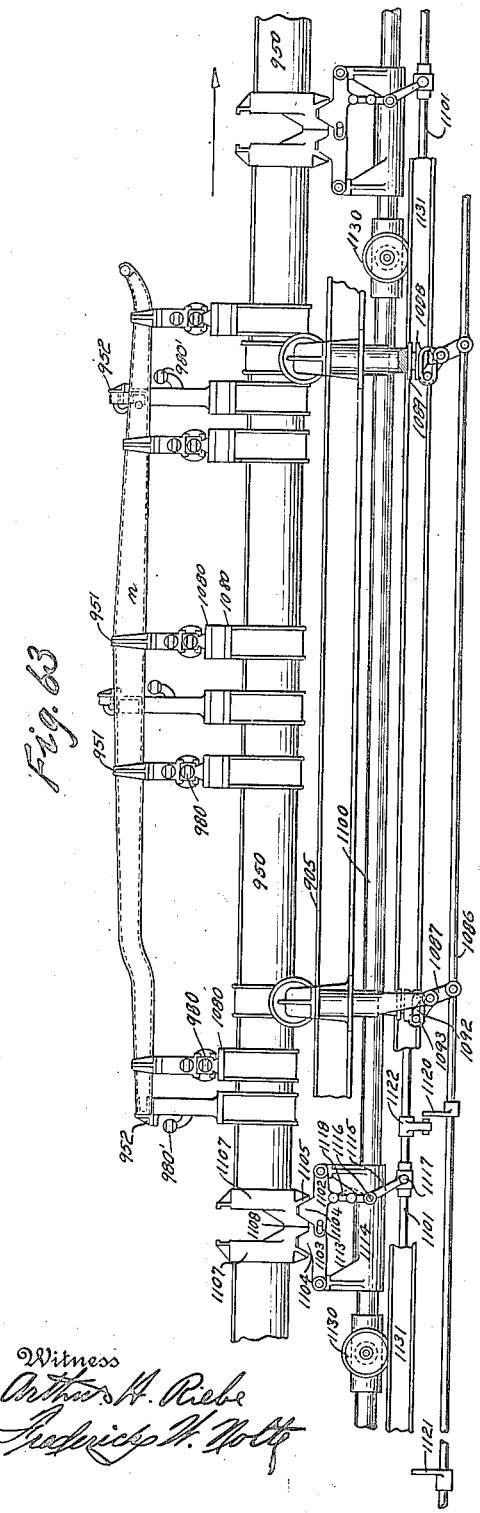
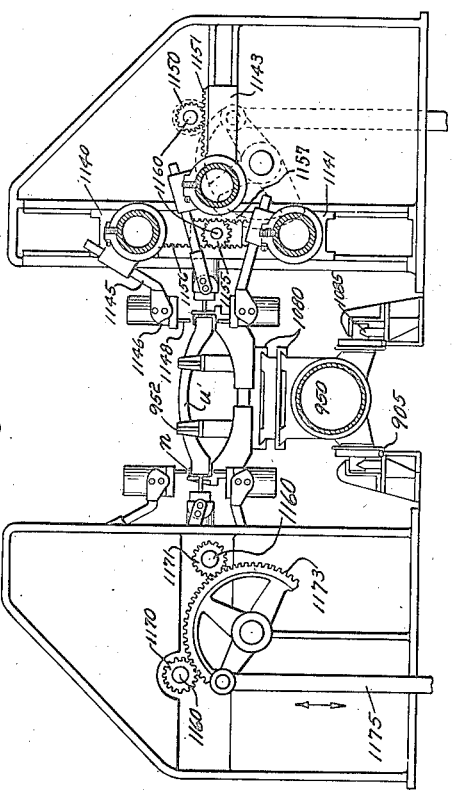
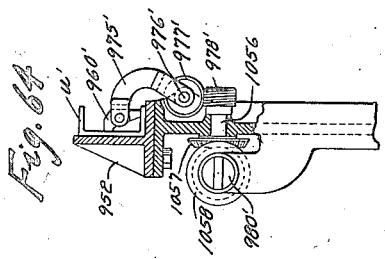

R. S. SMITH.
METHOD OF AND APPARATUS FOR FORMING AND ASSEMBLING METAL ELEMENTS.
APPLICATION FILED JAN. 21, 1918.

1,397,020.

Patented Nov. 15, 1921.

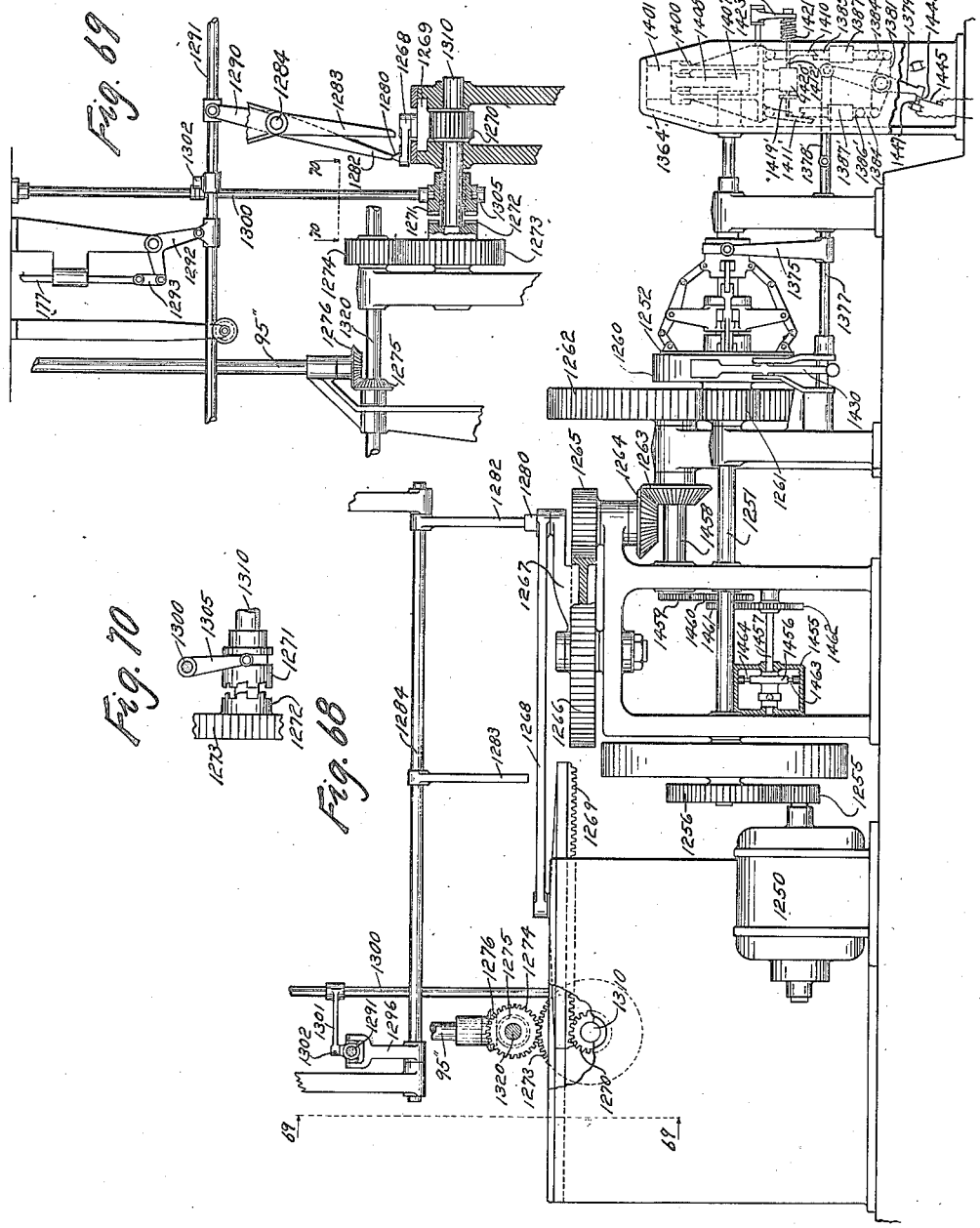

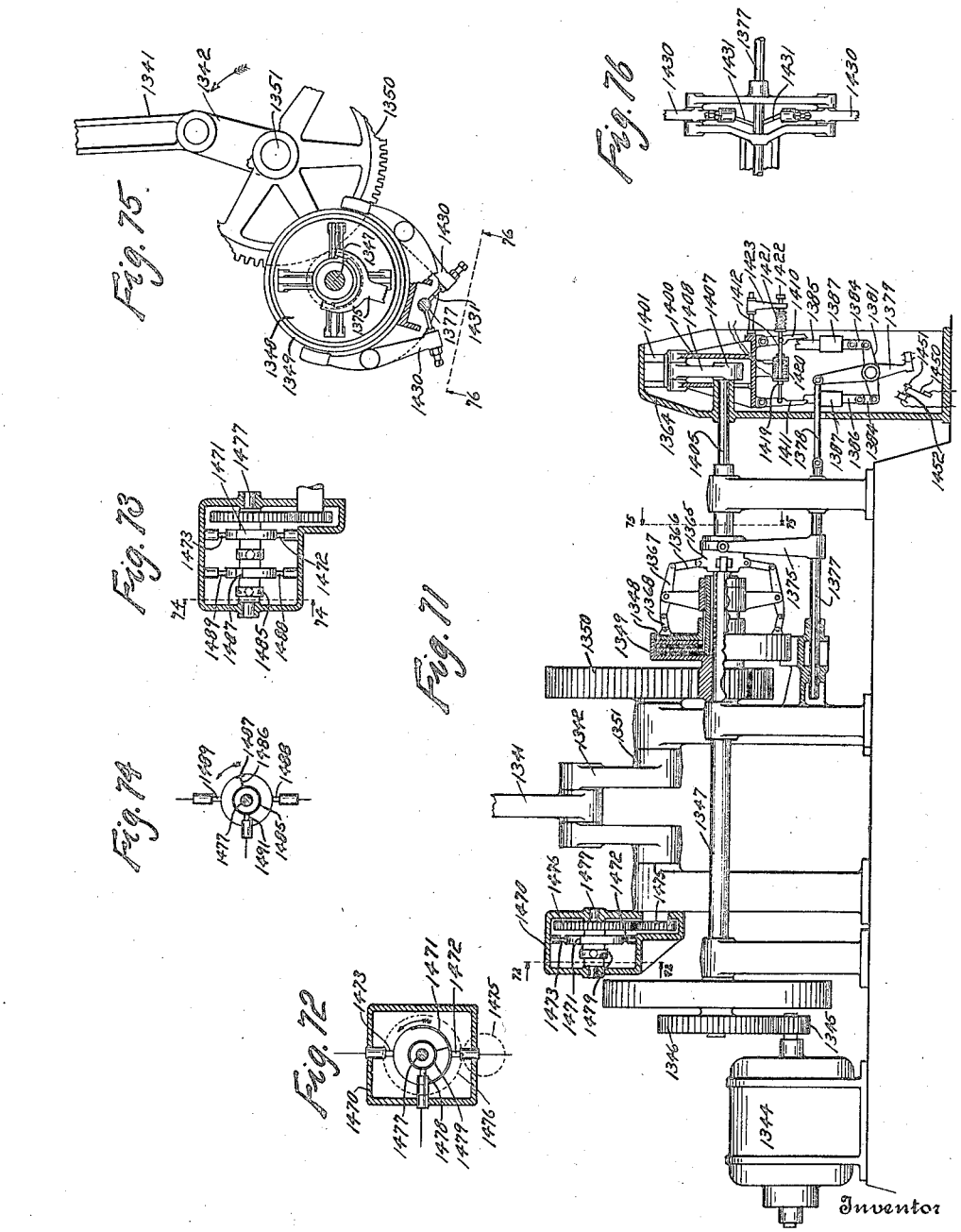

R. S. SMITH.
METHOD OF AND APPARATUS FOR FORMING AND ASSEMBLING METAL ELEMENTS.
APPLICATION FILED JAN. 21, 1918.
1,397,020.
Patented Nov. 15, 1921.
25 SHEETS—SHEET 24.
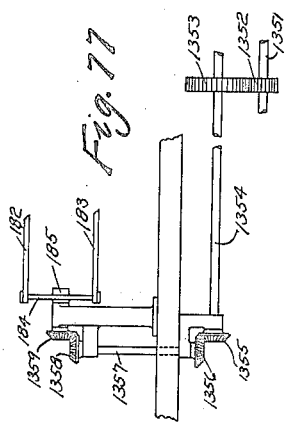
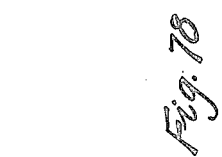
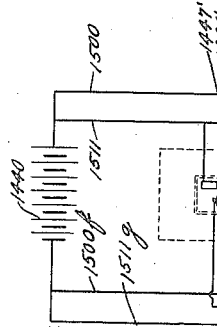
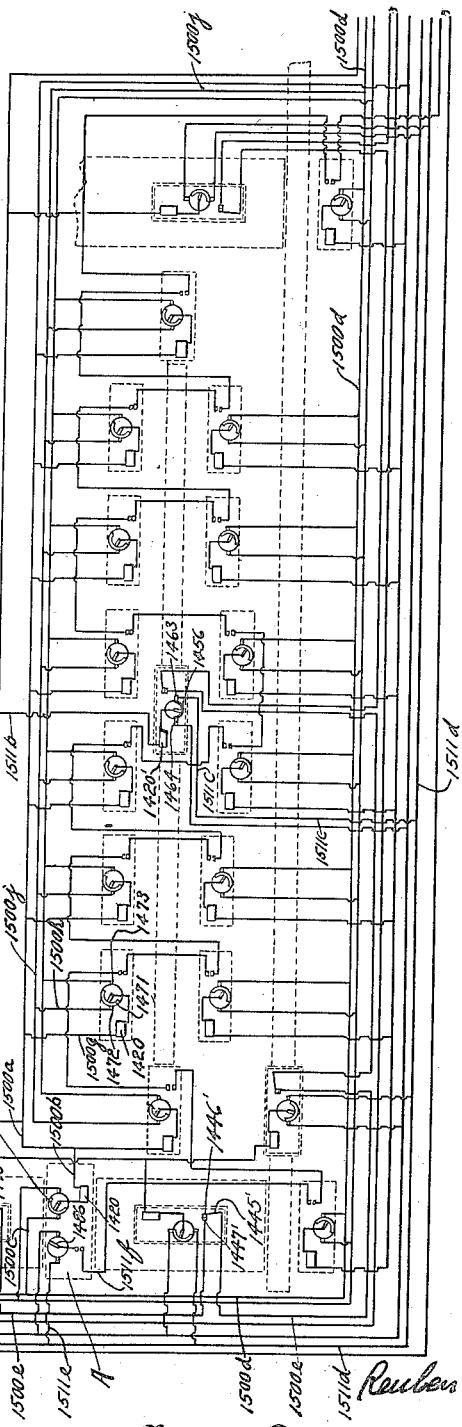

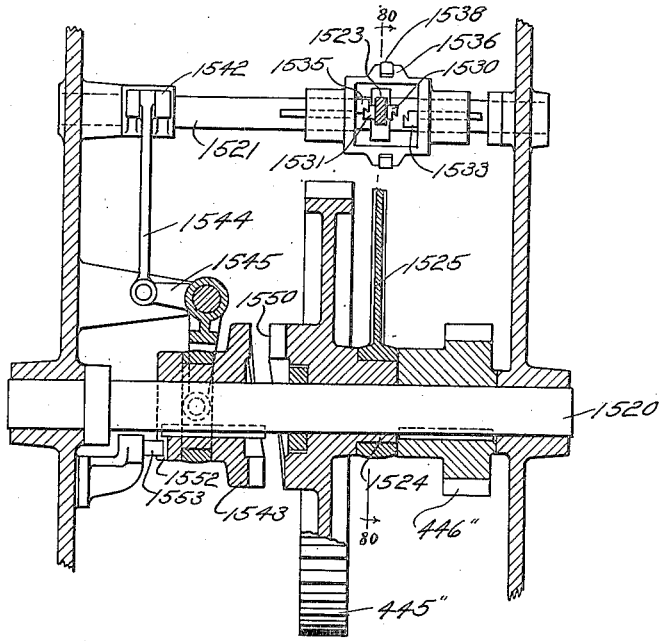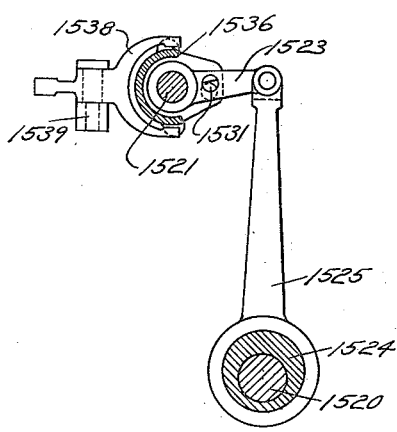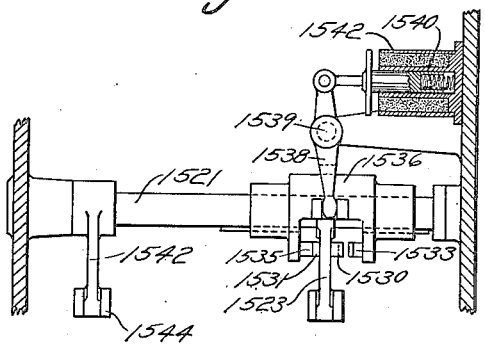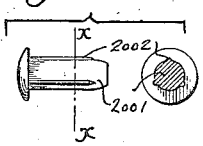

UNITED STATES PATENT OFFICE.

REUBEN STANLEY SMITH, OF MILWAUKEE, WISCONSIN, ASSIGNOR TO A. O. SMITH CORPORATION, OF MILWAUKEE, WISCONSIN, A CORPORATION OF NEW YORK.

METHOD OF AND APPARATUS FOR FORMING AND ASSEMBLING METAL ELEMENTS.

1,397,020.

Specification of Letters Patent. Patented Nov. 15, 1921.

Application filed January 21, 1918. Serial No. 212,934.

*To all whom it may concern:*

Be it known that I, REUBEN STANLEY SMITH, a citizen of the United States, residing at Milwaukee, county of Milwaukee, and State of Wisconsin, have invented new and useful Improvements in Methods of and Apparatus for Forming and Assembling Metal Elements, of which the following is a specification.

My invention relates to improvements in apparatus for forming and assembling metal elements, and pertains especially to the art of forming and assembling sheet metal parts.

Fundamentally, the object of my invention is to provide means whereby such work may be automatically done in a continuous succession of subdivided operations, each performed within a standard interval of brief duration, and all of which may be automatically repeated indefinitely and the finished products delivered successively at intervals corresponding with the standard operating interval.

My invention is particularly adapted for constructing metal frames, such, for example, as the main frames of vehicles, vehicle bodies, wheels, etc. The particular embodiment of my invention herein illustrated has for its object the provision of apparatus of such character that metal sheets or strips of sheet metal may be delivered to the apparatus, cut into blanks of the required sizes, and the blanks intermittingly advanced along predetermined lines of travel with standardized stopping and advancing intervals of equal duration,—the blanks, during the successive stopping intervals, being automatically pierced, shaped, provided with brackets, gussets, hangers, and otherwise prepared for assembly as individually completed frame elements, which are then assembled in sets, and each set of elements permanently connected to form a completed vehicle frame, one of which may be delivered during each of the standard element advancing intervals.

My improved apparatus includes a set of cross bar and side bar blanking presses, each of which blanking presses operates in connection with feeding and conveying mechanism, so arranged that the product of each press or set of presses forming one kind or type of blanks, may be automatically advanced in a continuous series of such blanks along a line of travel separate from the lines of travel followed by blanks of different character. Each series, therefore, constitutes a succession of like blanks advancing in synchronism with those in the other series, and each blank in a series comprises one member of a set of correspondingly advancing blanks having at least one member in each of the other series. The blanks thus referred to as composing a set are those which are to be subsequently assembled by the apparatus in a single frame after having been separately advanced, pierced, shaped, provided with gussets and other attachments, and finished as completed frame elements ready for such assembly.

Further, my object is to provide means for operating the blank conveying mechanisms step by step in the intervals between blank cutting or forming operations; to provide a blank piercing department for each line of advancing blanks into which such blanks may be automatically transferred, pierced, and returned to said conveying mechanism; to provide these departments with auxiliary conveying mechanism associated with piercing machines; to provide the auxiliary conveying mechanism with means operative in connection with the machines, to mechanically position each blank preparatory to a piercing operation, whereby holes may be formed in the blanks in predetermined positions; to provide other departments into which the blanks may be delivered for shaping operations, for the connection of brackets and other attachments, and for finishing operations; to so arrange the departments and the operating machines in each department that all the blanks in a given series may be passed successively through all of the departments associated with such series, and in each department, may be presented to operating machines by auxiliary step by step, blank advancing and positioning mechanism; to group the operating machines in each department and, where possible, to arrange groups of machines at single stations in a department in such a manner that all of the required machines in such department may operate simultaneously,—those at any one of the stations being arranged to operate upon the same blank and those at successive stations being arranged to operate upon successive blanks in the series; to provide machines, the work of which is so reduced in scope or so limited in character that it may invariably be performed within the interval between two successive blank advancing operations, i. e., the interval during which a similar blank is being cut or formed by the blanking press from which the series of blanks originates.

Instead of attempting to drill or pierce all the rivet holes in a blank at one operation, I provide a series of groups of piercing machines, each capable of operation under light power and the machines in each group being arranged for simultaneous operation to pierce a series of holes in the blank at such distances from each other that each machine may conveniently operate without interfering with the work of another, the blank being then advanced to another group of piercing machines which form another set of holes, which may, in many instances, be in such close proximity to the holes formed by the first group of machines that interference of the machines with each other, or injury to the blank, might occur if it were attempted to form all the holes simultaneously with the blank in one position. In this manner, I am enabled to perform any desired number of piercing operations and to pierce holes in any desired proximity to each other by means of machines located at successive stations along which the blank is being advanced.

Instead of piercing all the holes in a single piercing department and then delivering the blanks to a shaping department for an upsetting or shaping operation, I provide the piercing department with machines for piercing holes in those portions of the blank which will not be subject to distortion during a shaping operation, and then deliver the blank to the shaping department, after which, the portions subject to distortion in the shaping press may be pierced in a succeeding department at stations provided with machines specially adapted for that purpose, and which may be located in a separate department or in the departments where the holes thus pierced are to be utilized.

My invention further includes in its object the provision of means, whereby, after the piercing and shaping operations have been completed, the bars or frame elements thus formed from the blanks may be delivered to, and similarly advanced in, other departments having stations at which the attachments above referred to, (brackets, hangers, etc.,) are applied and secured in position and the individual elements finished as above stated, after which, these frame elements, with the other elements of the same set advancing along similar trackways, may be simultaneously presented to an assembly conveyer, transferred thereto in a position of open assembly, advanced to a succeeding station and finally transferred in such assembled relation to a clamping and conveying jig in an assembly department, said jig being so constructed and operated that the bars may be automatically secured or clamped and the side bars moved into abutting contact with the ends of the cross bars in fixed, assembled relation thereto.

My invention not only includes the provision of assembly jigs and means for effecting a fixed or final rigid assembly of the elements thereon, but it is an extremely important feature of my invention to provide means whereby the assembled elements may be presented by these jigs at successive stations in said assembly department to groups of operating machines located at such stations, such, for example, as reaming machines, rivet inserting and rivet heading machines, each capable of operating upon the presented frame while the parts are in assembled relation. These machines are grouped for independent but simultaneous operations at the respective stations in the assembly department, and a sufficient number of stations are provided, whereby all of the machines at all stations in the department may be in simultaneous operation, with the machines at each station operating on a single frame and those at successive stations operating upon frames in different stages of advancement, the work being subdivided in such a manner that the time required at each station for all operations performed at that station does not exceed the interval between the advancing movements of the conveyer mechanisms.

Inasmuch as the successful attainment of the first stated, main or general object of my invention is dependent upon the subdivision of the work into a succession of operations of such simplicity that each may be safely and reliably performed within a standard interval corresponding so nearly with the interval required for each of the other operations that the entire work may be made substantially automatic and continuous, it becomes necessary to not only subdivide the work scientifically, but to provide machines of such simple structure that the chance of failure in operation may be reduced to a minimum; to provide auxiliary operating stations or departments wherever necessary, at which reserve machines or working devices may be located, and to or from which the material may be delivered without delay in case of a failure in operation of one or more machines at a preceding station; to provide machines or working devices which may be quickly manipulated and actuated, whereby the work may not be delayed by any necessary movements that may be required to get the machines or devices into and out of operating position, or to operate them when in such position; to provide simple and absolutely reliable conveying apparatus; to provide automatic feeds that cannot make mistakes; to provide for accurate doweling or positioning of the material preparatory to each operation; to provide means whereby materials or frame elements of differing shape, or which require operations of a character different from those required by other elements, may be conveyed along the above mentioned independent lines of advancement, and subjected to the required special operations in such a manner that all the elements required for any given frame may be delivered to the assembly conveyer at the proper time for assembly in such frame, in order that the final series of connecting operations may take place without delay; to provide means for transferring elements and groups of assembled elements at the proper times from one conveying mechanism to another; and to provide means whereby all movements and operations may be automatically or mechanically performed, (except where inspection is desired), in order that the apparatus may operate as one unit with all of its parts coördinated and working in such synchronism, that deliveries of completed frames will uniformly take place at substantially the same time that a set of blanks is delivered from the blanking presses, and at intervals equal to those required for successive blank cutting and delivering operations.

The preparing means hereinafter referred to, is constituted of the several mechanisms which operate to convert the blank element into shape and to treat the said element in its various stages to prepare it for assembly into the unitary structure of which it forms a part. The fabricating devices also hereinafter referred to, are constituted of the mechanisms which serve to unite the previously prepared elements into such unitary structure.

My invention further relates to the process for manufacturing a structural unit, such for instance as may be embodied in a frame for an automobile or other vehicle.

Such manufacturing process involves, first, the preparatory operations of successively blanking, perforating, shaping and treating the frame elements, by progressive operations, each performed in a time cycle of brief duration, but in which time cycle all of the successive operations performed upon the frame elements to bring the latter to a state of completion are executed; second, the operations of assembling and clamping the frame elements in the relative positions which they occupy in the structural unit; and, third, the fabricating operations of securing registry of the rivet holes formed in the frame elements at their points of union,—by reaming, if necessary,—inserting the connecting rivets, and spreading the latter to permanently unite the elements into a rigid and unitary structure. The fabricating operations are performed successively in the time cycle in which the progressive operations for the preparation of the elements are performed. The step by step work feeding movements of the element forming materials along the line for the progressive preparation of the elements, assembling and clamping, and progressive fabrication of the said elements to constitute the structural unit referred to, are performed in the intervals of the said time cycles within which the successive operations of preparation of the elements to completion and the fabrication of the structural unit are performed.

The fabricating process herein disclosed, as subordinate to the manufacturing process, constitutes the subject matter of the claims of an application filed by me on June 4, 1917, Serial #172,746; and the present application, in so far as it relates to the said subject matter, may be regarded as a continuation of the said application Serial #172,746. The drawings of the present case are not to be regarded as illustrating apparatus essential in structure to the practice of my process, although such drawings show embodiments of various inventions in mechanism designed to facilitate performing the several steps of such process, and it will be understood that my process may be successfully carried out by mechanisms operating from a common source of power or from independent sources of power, as may be desired.

In connection with the practice of my improved process, I propose to employ rivets or other connecting devices, which, when inserted in the registering holes in the frame elements, will be retained by suitable anchoring provisions, pending the heading operations. By means of such anchoring provisions, the rivets are held in position for the time being, and not subject to accidental displacement during the step by step feeding movement of the assembled frame elements, or by the vibrations caused by the operation of the fabricating devices.

In the drawings:—

Figure 1 is a conventional plan view of frame manufacturing apparatus embodying my invention, showing the relation of the different working departments to each other and to the mechanism for conveying the materials from one department to the next.

Figs. 2 to 7 inclusive illustrate the several stages of side bar development as accomplished in the several working departments through which these bars pass preparatory to their assembly with the cross bars.

Figs. 8 to 13 inclusive are similar views illustrating the several stages of cross bar development.

Fig. 14 is a longitudinal sectional view on line 14—14 of Fig. 1, showing the working parts of the blanking press and the transferring hoist for feeding the material to and removing it from such press, the operating mechanism of the press being assumed to be of ordinary construction and therefore omitted from the illustration.

Fig. 15 is a sectional view drawn on line 15—15 of Fig. 1 and showing an electromagnetic transfer hoist in operative relation to the transferring conveyer and piercing line conveyer.

Fig. 16 is a plan view of a fragment of the piercing department including the initial or loading station, the initial piercing station, and a portion of the second piercing station, with associated trackways and jigs, and with arrows indicating the line of travel of the jigs, and blanks carried thereby, to the respective piercing stations.

Fig. 17 is a cross sectional view of the piercing department, drawn to a vertical plane on line 17—17 of Fig. 1, cutting the reversing track sections and frames, and showing the actuating connections in elevation.

Fig. 19 is a cross sectional view of the piercing department drawn on line 19—19 of Figs. 1 and 16.

Fig. 20 is a plan view of the forming press feeder used in Department C, showing also a portion of the bed of the press in associated relation to the feeder.

Fig. 21 is a side elevation of the forming press and feeder.

Fig. 22 is a side elevation of a transfer hoist employed for inverting the blanks used for making right hand side bars.

Fig. 23 is a plan view of a portion of the bracket connecting Department D showing a bracket feeding station, rivet inserting and rivet heading stations, and an intervening transfer station.

Fig. 24 is a sectional view drawn on line 24—24 of Fig. 23.

Fig. 25 is a cross sectional view drawn on line 25—25 of Fig. 1, showing a rivet inserting machine and one of the rivet heading machines in elevation, with parts partially broken away.

Figure 18:
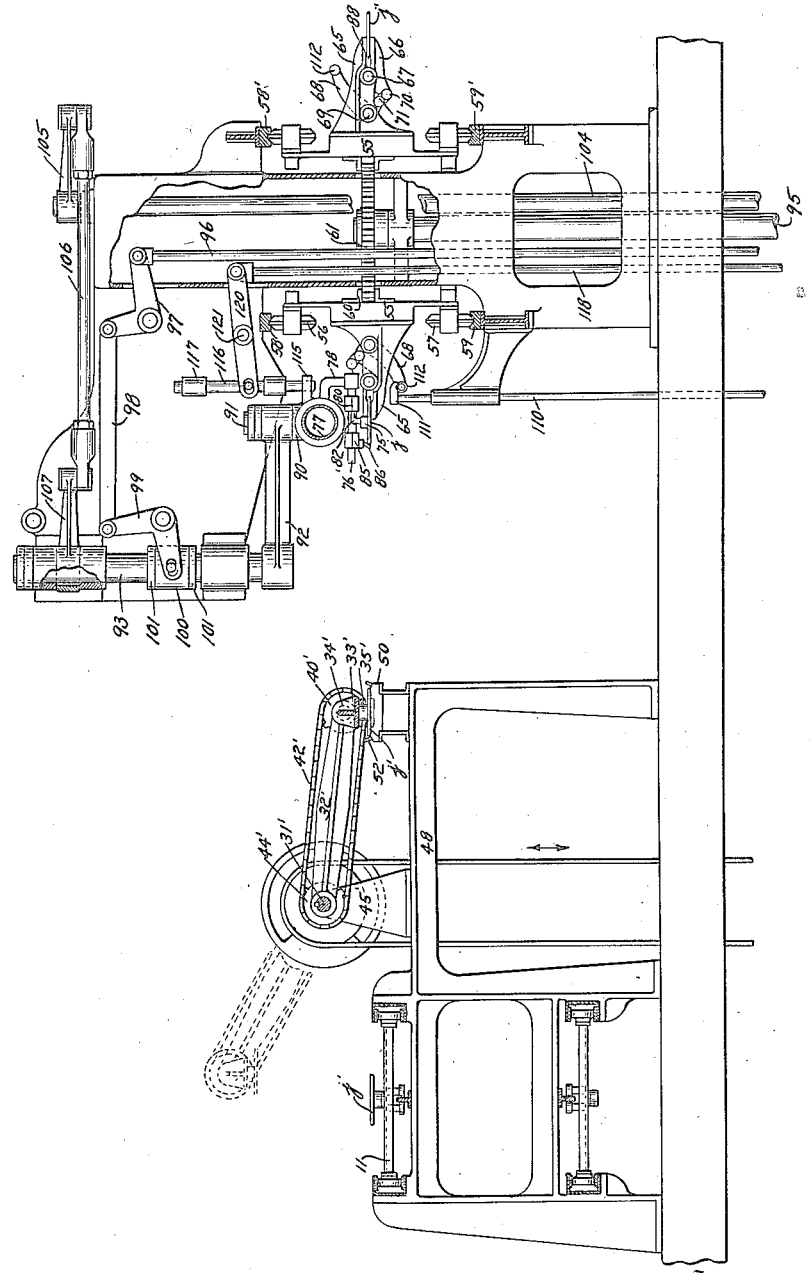
Fig. 18 is a cross sectional view drawn on line 18—18 of Fig. 1 showing a transfer hoist and loader in operative relation to the piercing line conveyer, and conveying mechanism in the piercing department adapted for either feeding-in or feeding-out operations with reference to the piercing department.

Fig. 26 is a detail view, in vertical section, drawn to a plane cutting the axis of one of the rivet feeding chutes and an associated vertically movable, rivet inserting plunger, the latter being illustrated in full in an intermediate, rivet actuating position, with dotted lines indicating the retracted position of the plunger and a rivet in the position in which it is received by the plunger from the chute. Another rivet is also illustrated by dotted lines in bracket connecting position.

Fig. 27 is a fragmentary view, partly in vertical section and partly in elevation, showing a set of rivet heading plungers adapted for operation upon the vertically disposed rivets inserted by the mechanism shown in Fig. 25.

Fig. 28 is a detail view of the swinging head of the rivet heading machine shown in Fig. 25, with the head in raised position and the rivet heading jaws in retracted position.

Fig. 29 is a plan view of the hanger Assembly Department E, showing a series of operating machines employed for finishing the front ends of the side bars, applying spring hangers thereto, and connecting the same to the bars.

Fig. 30 is a fragmentary view in side elevation of the trackway in Department E and the side bar supporting and clamping members carried by the conveyer, together with means for actuating the movable clamping members to clamping and releasing positions respectively, the left hand supporting and clamping members being illustrated in releasing position and the corresponding right hand members being illustrated in clamping position.

Fig. 31 is a fragmentary view in front elevation showing the working parts of a horizontally operating piercing press, employed in Department E for perforating the flanges of the side bar adjacent to the front end thereof, the side bar being illustrated in section on line 31—31 of Fig. 29.

Fig. 32 is a plan view of the piercing press illustrated in Fig. 31, showing also a fragment of the side bar in presented position.

Fig. 33 is a sectional view drawn on line 33—33 of Fig. 29, showing a vertically operating piercing press.

Fig. 34 is a fragmentary view, in plan, illustrating the operation of the work clamping and doweling mechanism of the press.

Fig. 35 is a sectional view, drawn on line 35—35 of Fig. 34.

Fig. 36 is a view in side elevation of a machine for applying spring hangers to the ends of the side bars in Department E after the piercing operations have been performed by the machines illustrated in Figs. 31 to 35 inclusive.

Fig. 37 is a fragmentary view, in front elevation, of rivet inserting mechanism employed in Department E for inserting connecting rivets through the holes formed by the machine shown in Figs. 31 to 35 inclusive after the spring hanger has been inserted by the machine shown in Fig. 36, said rivets passing through holes previously formed in portions of the hanger shank.

Fig. 38 is a sectional view on line 38—38 of Fig. 29, showing a rivet heading machine employed in Department E.

Fig. 39 is a fragmentary, sectional view, drawn to a parallel plane intersecting the side bar adjacent to the rivets, and with the dies and one of the rivet heading plungers partially broken away to a plane which includes the axes of the rivets.

Fig. 40 is a front elevation of a machine employed in Department E for heading the horizontally disposed, hanger securing rivet.

Fig. 41 is a side elevation of the same.

Fig. 42 is a sectional view drawn on line 42—42 of Fig. 41.

Fig. 43 is a fragmentary plan view of one of the turrets employed in Department $b$, showing the blank receiving station and one of the piercing stations, including the transferring mechanism and a set of piercing machines located at the respective stations.

Fig. 44 is a sectional view of the same drawn on line 44—44 of Fig. 43.

Fig. 45 is a fragmentary view of the blank engaging clamping jaws carried by the turret, showing the same on a larger scale than that of Fig. 44.

Fig. 46 is a side elevation of one of the lapping presses employed in Department $d$, showing also a fragment of the turret with associated clamping, clamp operating, and doweling mechanisms.

Fig. 47 is a detail, sectional view drawn on line 47—47 of Fig. 46.

Figs. 48 and 49 are detail views, showing fragments of the transferring mechanism, clamping mechanism, and clamp operating mechanism associated with one of the turrets in Department $e$ in operative relation to a presented cross bar.

Fig. 50 is a plan view of the transferring mechanism, showing a fragment of the turret presented at the transferring station.

Fig. 51 is a side elevation of one of the gusset feeding machines in associated relation to a fragment of the turret, and showing also the clamping mechanism for holding the gusset in assembled relation to a cross bar.

Fig. 52 is a sectional view drawn on line 52—52 of Fig. 51.

Fig. 53 is a plan view showing fragments of the cross conveyers and the positioning conveyer in Department G.

Fig. 54 is a sectional view drawn on line 54—54 of Fig. 53.

Fig. 55 is a cross sectional view drawn on line 55—55 of Fig. 53.

Figs. 56, 57, and 58 are fragmentary views showing parts of the transferring conveyer illustrated in full in Fig. 60.

Fig. 59 is a plan view of the Assembly Department H, showing also a fragment of the positioning conveyer of Department G.

Fig. 60 is a cross sectional view drawn generally on line 60—60 of Fig. 59, showing the transfer crane and clamp operating mechanisms in elevation and the assembly jig and trackways in cross section.

Fig. 61 is a cross sectional view drawn generally on line 61—61 of Fig. 59, showing the mechanism for actuating the jig clamps in vertical section and showing the jig partly in elevation and partly in section.

Fig. 62 is a detail view, partly in section and partly in elevation, showing the clamp actuating coupling and associated parts of the mechanism for operating the jig clamps illustrated in Fig. 61.

Fig. 63 is a side elevation of the jig and jig advancing mechanism.

Fig. 64 is a fragmentary view of one of the jig clamps and associated parts, partly in section and partly in elevation.

Fig. 65 is a cross sectional view of the remaining station in the assembly department, drawn generally on line 65—65 of Fig. 59.

Figure 66:
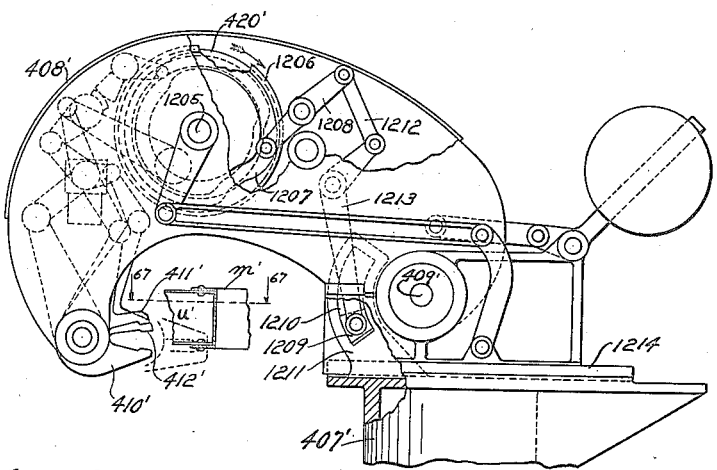

Fig. 66 is a side elevation of the swinging head of one of the rivet heading mechanisms employed in Assembly Department H, and showing the rivet heading jaws manipulated into position for movement into an angle formed by interacting frame elements.

Figure 67:
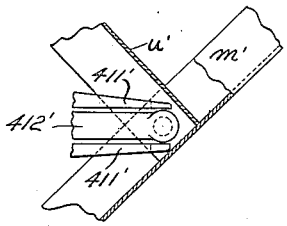

Fig. 67 is a fragmentary view, in horizontal section, on line 67—67 of Fig. 66, showing the interacting frame elements and the relation of the rivet heading jaws thereto when in rivet heading position.

Fig. 68 is a side elevation of a motor and power transmitting connections for operating one of the step by step conveyers.

Fig. 69 is a fragmentary view of a portion of the mechanism shown in Fig. 68, seen at right angles to Fig. 68 and also shown partly in section on line 69—69 of Fig. 68.

Fig. 70 is a detail view of one of the clutches.

Fig. 71 is a view, partly in elevation and partly in section, of a machine for operating the piercing machines in Department B.

Fig. 72 is a sectional view drawn to a plane on line 72—72 of Fig. 71.

Fig. 73 is a detail view in vertical section of one of the circuit controlling switch boxes similar to that shown in Fig. 71, but containing a special, single contact, rotary switch for synchronizing purposes.

Fig. 74 is a detail view of the single contact, rotary switch, seen at right angles to Fig. 73.

Fig. 75 is a fragmentary view drawn on line 75—75 of Fig. 71.

Fig. 76 is a detail fragmentary view of the brake mechanism, viewed from a position indicated by line 76—76 of Fig. 75.

Fig. 77 is a detail view showing a modified form of construction for operating the jig transferring mechanism in the piercing department.

Fig. 78 is a general diagram of the electrical connections of the first two departments, illustrating conventionally the means for controlling and synchronizing the operations of the various working parts thereof.

Fig. 79 is a sectional view, showing a modified form of clutch mechanism from that disclosed in Fig. 71.

Fig. 80 is a sectional view, drawn on line 80—80 of Fig. 79.

Fig. 81 is a detail plan view of the electromagnetic shift for controlling clutch setting operations of the Fig. 79 structure.

Fig. 82 shows in side elevation and in cross section on line x—x, one of the self anchoring rivets which may be used to facilitate the practice of my process by effecting a temporary anchorage in the rivet holes.

Like parts are identified by the same reference characters throughout the several views.

The drawings illustrate my invention as applied to an apparatus designed for the manufacture of motor driven vehicle frames and in the following description, this apparatus will be treated as embodying side bar forming Departments A to F inclusive, cross bar forming Departments a to f inclusive, and Assembly Departments G and H, all organized in connection with suitable feeding and transferring mechanisms as a single apparatus capable of performing the series of substantially synchronized and sequential operations above referred to. The word "Department" is herein used merely as a convenient designation for each portion of the apparatus in which an operation or set of operations of similar character is performed, whereby the material is prepared for another set of operations of different character, or for final delivery.

The side bars delivered from Department F and the cross bars delivered from Department f will, in each case, be completely formed and provided with all necessary gussets, brackets, and hangers, ready for assembly. All the work of feeding the materials to the several departments, or from one department to the next, presenting them to operating machines in their respective departments, and operating the machines for shaping, piercing, and trimming the blanks, and connecting gussets, brackets, and hangers thereto, will be automatically performed in the standard conveyer stopping intervals, and in such a manner that the completed bars may be delivered in sets to Department G where they are assembled and delivered in assembled relation to Department H and the elements then automatically prepared for riveting, and riveted together to form completed frames, which are delivered successively at short intervals from the discharge end of the apparatus, and in each instance simultaneously with the delivery of a set of blanks, (or bars), from Departments A and a, and from each of the working intermediate departments respectively.

DEPARTMENT A.

*Strip feeding and blank forming operations.*

The side bar forming departments each include two subdivisions. But the blanks are alike until they reach the drawing presses in Department C, and therefore a description of one subdivision will apply to the other in Departments A and B, and the set of reference letters used in one subdivision is repeated in the other.

The conveyer 1 illustrated in Fig. 1 may be assumed to be of an ordinary belt or chain type, but it is preferably provided with sets of electromagnets 2, (Fig. 14) upon which strips or pieces $j$ of sheet metal may be placed, each set of electromagnets being energized upon receiving the strip and deënergized preparatory to its removal therefrom. The sets of electromagnets are preferably transversely disposed upon the conveyer and the strips are received on the conveyer in transversely disposed positions. This conveyer is preferably actuated intermittingly at regular intervals in step by step movements, each step being equal in length to the distance between the center lines of successive sets of magnets. Electrical power is preferably employed as hereinafter set forth.

The conveyer 1 carries the strips $j$ to a blanking press having a relatively fixed punch 3 and a movable shearing matrix 5 supported and actuated by a plunger head 6 carried by vertically movable rods or posts 7. These parts of the press, together with the actuating rods 7, may be assumed to be of any ordinary construction, but I preferably provide the matrix with shearing projections 8 which coöperate with counterpart projections 9 on the punch, whereby the material cut from the strip $j$ during a blanking operation may be permitted to drop freely by gravity at the sides of the press.

The strips $j$ carried by the conveyer 1 are successively presented at a transfer point or station indicated at 4 in Fig. 14, where they are automatically removed and delivered to the blanking press by suitable feeding mechanism. After the blanking operation of the press, the blank $j'$ is removed by similar coöperating parts of the same feeder and deposited upon another conveyer 10, which I term the transferring conveyer, and which coöperates with suitable transferring mechanism to be hereinafter described for a delivery of the blanks to the main piercing line conveyer 11 also shown in Fig. 1 and hereinafter described.

The feeding and blank removing mechanism of the blanking press may be assumed to be of any ordinary construction for the purposes of this application. Simple means actuated step by step as distinguished from a slow, continuous movement, the work of the press and the feeder will, of course, be synchronized in such a manner that the feeding-in and feeding-out operations of the press will take place during stopping movements of the conveyer, and in any case, the magnets 14 14' will remove material from conveyer 1 and deposit blanks on conveyer 10 at regular intervals, and in such synchronism with the conveyer movements that the blanks on conveyer 10 will be accurately positioned and spaced.

*The transfer hoist and main piercing line conveyer.*

At the rear end of the transferring conveyer 10, a blank is released by its supporting electromagnets upon being presented in position for transfer to the piercing line conveyer 11. The piercing line conveyer preferably extends transversely to the line of movement of the conveyer 10 and a transfer hoist, similar to that shown in Fig. 15, may be employed to remove the presented blank from conveyer 10 and deposit it upon the piercing line conveyer 11. The blank $j'$ may occupy a longitudinal position thereon instead of being transversely disposed as is preferably the case with the blanks upon conveyer 10. The blank is removed by the hoist from conveyer 10 as soon as it is presented, and the piercing line conveyer will then have a set of magnets in position to receive the blank, since its advancing movement will be at least equal to the length of the blank.

The transfer hoist shown in Fig. 15 includes an oscillatory shaft 31, provided with arms 32 and a cross bar 33 which has end studs 34 journaled in the swinging ends of arms 32. A series of electromagnets 35 depends from cross bar 33, and when shaft 31 is oscillated in one direction, these magnets will be swung downwardly into contact with the presented blank $j'$ on conveyer 10, whereupon the electromagnets 35 will be energized, the electromagnets 26 of the transferring conveyer will be deënergized, and shaft 31 will then be oscillated to lift the blank, carry it to, and deposit it upon piercing line conveyer 11. Electromagnets 35 will then be deënergized and shaft 31 oscillated to carry them to a neutral position.

The studs 34 are preferably located above the center of gravity of the cross bar 33 and its electromagnets, and said electromagnets are therefore held by gravity with their axes in substantially vertical positions. But in order that the magnets may be accurately maintained in such positions, I preferably provide one or both of the studs 34 with a sprocket wheel 40 connected by a sprocket chain 42 with a fixed sprocket wheel 44 on the frame member 45 in which shaft 31 is journaled. With this arrangement, cross bar 33 will be positively oscillated during the transferring operation in a direction opposite that in which shaft 31 oscillates and at the same rate of speed, the sprocket wheels 70 being of equal diameter. The blanks $j'$ may therefore be positively held in a true horizontal position during the transferring operation, and accuracy in positioning the blanks upon the piercing line conveyer is thus assured.

The piercing line conveyer preferably advances the blanks step by step in correspondence with the movements of the other conveyers, each advancing movement being of sufficient length to remove the deposited blank to a position where it will not interfere with the delivery of the next blank. The distance between stopping points or stations will therefore be equal to or in excess of, the length of one of the blanks $j'$.

When any given blank reaches station 46, it will be removed by another transfer hoist (Fig. 18) similar to that shown in Fig. 15. But at station 46, the blank will be deposited by the hoist upon a positioning rest 50 having divergent guiding projections or flanges 52 at its sides and ends, so spaced that each blank deposited upon the rest will be received thereon in an exact predetermined position.

After depositing a blank $j'$ upon the rest 50, the magnets 35' of the hoist will, of course, be deënergized and lifted by the hoist to a neutral position preparatory to a succeeding transferring operation upon the blank $j'$ next presented to the hoist at station 46 by the piercing line conveyer 11. But before another blank is so delivered, the blank on rest 50 will be removed by a loading mechanism now to be described and which is adapted to positively place the blank between the jaws of a carrier jig, (or set of jigs), adapted to advance it and present it successively to a series of groups of piercing machines in Department B for piercing operations.

DEPARTMENT B.

*Piercing operations.*

Each carrier jig in the piercing department comprises a frame 55 provided with upper and lower wheels 56 and 57 adapted to travel along suitable trackways having upper and lower rails 58 and 59, 58' and 59' respectively. The jig frames have horizontally disposed rack bars 60 on their rear faces which are actuated by gear wheels 61 to advance the jigs. Before a rack bar passes out of mesh with one gear wheel, it engages the next, and when the gear wheels are in rotation, all of the engaged racks will therefore be simultaneously and continuously advanced. The front wall of each jig is provided with a set of clamping jaws for automatically performing these operations are illustrated in Fig. 14 and comprise a set of standards 12, and rods 13 supported thereby and extending over the bed of the press adjacent to the operating rods or posts 7. A set of press feeding electromagnets 14 are supported from slides 15 by bell cranks 16 and cross bars 17 with which the electromagnets 14 are directly connected.

The strips or pieces of material *j* are supported by the conveyer 1 in substantially the same horizontal plane that the material occupies when deposited upon the press punch 3 and the magnets 14 are normally supported by the bell cranks 16 at a somewhat higher level. Each bell crank has an upwardly projecting arm 18 connected with a sleeve 19 on rod 13, and compression springs 20 are interposed between each sleeve 19 and the adjacent slide 15, and adapted to normally hold the magnets 14 in said raised position.

In the operation of the feeder, the magnets 14 are moved forwardly to station 4 by operating levers 21, connected with the slide or slides 15 by links 22. At station 4, stop collars 23 on the rods 13 engage the sleeves 19 and actuate the magnet supporting bell cranks 16 to depress the magnets into contact with the material presented at station 4. Thereupon the magnets are energized, after which, the levers 21 are actuated in the opposite direction to carry the material *j* over the punch 3. Magnets 14 are then again depressed by the bell cranks 24 which, at this point, are brought into contact with stops 25 carried by the plunger 5, and after the material *j* has been thus deposited on the punch, the magnets are deënergized and returned to the neutral position in which they are shown in Fig. 14.

After the press has been actuated for a shearing operation, and the movable member retracted, (*i. e.*, the matrix in the construction shown), the resulting blank *j'* is removed and deposited upon a similar set of electromagnets 26 presented in receiving position by transferring conveyer 10. This removal of the blank *j'* from the press is accomplished by another set of electromagnets 14' supported by and actuated along the feeder rods 13 by mechanism similar to that above described for supporting and actuating the set of magnets 14. The bell cranks 16' and 24' are reversed in position as compared with cranks 16 and 24. The magnet supporting bar or rod 17' is moved vertically in substantially the same manner that the rod 17 is moved, and it is swung downwardly to carry the magnets 14' into engagement with the blank *j'* after slide 15' is carried between the working members of the press following a shearing operation. These magnets are then energized and raised to lift the blank *j'* from punch 3, and then convey it to, and deposit it upon, the presented set of magnets 26 of the transferring conveyer 10. The functions of the stops 23' and 25' are, of course, similar to the functions of the stops 23 and 25 as above described. The stops 25 and 25', are in different planes, each placed in the path of its coacting bell crank 24 and 24' as indicated in Fig. 14.

*Positioning in Department A.*

At the receiving end of conveyer 1, the strips of material *j* will be deposited upon the receiving magnets 2 thereof and positioned thereon with reasonable accuracy before energizing those magnets, but extreme accuracy is not required, since the margins of these strips will be entirely cut away by the blanking press and each blank *j'* thus formed will, of course, conform absolutely both in shape and in position to the upper surface of the punch 3 upon completion of the shearing operation. The blank will be held in position on the punch 3, pending the withdrawal of the matrix 5, by a spring actuated knock out plate 27, this plate being lifted from the blank after the matrix has been completely withdrawn. Therefore, there will be no tendency for the blanks to shift out of position on the punch 3 pending their engagement by the electromagnets 14', and by so actuating the transferring conveyer 10 as to the present its sets of magnets 26 uniformly and successively in the same receiving positions, the blank *j'*, will be received and conveyed by the transferring conveyer 10 in accurately spaced and parallel relation to each other.

The conveyers 1 and 10 are actuated in synchronism, advancing and stopping simultaneously. In each of the intervals between the successive advancing movements, a blank will be removed from the press by the feeder magnets 14' and immediately thereafter another blank will be delivered to the press by the feeder magnets 14, both sets of magnets then returning to neutral position. It is not essential to this invention whether the plunger of the press is brought to rest in its raised position, or whether it is actuated slowly and continuously, if a sufficient time interval is allowed for the blank removing and feeding operations, and if the press and feeder are so operated that the feeding and removing operations will invariably take place during the standard conveyer stopping interval.

The press plunger head 6 and its operating rods 7 may be actuated from a crank shaft 28 through eccentrics 29 and connecting members 30 as is common in presses of this type, the vertical movement of the plunger in such a press being very slow at the end of the stroke, in either direction, thereby affording sufficient time for the operation of the feeder. But if the conveyers are 65 and 66, clamping jaw 65 being stationary with reference to the jig frame, and jaw 66 being pivoted to the jaw 65 at 67 and adapted to be actuated by an elbow crank 68, pivoted to the fixed jaw at 69 and connected to a rearwardly projecting operating arm 70 by a link 71.

The blanks $j'$ successively deposited upon the rests 50 are lifted therefrom and delivered between the clamping jaws 65 and 66 by a set of jig loading electromagnets 75, supported by fingers 76 of arms 78 suspended from a longitudinally extending rod 77. Collars 80 adjustably connect the fingers 82 carrying the magnets 75, with the rod 77. Other collars 85, adjustable on the fingers 76, are provided with guiding fingers 86 adapted to engage the outer margin of the blank $j'$, whereby, when the magnets 75 carry the blank $j'$ between the clamping jaws 65 and 66 of the jig, the blank may be prevented from shifting during the jaw closing operation.

The magnet supporting rod 77 is mounted in suitable sleeve hangers 90 having upwardly projecting studs 91 journaled in swinging arms 92 secured at their opposite ends to a vertically disposed, axially movable and oscillatory shaft 93. Assuming the parts to be in the Fig. 18 position, with magnets 75 deënergized, shaft 93 will be lifted axially to raise magnets 75 from the jig supported blank $j'$, after which, the shaft will be oscillated to carry the magnets 75 to a position directly above the central portion of the rest 50. A downward movement of shaft 93 then brings these electromagnets 75 into contact with the blank supported by said rest 50, whereupon the magnets will be energized, shaft 93 again raised, and then oscillated to carry such blank horizontally in the direction of the jig trackway. A reverse axial movement of the shaft takes place during this oscillation, whereby the blank engaged by the magnets 75 will be brought into position for entry horizontally between the jaws of the jig, or set of jigs, which have, in the meantime been positioned to receive such blank. After each jig, or set of jigs, has thus been loaded, they will be advanced by means of the actuating gear wheel 61. These advancing movements are also step by step movements, and take place in the intervals between loading operations, and during the intervals in which the other step by step conveyers are actuated.

The specific means for loading and actuating the jigs, including also the means for actuating the shaft 93, are not essential to this invention. In the construction illustrated, gear wheel 61 is actuated from a vertical shaft 95. Shaft 93 is actuated vertically by means of a rod 96, the motion of which is transmitted to the shaft through elbow crank 97, link 98, elbow crank 99, and sleeve 100, the latter being mounted between a set of collars 101 fixed to said shaft. Shaft 93 is actuated rotatively from an oscillatory shaft 104 through arm 105, link 106, and arm 107, the latter being splined to shaft 93, whereby the latter may be moved vertically as above described, without disengaging from said arm 107.

The movable jaw 66 of each jig may be swung to clamping position by means of a hook rod 110 having a projection or hook 111 at its upper end adapted to engage a stud 112 carried by elbow crank 68. When jaw 66 is in clamping position, link 71 will have been carried slightly beyond the longitudinal center line of the elbow crank 68 to which it is connected, thereby locking the jaws 66 in clamping position. Provision is made for sufficient yielding movement of the clamping faces of the jaws to allow the link 71 to swing slightly past the line of centers into and out of locking position. After locking the jaws, rod 110 is moved upwardly for a short distance, and therefore, when the jig 55 is actuated by gear wheel 61 for an advancing movement, this movement will not be interfered with by the rod or its projection 111. It will, of course, be understood that at any station where it is desired to release the blank, the movable clamping jaw 66 may be swung to open or releasing position by means of an actuating rod, similar to the rod 110, operating upon stud 112 from below.

It is desirable that the blanks $j'$ shall each be accurately doweled, not only by the guiding projection 86, but that the blanks be also positioned longitudinally with reference to the jigs. For this purpose, one or more of the hangers 90 may be provided with a bracket 115 having a socket adapted to receive a doweling pin 116 mounted in suitable guiding sleeves 117 supported from the loading machine frame. This doweling pin 116 may be actuated vertically by means of a rod 118 and a lever 120 pivoted to the frame at 121.

Inasmuch as the jigs 55 are advanced along the tracks 58 and 59 in step by step movements, a set of jigs may be presented to receive one of the blanks $j'$ with the same frequency that blanks $j'$ are presented by line conveyer 11 for transfer to the positioning rest 50. The loading machine which manipulates the electromagnet 75 may be operated to transfer the blank $j'$ to the presented jig, or set of jigs, immediately after such blank has been placed upon the rest 50 and the jigs may be advanced during the next succeeding movement of the piercing line conveyer 11. If desired, however, the loading operation may take place simultaneously with an advancing movement of the line conveyer 11 and the transferring operations of the hoist shown in Fig. 18 may be performed during the stopping intervals of said conveyer 11, while the jigs are being advanced. This is possible because the movement of the jigs may be synchronized either with the stopping intervals or with the moving intervals of the line conveyer, owing to the fact that there are two steps involved in the transferring and loading operations, and these may not only take place in sequence but at any required intervals, to conform to the stopping intervals of the associated conveyers.

Also, if desired, the advancing and stopping movements of the jigs may overlap in time upon the advancing movements and stopping intervals of the main line conveyer. In any such case, however, the movements of these mechanisms will be so timed that each of the blanks $j'$ will be removed from rest 50 in time for delivery of the next blank thereto. The return of the blanks to the piercing line conveyer, after the piercing operations have been completed, will also be so timed that the blanks can be delivered to the conveyer during conveyer stopping intervals. I prefer, however, to operate all the conveyers, including the jigs, simultaneously.

In the piercing department, the blanks are conveyed by the jigs in one direction along trackways 58 and 59, and the jigs and blanks, together with sections of the tracks, are then transferred bodily to another trackway 58', 59' by the mechanism illustrated in Fig. 17, the jigs being inverted during such transfer. The inverted jigs then travel along trackways 58' and 59' until they reach the opposite ends thereof, whereupon they are again transferred in a similar manner to trackways 58 and 59 and returned to the station indicated at 125 in Fig. 1, where an unloading machine and transfer hoist similar to those shown in Fig. 18, but reversely acting, remove the pierced blank from the jig or jigs and return it to the piercing line conveyer 11. Therefore, Fig. 18 may be regarded as an illustration of the feeding-out mechanism as well as of the feeding-in mechanism for the piercing department.

The blanks $j'$, advanced by the jigs in the piercing department, are presented to sets of piercing machines which are grouped along the trackway, (as best shown in Fig. 16), in positions for operating upon the blanks during the stopping intervals. Each stopping point is herein termed a station, at which, successive blanks are presented for piercing operations and then advanced to another station and stopped for other piercing operations which cannot be conveniently performed by the machines at the first station, either by reason of the proximity of the holes to each other, or by reason of their positions with reference to each other. At each station, I prefer to employ piercing machines of simple design, each preferably adapted to operate but one punch. Two of these machines are illustrated in Fig. 19.

*The piercing machines. Their structure and arrangement.*

At each station, the piercing machines, (Figs. 16 and 19), are mounted upon a bed 130 upon which they are adjustable both longitudinally and transversely. For this purpose, each piercing machine has its frame or casing 132 mounted upon a slide 133. Each slide is movable longitudinally along the bed by means of a manually actuated cross shaft 134, pinions 135 and racks 136. The piercing machine frame or casing is mounted in a groove 137 which extends transversely to the bed and the adjacent trackways, whereby the piercing machines may be independently moved toward and away from the trackways by means of an adjusting screw 138 having a swivel bearing at 139 in slide bracket 140. 141 is a set screw for locking the slide to the bed in any desired position of longitudinal adjustment.

Each piercing machine is provided with a set of vertically movable plungers 145 and 146, mounted in forwardly projecting frame members 147 and 148 respectively. The lower plunger 145 carries the die 149. The upper plunger carries the punch 150. Preferably but one die and one punch are employed for each such machine. The die supporting plunger 145 is actuated by means of a lever 155. The punch is actuated by a lever 157. A stripper sleeve 158 is operated by means of a lever 159 and links 160.

The particular connections for actuating the die, punch, and stripper sleeve are not essential to this invention, but it may be assumed that the required movements will be derived from a main bell crank 161 mounted upon the machine frame or casing 132. This bell crank 161 may be actuated from an oscillatory shaft 162, through crank arms 163, channeled beam 164, rod 165, bell crank 166 carried by bracket 140, and an adjustable link rod having screw threaded sections 167 and 168 connected by a turn buckle 169, whereby this link rod may be lengthened or shortened in correspondence with the adjusting movements of the piercing machine frame in channel 137. Channel 172 in beam 164 allows the link rod 165 to move longitudinally along said beam in correspondence with the longitudinal adjusting movements of slide 133. Link rod 165 is provided with bearing collars or flanges 173 and 174 adapted to bear upon the top and bottom surfaces of the channeled beam 164, whereby rod 165 may be moved longitudinally in channel 172 without disengaging from beam 164.

When the die 149 and punch 150 are retracted, sufficient clearance will be permitted to allow the jig clamps 65 and 66 to pass between them. The jig clamps engage the blanks at points where piercing operations are not performed, and by allowing sufficient clearance for these clamping members to pass between the retracted punches and dies, it is possible to adjust some of the piercing machines at points sufficiently close to the trackway for piercing operations between successive sets of jig clamps.

With piercing machines constructed as above described, it is possible to provide a group of machines at each station and operate all machines at all stations simultaneously for piercing operations. The machines of the first group may be arranged to pierce as many holes as can be conveniently formed at one station. The jigs will then be advanced to carry the blank to the next station, where another set of machines, differently grouped, will pierce another set of holes, some of which may be in close proximity to the holes pierced at the first station. The next advancing movement of the jigs carries the blank to the third station where additional piercing operations may be performed, a sufficient number of stations being provided in this department to permit all the required holes to be formed in the blank before it reaches the transfer station where the unloading machine removes the blank and returns it to the piercing line conveyer.

It will be understood that, as each blank advances from one piercing station to the next, it will be followed by another blank carried by another jig, whereby all the piercing machines at all of the active stations in the department may be simultaneously operated, each group of machines operating upon a different blank from those acted upon by the machines in the other groups.

I preferably provide one or more reserve stations at which piercing machines may be provided which are normally inactive. These machines may be quickly adjusted and used as substitutes for any machines at the active stations that may become damaged or inoperative.

In setting up the piercing machines in Department D, a pattern blank may be used in which the required number of holes has been formed. This pattern blank may be advanced from one station to the next and the piercing machines so adjusted that each piercing machine will have its punch and die in position for registry with one of the holes, and a sufficient number of machines grouped for active duty at the respective stations, whereby the requirements of all the holes in the blank may be met, there being one machine adapted for registry with each such hole, at one or another station in the series.

Doweling and shifting operations.

At each station of the piercing department, the jigs will be accurately doweled by means of doweling pins 176, (Fig. 19). These pins will be actuated into and out of doweling position by vertically movable rod 177, link 178, and lever 179, the latter being pivotally supported from the frame at 180 and having a forked lower end loosely engaging a cross pin 181 connected with the doweling pin 176. By locating the stations on the parallel trackways directly opposite each other, two doweling pins may be simultaneously actuated from the same rod 177 for the purpose of positioning the jigs on both tracks. The links 178 may therefore be pivoted to the same cross pin or rod 177 and may be operated as a toggle, thereby relieving rod 177 from reaction pressures.

The means for shifting jigs and track sections from one trackway to another in the piercing department will now be described, (see Fig. 17). During the final movement of the jigs along the trackway shown in Fig. 16, they are received between track sections 182 and 183 which are supported in a frame 184 which is adapted to rotate upon a horizontal axis, said frame being supported at each end by a horizontally disposed shaft or trunnion 185. This frame also carries tracks 182' and 183' alined with the parallel track or way to which the jigs are to be transferred. Gear wheel 61', whereby the jigs are moved along these trackway sections 182 and 183, (or 182' and 183'), is actuated by a shaft section 95' connected by coupling members 187 and 188 with a driving shaft 95''. Coupling member 188 is provided with a groove in which a tongue or rib, carried by coupling member 187, is adapted to slide, the arrangement being such that, when frame 184 is rotated upon its axially supporting shafts or trunnions 185, coupling member 187 may be moved into or out of engagement with said groove in coupling member 188.

Shaft 95' is extended above gear wheel 61' and is provided with a coupling member 187', similar to the member 187, whereby, when frame 184 has been rotated a one-half turn, coupling member 187' may engage member 188 and be substituted as a means for transmitting motion to gear wheel 61'.

One of the shafts or trunnions 185 is utilized as a means for transmitting rotary motion to the frame 184, whereby said frame may be rotated a one-half turn in the direction indicated by the arrow in Fig. 17. Coupling member 187 is received in an arcuate guide 190 in which it travels during the first quarter turn of frame 184, thereby preventing rotation of shaft 95'. On completion of its quarter turn, coupling member 187' is received in a similar guide 191, thereby preventing rotation of the shaft 95' during the second quarter turn. The coupling member 187' is therefore positioned and guided into coupling relation with the coupling member 188 on completion of the half turn movement of frame 184. The jig, or set of jigs, engaged between the track sections 182 and 183 will then have been inverted and will occupy the position indicated by dotted lines at the right hand in Fig. 17. Track sections 182' and 183' will have been substituted for track sections 182 and 183, the latter having moved with the jig and the supporting frame 184 to the inverted position in line with the opposing parallel trackway. Thereupon the jig, or set of jigs, may be advanced, with the blank carried thereby, along trackways 58' and 59' in the opposite direction as indicated by the arrows in Fig. 16.

The next set of jigs and the blank supported thereby will, of course, be received by track sections 182' and 183' when delivered from the tracks 58 and 59. In the meantime, the inverted jig, or set of jigs, will have been advanced along trackways 58' and 59', thereby clearing the track sections 182' and 183', after which, frame 184 may be again inverted to transfer the next blank.

The piercing machines grouped along the tracks 58' and 59' will, of course, be adjusted in correspondence with the requirements of the inverted blank and therefore the inversion of the blank does not interfere with the performance of piercing operations at the proper points. The object in using parallel trackways and transferring the jigs and blanks from one trackway to the other is to economize space and to provide means whereby the blanks may be returned to the line conveyer from the piercing department at points adjacent to the feeding-in mechanism.

*Transferring blanks into Department C. For shaping operations.*

It will be understood that the pierced blanks j'', (Fig. 4), will be delivered successively from each subdivision of the piercing Department B to its associated piercing line conveyer 11 by means of the above described unloading machine and transferring hoist located at station 125. But the blanks j'' from one subdivision of the piercing department will, upon reaching station 200 of the line conveyer associated with that subdivision, be transferred to a forming press conveyer 201, while those from the other line conveyer of the piercing subdivision will be transferred to the forming Department C from a station 207.

Assuming that the blanking presses in Department A are exactly alike, and that the blanks j'' of one of the piercing line conveyers require to be inverted when delivered to the associated forming press, in order that one forming press may produce a right hand side bar and the other a left hand side bar, I employ the transfer hoist shown in Fig. 22 for transferring the blanks which are to be inverted. For the purpose of this description, this transfer hoist may be assumed to be located at station 200. It differs from the hoists shown in Figs. 15 and 18 in the following particulars:

Cross bar 33'' is rigidly secured to the arms 32'' and the electromagnets 35'' are supported from the cross bar by arms 203, the magnets being thereby projected beyond the ends of arms 32'' and beyond the cross bar 33'', the sprocket wheels and chain being omitted. Therefore, when the shaft 31'' is oscillated to carry the electromagnets 35'' to the dotted line position, the blank j'' will be inverted. The arms 32'' will pass between the magnets 202 of cross conveyer 201. The magnets 35'' will be deënergized preparatory to an advancing movement of cross conveyer 201 and shaft 31'' will remain with arms 32'' and cross bar 33'' in the dotted line position until after the advancing movement of conveyer 201 has carried the blank away from the then deënergized magnets 35''. The transferring hoist arms 32'' will then be swung to a raised or neutral position pending the next transferring operation.

The blanks j'' on the other piercing line conveyer 11 are carried to station 207 and transferred to a receiving or positioning rest 209 by a transferring hoist of the same type as that shown in Fig. 15. The blanks transferred at this station are not inverted.

DEPARTMENT C.

*The press feeders and forming presses.*

The blanks transferred to conveyer 201 are delivered to a press feeder 210 by another transferring hoist similar to that shown in Fig. 15, and are delivered by the press feeder 210 between the working members, (punch and matrix), of a forming press 212. The forming press upsets the margins of the blank j'' to form a left hand side bar, after which, this bar is delivered by the feeder to a receiving table 214 and then transferred to main side bar conveyer 216 by a set of transfer hoists similar to that shown in Fig. 15.

Similarly, the blanks received upon the rest 209 are transferred to a feeder 220 which delivers them to forming press 222, wherein these blanks are upset to form right hand side bars. Feeder 220 delivers these bars to a receiving platform 224, from which they are conveyed by a set of transfer hoists to main side bar conveyer 226, this conveyer being employed for the right hand side bars only, and conveyer 216 being employed for left hand side bars only.

The feeder and press illustrated in Figs. 20 and 21 are fully described and claimed in separate applications, but for the purposes of this invention, these mechanisms may be assumed to be of any ordinary construction, in which a feeder is adapted to move a blank longitudinally between the working members of a press and subsequently deliver the blank from between said working members after a forming operation. The principal elements of this feeder consist of a longitudinally movable slide 230 provided with blank receiving and gripping members 231, 232, 233, 234, and 235 respectively, to which the blank may be delivered by the transferring hoist. The slide 230 is also provided with a delivery section having electromagnets 241 adapted to be moved into engagement with the side bar $k$ after a forming operation.

By actuating the slide 230 longitudinally from the position in which it is shown in Figs. 20 and 21, the newly formed side bar $k$ may be conveyed and deposited upon the receiving table 214 simultaneously with the delivery of another blank between the working members of the press. The slide then returns to its initial position, with the electromagnets deënergized and retracted, and with the blank gripping members 231, 232, 233, 234, and 235 also retracted. It will be understood that the upsetting or forming operations of the press will take place in the intervals between successive advancing movements of the conveyers, the transferring operations also taking place during portions of these intervals. For example, when conveyer 201 stops after an advancing movement, a blank may be transferred to the receiving end portion 210 of the feeding slide. While a completed bar is being removed from the table 214, a blank may be simultaneously shaped by the members 212, similar operations taking place also in connection with the press 222. These operations will all be completed in time to be followed by feeding operations of the press feeding slides, and also by a subsequent retraction of such slides in time for each to receive another blank from the feeder supplying transfer hoist.

In the construction shown, the press feeders are each actuated from a driving pinion 245, the motion of which is transferred to the slide through gear wheel 246, crank 247, connecting rod 248, lever 249, and link 250. The gripping members and electromagnets carried by the respective slides may be actuated into and out of operative position from an oscillatory shaft 251 through chains 252 and shafts 253 extending longitudinally of the respective slides. The specific connections between these shafts 253 and the gripping devices and magnets are not material and detailed illustration and description thereof are deemed unnecessary. The same is true as to the specific structure of the forming press, which may be of any ordinary construction suitable for the described purposes.

DEPARTMENT D.

*Bracket connecting operations.*

Department D, (Figs. 23 to 28 inclusive), is divided into two parallel subdivisions, each associated with one of the line conveyers 216 and 226 respectively, and arranged to receive side bars therefrom for bracket connecting operations. In these subdivisions, the side bars $k$ are advanced step by step along trackways similar to those in Department B, and then shifted to other trackways where they are advanced in the opposite direction, shifted, and eventually returned to a station near the receiving station to be transferred back to the line conveyer, the necessary brackets having been applied and riveted in position at the various stations or stopping points in these subdivisions to form the frame elements $m$, (Fig. 6). The trackways in the respective subdivisions preferably extend substantially parallel to the line conveyers with which they are associated and from which the side bars are received.

Each subdivision is provided with jigs 275 having wheels 276 and 277 adapted to travel along trackways 278 and the parallel trackways 279 in the respective subdivisions, each trackway having grooved upper and lower rails along which the upper and lower jig wheels 276 and 277 may respectively travel, as in Department B. But the jigs are not inverted when being transferred from trackway 278 to trackway 279, for the reason that, in Department D, it is desirable to maintain the side bars $k$ in a position with the flanges projecting upwardly at all stations. The means for transferring the jigs from one track to the other without inverting them will be hereinafter described.

The structure of the jig frames and clamping devices is also somewhat different from that of the jigs in Department B, this being made necessary owing to the fact that the side bars have been shaped by the presses in Department C.

In Department D, each jig 275 is provided with one or more supporting posts 285 which carries a horizontal rod 286 upon which a clamping head 287 is mounted. The clamping head is provided with a bar supporting clamping jaw 288 and a relatively movable clamping jaw 289. The transfer hoists located at stations 292 and 293 of the line conveyers 216 and 226 are omitted from the drawings, since they are like those illustrated in Fig. 18. These hoists are adapted to lift the bars *k* when they arrive at the stations 292 and 293 respectively and place them upon the presented supporting jaws 288, the movable clamping jaws 289 carried by the jigs at these stations being then in retracted position. Thereupon, and before the magnets of the transfer hoist are deënergized, these movable jaws 289 will be actuated to clamping position by their operating levers 300, toggle links 301, and jaw supporting levers 302. The operating levers 300 may be actuated by hook rods similar to the hook rods 110 shown in Fig. 18.

After receiving a side bar in either subdivision of Department D, the bar receiving jigs are advanced step by step in said department and presented at successive intermediate stations therein, for bracket placing and connecting operations. In each subdivision, the first advancing step carries the side bar to station 310, (Fig. 1 and Fig. 23), where means are provided for automatically applying brackets which have been previously shaped and provided with rivet holes, whereby they are made ready for connection with the side bars at the proper points.

The bracket placing mechanism is illustrated in Fig. 24, which shows the parallel trackways of one subdivision with the jigs of one trackway in bracket receiving position. At this station, the brackets *m'* may be manually placed upon a rotary carrier wheel 311 which rotates in a horizontal plane and is provided with a bracket receiving rim having electromagnets 312 mounted upon its inner face. Doweling projections 313 upon its outer face are adapted to receive the brackets between them, whereby the electromagnets may hold the brackets in spaced relation to each other. By rotating this wheel step by step, the brackets may be presented successively to an automatic transferring mechanism adapted to remove each presented bracket from the wheel and place it in position for connection with the presented side bar.

The object of the wheel 311 is to provide means whereby a series of brackets may be kept constantly advancing in proper spaced relation to each other and automatically presented to the transferring mechanism. By this means, it is possible to uniformly present the brackets to the transferring mechanism at regular intervals notwithstanding the fact that the operator may deliver the brackets to the wheel more or less irregularly due to the desirability of inspection and a possible rejection of an occasional defective bracket. It is also possible for more than one operator to deliver brackets to this wheel.

Wheel 311 is rotated step by step by a motor 315, its revolution being completed in twelve steps. The motor shaft 316 is a worm shaft which drives worm wheel 317, shaft 318, gear wheels 319 and 320, 341, and 342, and a disk 322 supported from gear wheel 320 by tubular shaft 321. Disk 322 carries a spring actuated latch 323 adapted to enter a socket 324 in a disk 325 connected with wheel 311, said disk having twelve sockets 324 corresponding with the twelve bracket receiving spaces on the rim of wheel 311. Another spring actuated latch 330 carried by the machine frame is adapted to enter these sockets 324 from above. The frame is provided with a stationary ring 328 which is adapted to engage a roller 327 carried by latch 323 and hold the latch in a depressed position except during each one-twelfth revolution of disk 322, when this latch is permitted to move upwardly into engagement with one of the sockets 324 and transmit motion to wheel 311. At all other times, this latch is retracted, and latch 330 is in locking engagement with disk 325 to hold the wheel 311 against movement. Latch 330 is retracted by a projection 331 on disk 322 during the interval that latch 323 is operative.

Wheel 311 is revolved step by step in synchronism with the movements of the jigs in Department D. When a side bar *k* is presented at the transferring station 310, a bracket *m'* is removed from the then stationary wheel 311 and transferred to the side bar by means of a transferring magnet, (or set of magnets), 314. This magnet is supported by lever 335, pivoted at 336 to frame 337 carried by a rotary tubular post 338. Lever 335 is adapted to be swung inwardly and outwardly with reference to the axis of post 338 by means of a rod 346 extending vertically through said post and connected with lever 335 by elbow crank 347 and link 348.

With this construction, I am enabled to push the magnet, or magnets, 314 against a bracket presented by wheel 311, and then, by energizing the magnets 314 and deënergizing the opposing magnet, or magnets, 312, I am enabled to draw the bracket radially from wheel 311, after which, post 338 and frame 337 may be rotated a one-half turn and the bracket then pushed, by an outward movement of lever 335, into assembled relation with the presented side bar *k* and between clamping jaws 351 and 352 carried by the jigs. The movable jaws are thereupon actuated to clamp the bracket and side bar together in such assembled relation.

The vertical movement of rod 346, whereby lever 335 is actuated, may be derived from gear wheel 342, which has a cam groove 340 in its under surface in which a projection, carried by slide 343, engages. The slide is connected with rod 346 by elbow crank 344 and swivel head 345.

The tubular post 338 may be rotated by another slide 349 having a projection engaging a similar cam groove in gear wheel 320. Slide 349 is provided with rack teeth in mesh with the teeth of pinion 350 carried by post 338.

The jig supported, movable, bracket engaging, clamping jaw 353 may be actuated from another slide 354 having a projection engaging a cam groove in the upper surface of gear wheel 342. Slide 354 carries an operating piece 356 adapted to engage and actuate lever 357, the latter being pivoted to the jig and operatively connected with the movable jaw 352 through link 358, elbow crank 359, and the slotted arm 360 of jaw supporting lever 353.

After the bracket has been applied, the jigs are advanced to carry the bar $m$ to station 361 for a rivet inserting operation.

The rivet inserting machine at station 361 is shown in Fig. 23. Where flanged brackets are to be attached to side bar frames, it is customary to insert rivets vertically through the horizontal flange and laterally through the vertical flange, registering holes having previously been provided in the brackets and side bar to receive such rivets. In the rivet inserting machine shown in Figs. 25 and 26, the vertically inserted rivets are pushed upwardly from below through a tube 365 by a plunger 366. The tube 365 is provided at its upper end with a pair of spring actuated centering jaws 370, which are adapted to resiliently engage the shank of the rivet and guide it vertically into the hole prepared for it in the bracket and side bar. The jaws 370 are adapted to yield and allow the rivet head, and plunger 366, to pass between them, whereby the plunger is permitted to drive the rivet home. Each rivet 2001, Fig. 82, will be preferably provided with one or more longitudinally disposed beads or ribs 2002, on its surface, whereby anchorage may be secured in the walls of the rivet holes and the rivets thereby retained after having once been driven home.

The rivets $m''$ may be fed to the machine through a chute 372 provided with escapement mechanism 373, of ordinary construction. The rivets are placed in the chute with the heads down and the escapement mechanism allows one of them to drop into the tubular guide 365 when the plunger is retracted. Preparatory to, or during, the upward movement of the plunger, an encircling sleeve 374 is carried upwardly across the mouth of the chute 372 to prevent a tilted rivet from being pushed into the chute by the plunger during the final portion of its upward movement. This sleeve may be actuated by an arm 375 which also carries a hook rod 376 adapted to operate the oscillatory escapement member 373.

The rivets to be inserted horizontally are similarly fed through a chute 372' into a horizontally disposed guide tube 365', the rivets being inserted by means of a horizontally disposed plunger 366'. This rivet inserting mechanism is similar to that which inserts the rivets vertically, and detailed description is therefore unnecessary.

The specific mechanism illustrated in the drawings for feeding and inserting rivets is not essential to the invention claimed herein, the illustrated rivet inserting mechanism being made the subject of a separate application. It is therefore deemed unnecessary to describe the actuating and motion transmitting connections in exact detail. It will be observed, however, that the vertically disposed rivet inserting plunger is carried by a vertically movable slide 380 and the horizontally disposed plunger 366' is carried by a horizontally movable slide 380', slide 380' being actuated from an oscillatory crank wheel 381 through a connecting link 382, and slide 380 being actuated from said crank wheel through link 383 and lever 384. Link 383', lever 384' and slide 380'' are provided for use where rivets are to be inserted from above. Similarly, sleeve actuating bar 375 is actuated from a vertically movable slide 387 which also derives its motion from said crank wheel through lever 388. This sleeve 374, however, may be dispensed with in the horizontal rivet inserting mechanism, since the rivets in tubes 365' will have no tendency to push upwardly into the chute 372'. In this chute, the rivets descend with their points downwardly, and when they drop into the guide tube 365', the heads will be at the rear in the path of the plunger 366'.

The crank wheel 381 of the rivet inserting machine is driven, (oscillated), from a motor 389 through pinion 390, gear wheel 391, shaft 392, clutch 393, crank wheel 394, and connecting member 395. After the rivets have been inserted, clutch 393 is shifted to connect up gear wheel 396 with shaft 392, whereupon the power of the motor is utilized to retract the entire machine from the trackway by rotating crank wheel 397 a one-half turn, the crank thereon pushing against standard 398 through link 399. Crank wheel 397 has teeth on the reverse side, whereby it may be driven from gear wheel 396 through gear wheel 400 and pinion 401.

The rivet inserting machine is thus retracted preparatory to the conveyer advancing movement, after which, clutch 393 is shifted to neutral position until the next side bar is presented for a rivet inserting operation. Clutch 393 then again connects up gear wheel 396 with the motor, and after again rotating crank wheel 397 a one-half turn, connects up crank wheel 394 for rivet inserting operations.

Any desired number of bracket feeding and rivet inserting stations may be provided. The number will depend largely upon the number of brackets to be applied. In Fig. 1 and Fig. 23, I have illustrated one bracket feeding and one rivet inserting station, followed by a transferring station at the left hand end of the department, where the trackways are mounted upon a turn table 403 in such a manner that when a set of bar supporting jigs have been advanced upon the turn table from station 361, a half turn movement of the table will aline these jigs with the opposing trackway 279, whereby the jigs may travel in the opposite direction along trackway 279 to station 405. At this station, the bars will be presented to rivet heading mechanism adapted to head the vertically disposed rivets, (Fig. 27).

After the vertically disposed rivets have been headed, the jigs are again advanced to station 406 to present the side bar to horizontal rivet heading machines like that illustrated in Figs. 25, and 28.

Standard 407 of this rivet heading mechanism is provided with a swinging head 408 pivotally connected with the standard by shaft 409. The anvil jaw 410, clamping jaws 411, and rivet heading jaw 412 are pivotally supported by levers 413, 414, and 415 respectively from the outer extremity of the head 408 by a pivot pin 416. The upper arms of levers 413 and 414 are connected by links 417 and 418 with a slide 419, the downward movement of which tends to aline links 417 and 418 and transmits motion through the respective levers to close the anvil jaw 410 upon the head of the rivet and to simultaneously close clamping jaws 411 upon the bracket adjacent to the point of the rivet. The clamping jaws 411 comprise forked arms of levers 414 adapted to engage the bracket on opposite sides of the rivet.

While the jigs are advancing the side bar m to station 406, the jaws will be separated and supported in the raised position in which they are illustrated in Fig. 28. The crank wheel 420 has an arm 421 secured to its supporting shaft and connected by lever 422 and link 423 with the fixed portion of the standard at 424, this link 423 resting upon bearing member 425 through which the pivot shaft 409 passes. The crank wheel 420 is provided with a cam groove 426 on its side face, and is also provided with a crank pin 427 having a connecting member 428 pivoted thereto and to a bell crank 429 pivoted to the slide 419. Another lever 430 is pivoted to the head with one arm loosely engaged in cam groove 426 and the other are provided with segment 431 engaging segment 432 on a toggle lever 433 connected with the slide by toggle link 434.

Crank wheel 420 is actuated in the direction indicated by the arrows in Figs. 25 and 28 from a motor 440, motion being transmitted to the cam wheel through the motor shaft 441, bevel gear wheels 442, sprocket chain and wheels 443, and a train of pinions and gear wheels 444 to 448 inclusive, the crank wheel having peripheral gear teeth in mesh with the teeth of pinion 448.

When the parts are in the position in which they are illustrated in Fig. 28, motion of crank wheel 420 in the direction indicated by the arrow in that figure will tend to carry link bar 422 to the right, but such motion will not be possible, since link 423 is in engagement with the bearing member 425. Therefore the head 408 will be pushed to the left in a downwardly swinging movement which will carry the jaws 410 and 412 into position opposed to the respective ends of the rivet. Upon reaching this position, lever 430 will enter the depression in cam groove 426, thereby transmitting motion to the toggle lever and link 433 and 434 respectively to swing them into alinement, push the slide downwardly, and to also swing toggle links 417 and 418 toward a position of alinement with each other, thereby moving the anvil jaw 410 into engagement with the head of the rivet and clamping jaws 411 into opposing engagement with the bracket.

In the meantime, motion will be transmitted from crank 427 through connecting member 428, lever 429, toggle link 450, and rivet heading lever 415 to actuate the rivet heading jaw 412 for a rivet heading operation. The reactionary pressure of bell crank lever 429 upon its pivotal connection with slide 419 will be transmitted through toggle link 417 and lever 413 to the anvil jaw 410, whereby the pressure upon the jaws 410 and 412 will be substantially equalized.

After the rivet heading operation is completed, the continued movement of crank wheel 420 in the direction indicated by the arrow in Fig. 25 will retract jaw 412 and subsequently cause a retraction of the anvil jaw 410 and clamping jaws 411 when the walls of the cam groove 426 at the end of the depression therein push the engaged end of lever 430 outwardly, thereby raising slide 419.

Crank 421 will push links 422 and 423 rearwardly until the crank arm swings into alinement with link 422. The continued rotary movement of this crank arm 421 will draw link 422 forwardly and upwardly until link 423 engages bearing member 425, after which, the head 408 will be pushed upwardly in a swinging movement upon pivot shaft 409 to the raised position in which it is illustrated in Fig. 28.

The head 408 is provided with a weight 460 whereby the swinging movements above described are facilitated.

When the head is swung downwardly, the downward movement is limited by a stop plate 465 which engages a rest 466 on the frame. The arrangement is such that, when stop 465 is in engagement with rest 466, the jaws 410 and 412 are all supported at the proper level for engagement with the rivet. To insure registry of the rivet with these jaws, the jigs are positioned by doweling pins 470 actuated by bell cranks 471 and rods 472. The doweling pins are mounted to slide in tubular guides 473. Similar doweling pins are employed at all of the operating stations in this department.

The mechanism at station 405 for heading the vertically disposed rivets is shown in Fig. 27. The oppositely moving, rivet heading jaws 475 and 476 may be actuated by mechanism similar to that shown in Fig. 38, and if desired, may be moved into and out of actuating position by mechanism similar to crank wheel 397 and associated parts shown in Fig. 25.

After the vertically disposed rivets have been headed at station 405, it is no longer necessary for the clamping jaws 351 and 352 to remain in clamping engagement with the side bar and bracket respectively. I therefore mount a guide 490 upon the trackway 279 in a position to engage and swing the lower end of lever 357 upwardly as the jig approaches station 406, thereby swinging clamping jaw 352 to the raised position in which it is shown in said Fig. 25.

In the foregoing description of Department D, I have described only one bracket transferring and placing mechanism, one machine for heading the vertically disposed rivets, and one machine for heading the horizontally disposed rivets, but it will be observed in Fig. 23 that two rivet inserting mechanisms are illustrated at station 361, whereby rivets may be simultaneously inserted at different points along the side bar m at this station. It may be assumed that two bracket placing mechanisms are employed at station 310, which is only partially illustrated in this figure. Similarly, two rivet heading machines may be employed at station 405, and two machines for heading horizontally disposed rivets may be employed at station 406. Where the nature of the work is complex, the number of stations may be multiplied, it being possible to apply some brackets at one station, rivet them at the stations immediately succeeding it, and then advance the jigs to another bracket transferring and placing station succeeded by additional rivet heading stations. In this manner, the work may be subdivided to such an extent that all of the operations performed at any single station may be reduced to a minimum of complexity.

After the jigs have been advanced the full length of line conveyer 279, they are transferred by another turn table 495, (Fig. 1), back to trackway 278, along which they are advanced to station 497 where transfer hoists similar to those shown in Fig. 18 are employed to retransfer the frame elements m (composed of the side bars and assembled brackets), back to the line conveyer 216, (or 226).

DEPARTMENT E.

*End finishing operations.*

The side bars delivered from Department D to the respective line conveyers 216 and 226 are carried to stations 500 and 501 respectively, from which stations they are transferred to parallel conveyers in Department E, (Fig. 1). The bars are transversely disposed on these conveyers, and are clamped thereto in predetermined positions. The ends of the bars project beyond the conveyers, and each conveyer presents its bars m successively at the different stations in this department to operating machines located at said stations in position for appropriate operation upon the front ends of the presented bars, and also upon the rear ends, if rear end brackets or hangers are desired.

In the construction shown, the front end of each bar is successively presented to trimming, chamfering, grinding, and piercing machines, and then to hanger feeding and placing, rivet inserting, and rivet heading mechanisms.

I prefer to pierce the bar in Department E to form holes for the hanger rivets, instead of attempting to pierce them in Department B, for the reason that, if these holes were pierced in Department B, the distortion in this curved end of the bar which results from the operation of the presses in Department C would be apt to displace the rivet holes and prevent registry thereof with the corresponding holes in the spring hangers to be connected with the bars in Department E. The straight portions of the bar are not subject to material distortion during the shaping operations in Department C, but at the curved ends and in offset portions of the bar distortion usually occurs.

Special piercing mechanisms are required, and these will be described after describing the transfer and conveying mechanisms associated with this department. Thereafter, I will describe the hanger feeding, rivet inserting, and rivet heading mechanisms.

The bars presented by the side bar line conveyers 216 and 226 at stations 500 and 501 respectively, are lifted vertically from these conveyers, swung through an arc of 90 degrees, and deposited upon the relatively fixed or supporting clamping jaws 505 of the Department E conveyers 506 and 507 respectively, each bar thus occupying a position transverse to the line of conveyer movement.

The transferring mechanism comprises a vertically movable, oscillatory shaft 508, the upper end of which carries a horizontal arm 509 from which electromagnets 510 are supported by bracket arms 511. Shaft 508 is located in proximity to the line conveyer with which it is associated, and when a side bar element $m$ is presented by the line conveyer, shaft 508 is oscillated to carry arm 509 to a position parallel with said conveyer, the bracket arms 511 carrying the magnets to positions directly above the side bar element which is to be transferred. Thereupon shaft 508 moves downwardly until the magnets are brought into contact with the side bar.

The magnets are then energized, shaft 508 lifted to raise the side bar from the line conveyer, after which, a quarter turn of shaft 508 will carry the side bar element above the associated conveyer in Department E, i. e., conveyer 507 in Fig. 29. Thereupon shaft 508 again moves downwardly to deposit the side bar element upon the supporting clamping jaws 505 presented to receive it by said conveyer 507. Each supporting clamping jaw 505 has an arm 513 (Fig. 33) carrying a doweling projection 514 adapted to enter a hole pierced in Department B, the arm 513 being arranged to hold the doweling pin in position for registry with such hole. These pins not only insure accurate positioning of the bar on the conveyer, but hold the bar in such position pending the operation of the movable clamping jaws 515 (Fig. 30). After thus depositing a side bar element, magnets 510 may be deënergized, lifted by shaft 508, and supported in a raised position preparatory to another transferring operation.

It will, of course, be understood that the conveyer 507 is advanced step by step and at each stopping point presents another set of clamping jaws in position to receive one of the side bar elements $m$ from the line conveyer 226, the movements of the conveyer 507 being synchronized with those of the line conveyer and the transferring operations taking place during the conveyer stopping intervals.

Any suitable means for automatically actuating the clamping jaws 515 into and out of clamping position may be employed. In the construction illustrated, bell crank arm 516 has an upwardly extending member 517 in a position to engage a relatively fixed projection 518 when the conveyer 507 is advanced to carry the bar from blank receiving position. On striking the projection 518, the bell crank is oscillated until member 517 of arm 516 has been swung backwardly to a point where it will clear said projection. This oscillatory movement of the bell crank will be transmitted through arm 519, bell crank 520, and lever 521 to the jaw 515. Lever 521 and bell crank 520 each have slotted arms to receive pivot pins 522 carried by their respective actuating members. When clamping jaw 515 is in clamping position, it will be locked in such position owing to the fact that arm 519 is then at right angles to the axis of the slotted arm of bell crank 520, and the clamp actuating arm of this lever crosses the line of pivot pin 523 which supports the clamping jaw lever 521.

The actuating bell crank is provided with a third arm 528, which is then in a position to be engaged and lifted at the delivery end of the conveyer in order to effect a release of the completed element $n$ by again swinging the clamping jaw 515 to the raised position in which it is illustrated at the left hand in Fig. 30. A fixed projection 525 adapted for this purpose is shown at the right hand in Fig. 30. The bell cranks above described are so arranged that the clamping jaw will therefore be held in said releasing position until the actuating bell crank arm extension 517 is brought into contact with the projection 518 as the clamp again approaches the blank receiving station. Therefore the unloading operations may be performed after the clamp passes projection 525, and the next loading operation performed before the clamp again reaches projection 518.

Inasmuch as a side bar is delivered to conveyer 507 during each stopping interval, it is obvious that the spacing of these bars on the conveyer will be equal to the length of an advancing step of conveyer 507. Therefore, this conveyer presents a side bar to each operating machine in Department E upon completion of each step, one machine being located at each intermediate stopping point or station in a position for operation upon the curved front end of the side bar. For example, the side bar element $m$ may first be presented to the trimming machine 530, illustrated in plan in Fig. 29, this machine being adapted to cut or trim the end of the bar off squarely.

The bar or element is then advanced to the next station where it is presented to a chamfering machine 532 and the laterally projecting burs or rough edges removed. The next stop brings the element to a grinding machine 534, whereby its extremity is faced off to properly receive a spring hanger. Trimming, chamfering, and grinding machines are in common use and for the purposes of this description it may be assumed that the machines 530, 532, and 534 respectively are of ordinary construction. Therefore no further description is necessary. These machines, however, may each be adjustably mounted upon a bed, as is the case with the piercing machines shown in Fig. 33, whereby each machine may be adjusted to the exact position required for effective operation upon the presented element. The working parts, and also the whole machine, if necessary, will, of course, be retracted from the element during conveyer advancing movements.

After the grinding operation has been completed upon any given element, the latter will be presented by conveyer 507 to a piercing machine 535, (Fig. 29), adapted for horizontal piercing operations upon its upwardly projecting side flanges. This piercing machine is provided with a vertically movable head 536 in which plungers 537 are mounted to slide horizontally. The inner ends of the plungers carry the punches 538. When the element is presented at this station, the head 536 moves downwardly, carrying the die sections 539 and 540 into position between the side flanges of the element. During this downward movement, an arm 541 on the head carries a doweling pin 542 into a hole previously formed for that purpose in the element by one of the piercing machines in Department B. This doweling pin coöperates with the jaw members of the piercing press in accurately positioning the end of the presented element.

Thereupon the punches 538 move inwardly from opposite sides of the element, thereby piercing the requisite number of holes in the side flanges. After the punches 538 are retracted, the head 536 moves upwardly to release the element, and during this movement, die sections 539 and 540 are separated, each section having a guiding member arranged to travel respectively in guiding slots 543 and 544 in a bracket 545. A separation of the die sections permits a discharge of the slugs into an adjustable chute or slideway 547 which is moved into slug receiving position during the upward movement of head 536.

The piercing machine shown in Figs. 31 and 32 is made the subject of a separate application, and further description thereof is deemed unnecessary. It will be understood, however, that, in case all the desired piercing operations cannot be conveniently performed by a single machine at one station, additional machines and stations may be provided, as heretofore described with reference to Department B. The conveyers 506 and 507 may be made of sufficient length to allow of the desired duplications of these machines or of any other machines in the department.

After a side bar element has been horizontally pierced, it is presented by its conveyer to a piercing machine 550 having punches which operate vertically, (Fig. 33). When the element is presented at the station occupied by this machine 550, the presented end thereof will be accurately positioned not only by a die member 551 moved upwardly from below by a plunger 552, but also by a perforated positioning and clamping plate 554 suspended by rods 555 from a frame 556, through which the punching head 557 passes. Frame 556 is actuated vertically through lever 560, links 561, 562, and 563, and rods 564 operating through guides 565 on each side of the overarm 566. The punching head 557 is actuated by plunger 567 mounted for vertical movement in said overarm. The punches 570 move downwardly through the apertures in the positioning and clamping plate 554 for piercing operations after plate 554 has been adjusted in clamping position.

To insure accurate longitudinal positioning of the elements $m$, the die supporting plunger 552 may be provided with upwardly projecting arms 575 having doweling pins 576 adapted to enter holes formed in the side flanges of the bar at the preceding station, (Figs. 33, 34, and 35). These pins may be positively moved laterally into and out of holes by any suitable means, or if desired, the arms 575 may be resilient and the pins sufficiently short and properly tapered to permit them to slip into and out of position by spreading the arms 575 when the tapered ends of the pins strike the bottom of the side bar during the upward movement, and by again spreading the said arms when the pins are withdrawn from the holes which they enter on completion of their vertical movement.

It will be understood that a pin supporting arm 575 will be employed at each side of the element $m$, and also that the frame 556 will be supported by rods 564 located at the respective sides of the piercing machine.

*Hanger feeding and placing mechanism.*

When the side bar elements are advanced from the last piercing station in the series, they are next presented by the conveyer 507 to a hanger inserting mechanism at station 585, (Fig. 29). The hangers $n'$ will have been previously prepared and provided with rivet holes in the extremity of the element formed at the preceding stations in this department. These hangers may be conveniently delivered successively to the hanger inserting mechanism, (Fig. 36), by means of a turn table 586 upon which the hangers may be manually placed, and which rotates step by step to present the hangers successively to the hanger inserting mechanism. The latter is adapted to lift the presented hanger from the turn table, convey it to a point above the front end of the side bar, and then deposit it and accurately position it preparatory to rivet inserting operations which may be performed by the same mechanism immediately after the hanger has been properly adjusted to the end of the side bar.

The turn table 586 may be provided with doweling projections 588 to receive the hangers $n'$, whereby all the hangers on the table will be accurately positioned along equi-distant radial lines, the arrangement being such that, after each rotative movement of the table, one hanger will be presented in a predetermined position in which to receive the pick up fingers or magnets 590, 591, and 592 of the inserting mechanism.

The fingers 590, 591, and 592 preferably comprise electromagnets. The electromagnetic finger 590 has its core projected in the form of a pin 593, the extremity of which is tapered and adapted to enter the aperture in the hanger which receives the coupling pin connecting the hanger with the spring in an assembled vehicle. The electromagnet 592 has a tubular core, through which a doweling pin 589 may pass, which is adapted to enter one of the vertical rivet holes in the hanger. If desired, this pin may be long enough to also pass through the registering rivet holes in the side bar element $m'$ when the hanger is applied to the extremity thereof. The pick up fingers or magnets are secured to a head plate 594 having an upwardly projecting member 595 supported by parallel arms 596 from a set of oscillatory shafts 597 journaled in the standard 598, whereby, when these shafts are oscillated a one-half turn, arms 596 may be swung from a horizontally projecting position at one side of the standard to a corresponding position at the other side. This oscillatory movement may be conveniently derived from a gear segment 600 which actuates gear wheels 601 and 602, rigidly connected with the respective shafts 597. The gear segment 600 may be actuated from a suitable source of power through connecting rod 604.

The arrangement is such that when the connecting rod 604 moves upwardly from the Fig. 36 position, arms 596 will be swung upwardly and backwardly until the pick up fingers or electromagnets are brought into engagement with the spring hanger $n'$ which has been presented by the turn table 586. Thereupon the magnets will be energized, and shafts 597 will then be oscillated in the opposite direction to swing the arms 596 upwardly and forwardly until the head plate 594 is carried to the position in which it is illustrated in full lines in Fig. 36. During the final movement in this direction, the hanger $n'$ will be carried between the flanges of the side bar, as also illustrated in said figure. The pin 589, if employed, will enter the registering hole in the side bar, thereby accurately doweling the hanger in position.

After the hanger has been assembled with the side bar as above described, rivets may be pushed upwardly through a set of feeding tubes 610 by rivet feeding plungers 611, (Fig. 37), these tubes being located directly in line with the rivet holes previously formed at the preceding stations in this department.

The rivets are guided by a set of guiding jaws 612 adapted to embrace the shank of the upwardly moving rivet and also adapted to yield and allow the passage of the rivet head during the final movement of the actuating plunger 611.

The rivet feeding and inserting mechanism is similar to that above described for connecting brackets in Department D, and it will therefore not be necessary to again describe this mechanism in detail. The rivets are fed to each tube 610 through a chute or magazine 613 from which the rivets are delivered, head down, into the feeding tubes 610.

Simultaneously with the insertion of the rivets from feeding tubes 610 through the side bar and hanger from below, another rivet may be inserted laterally through a horizontally disposed feeding tube 615 provided with rivet guiding jaws 617. This tube is supplied with rivets from the chute or magazine 618. A buffer arm 619 depends from the head plate 594 in a position to receive the thrust of the laterally moving rivet delivered through the feeding tube 615. Ordinarily, only one rivet is inserted horizontally through a spring hanger, and this rivet is preferably of sufficient length to extend entirely through the side bar and to project far enough at the opposite side to permit a rivet heading operation. The side bar element $m$ will, of course, be positioned by its bearing against the buffer arm 619, as well as by the doweling pins 593.

The magnets 591 and 592 each have a tubular core adapted to receive the end of the rivet, the doweling pin 589 being pushed upwardly by the rivet, this pin being then free to yield as hereinafter described. The shanks of the rivets $m''$ are provided with biting ribs or teeth adapted to score or groove the walls of the apertures through which the rivets are forced, thereby securing sufficient anchorage in said walls to prevent the rivets from dropping out pending the rivet heading operations.

The doweling pin 589 is connected with one arm of a lever 624 which is fulcrumed at 625 to an arm 626 projecting from the lower end of member 595. The rearwardly projecting arm of this lever is provided with an adjustable bearing screw 627 which, when the parts are in the position illustrated in Fig. 36, is adapted to rest upon a cam 628, whereby, when cam 628 is actuated rotatively, motion may be transmitted through the bearing member or screw 627 and lever 624 to move doweling pin 589 downwardly, this movement taking place simultaneously with the insertion of the hanger in the end of the side bar. The continued rotation of the cam relieves the upward pressure upon the bearing screw 627 in time to allow the rivet inserted from below, (Fig. 37), to push the doweling pin 589 upwardly when the rivet is being inserted through the hole occupied by this pin.

When the head plate is lifted and swung in the rearward direction to pick up a presented hanger from the turn table, the downward movement of arms 596, on the rear side of the standard, not only brings the magnets into contact with the presented hanger, but it also carries the lever 624 into contact with the upwardly projecting end 629' of cam wheel shaft 629, this shaft being received in lever socket 630 shortly before the completion of this swinging movement of arms 596. The lever is therefore actuated to move doweling pin 589 downwardly into the rivet hole at the inner end of the spring hanger simultaneously with the movement of core pin 593 into the bearing sleeve or bushing at the outer end of the hanger. This insures accurate positioning of the hanger preparatory to energizing the electromagnets.

The magnets will be energized immediately after the doweling operation, whereupon a reverse movement of the arms 596 will lift the hanger from the turn table, carry it forwardly, and deposit it in assembled relation to the presented side bar $m$. The movement of the cam 628 then again drives doweling pin 589 downwardly to insure registry of the rivet hole in the hanger with a corresponding hole formed in the side bar $m$ by the piercing machine 550 at a preceding station. After this doweling operation has been completed, and lever 624 relieved from cam pressure, plungers 611 move upwardly to insert rivets through the side bar $m$ and the hanger from below, doweling pin 589 being lifted by the rivet which is being driven home in the aperture occupied by this pin. The plunger 631 simultaneously moves horizontally to insert a rivet transversely through the side bar flanges and the hanger. It will be observed that the buffer arm 619 is forked, the pointed end of the rivet being received between the fork arms.

All of the above mentioned movements may be derived from a motor 635 which drives gear wheel 636 through the motor pinion 637. The movements of the turn table, crank wheel 600, rivet inserting plungers 611 and 631, are all derived from this main driving gear wheel 636 through a system of motion transmitting connections and clutches similar to those illustrated in Fig. 71 and hereinafter described as applicable to all the operating machines. Therefore it is sufficient to here state that the clutches will be shifted at the proper time to start and stop the working mechanism in accordance with the requirements.

I preferably provide the turn table with peripheral gear teeth 640, whereby motion may be transmitted to the cam shaft 629 through pinion 641, immediately after a doweling operation, to position the inserted hanger. The turn table may thus be not only advanced to present another hanger for a transferring operation, but cam 628 may be simultaneously actuated to relieve the pressure upon lever 624 and thus permit the insertion of the rivets. The turn table moves slowly and rotates only a fraction of a turn in order to present the next hanger thereon in transferring position, but before the cam 628 again returns to lever actuating position, it must complete substantially a half turn movement. During this time, the rivets will be driven home and head plate 594 lifted in the course of its rearward movement preparatory to the next operation of transferring a hanger to the succeeding side bar element.

Heading the hanger rivets.

After the rivets have been inserted, electro-magnets 590, 591, and 592 will be de-energized and the shafts 597 oscillated to lift the head plate 594 to a raised position, thereby allowing the conveyer to advance the element $m$ and present another element $m'$ for a hanger inserting operation. The advanced element will thereupon be presented at the next station for rivet heading operations, where it will be again doweled by a doweling pin 644, which enters the bearing sleeve of the spring hanger from below as shown in Figs. 38 and 39.

The rivet heading mechanisms are very simple. The material composing the rivets, and also the material composing the side bars, is sufficiently malleable to permit rivet heading operations without first heating the rivets. Therefore each vertically disposed rivet may be engaged between a pair of jaws 645 and 646 which are so arranged that jaw 645 will act as an anvil, engaging the rivet head, while jaw 646 engages the extremity of the rivet shank and applies sufficient pressure to form a head thereon.

In the construction illustrated in Figs. 38 and 39, the anvil jaw 645 is moved upwardly against the under surface of the bar $m$ by a cam wheel 648 operating through lever 649 and the wedge 650, the latter being adapted to lift the jaw supporting plunger 651.

The rivet heading jaws 646 are actuated from crank wheel 655 through connecting rod 656 and a lever 657 fulcrumed at 658 and having a short arm 659 adapted to actuate a plunger 660 having a head block 661, to the under surface of which the jaws 646 are adjustably secured.

The arrangement is such that the anvil jaws 645 will be first brought into supporting relation to the rivet heads. Thereupon plunger 660 will move downwardly, carrying with it a resiliently socketed clamping rod or bar 662 which engages the upper surface of the hanger, thereby clamping the hanger to the extremity of the side bar between the lower ends of these members 662 and the anvil jaws 645, after which, a continued downward movement of plunger 660 forces jaws 646 upon the upwardly projecting ends of the rivets with sufficient force to head them. During this rivet heading operation, the clamping members 662 will yield resiliently in their sockets, the springs 663 being compressed.

It is not material to this invention whether cam wheel 648 and crank wheel 655 are oscillated or rotated for the purposes above described. In either case, the movement will be continued until the rivet heading operation is completed, and this will be followed by a retraction of the riveting jaws 645 and 646, the jaws 645 being retracted from the rivet heads and the jaws 646 and clamping rod or bar 662 being withdrawn from between the flanges of side bar m preparatory to the next advancing movement of conveyer 507.

Ordinarily there will be only two vertically disposed rivets in the spring hanger, and both of these may be headed at station 665, where the machine illustrated in Figs. 38 and 39 is located. The side bar m will then be advanced from station 665 to station 666, at which station the horizontal rivet will be headed.

The heading machine at station 666 (Figs. 40, 41, and 42), is provided with an anvil jaw 670 and a heading jaw 671, the latter operating between clamping fork arms 672. The anvil jaw is supported by a slide member 674, this member and its coöperating slide member 675 carrying the heading jaw being movably mounted upon horizontally disposed guide rods 676. The slide members are connected with each other by a yoke 677, whereby the motion transmitted to one slide member will be communicated to the other.

The rods 676 are supported by brackets 678 from vertically movable, tubular slides 679 which are guided by cylindrical standards 681. The slides 679 are supported by a set of cam rollers 685 from idle rollers 686 carried by cross shaft 687 at the base of the machine. Each of the cam rollers 685 is provided with a depression 689 in its periphery, whereby, when this depression registers with the idle rollers 686, tubular slides 679 are permitted to move downwardly by gravity, thereby depressing the rivet heading mechanism above described to allow conveyer 507 to remove one completed element m from station 666 and present another element m at such station for a horizontal rivet heading operation.

Following such an advancing movement of conveyer 507, the continued rotation of cam rollers 685 carries cam depressions 689 out of registry with the supporting idle rollers 686, the cam rollers 685 being lifted and their vertical movement being transmitted through the tubular slides 679 to carry the jaws 670 and 671 of this riveting press upwardly on opposite sides of the presented hanger contained in the end of the element m. Thereupon slide members 674 and 675 are moved to the left and clamping fork arms 672 are simultaneously moved to the right, whereby the presented end of the side bar m is clamped between the anvil jaw 670 and the clamping fork arms 672. The rivet heading jaw 671 then moves inwardly between the fork arms upon the unheaded end of the rivet with sufficient pressure to head the same.

The side bar clamping and rivet heading movements above described are derived as follows: The left hand cam roller 685, illustrated in Fig. 40, has its side face provided with a cam groove 690. A lever 691 carries a roller 692 which is adapted to travel along this groove. This lever is pivotally supported from the left hand tubular slide 679 at 693 and has an upwardly projecting arm 691' connected by a link 694 with the clamping jaw supporting lever 695. Lever 695 also has a short arm connected by link 696 with slide member 674, the arrangement being such that, when the upwardly projecting arm 691' of lever 691 moves into alinement with the link 694, clamping jaws or fork arms 672 will be swung into engagement with one side of the presented side bar, the slide 674 simultaneously moving to the left to carry anvil jaw 670 into engagement with the head of the horizontally disposed rivet previously inserted by the machine shown in Fig. 37.

After the end of the presented side bar has been thus clamped between clamping jaws 672 and anvil jaw 670, the heading jaw 671 will be actuated from a cross rod 696' connecting cam rollers 685 at one side of the axis of their rotation. This cross rod is connected by link 697 with a jaw operating lever 698 pivoted to slide member 675 at 699, and having a short arm connected with plunger supporting slide pivotally connected at 700 with the jaw supporting slide 701. This slide 701 is independently mounted upon rods 676, whereby it may be moved inwardly after the clamping jaws and anvil jaw have engaged the work; and after the rivet heading jaw 671 has engaged the rivet, the pressure upon the anvil jaw 670 and the rivet heading jaw 671 will be substantially equalized owing to the fact that lever 698 is fulcrumed at 699 upon slide member 676 which, in turn, is connected with slide 674 which carries the anvil jaw.

After the rivet heading operation has been completed, and before the heading jaw 671 has been materially retracted from rivet heading position, cam depression 689 will pass roller 692, the cam groove 690 being interrupted at this point. Lever 691 and roller 692 will, however, be prevented from shifting not only by the fact that the upwardly projecting arm 691' of this lever is in substantial alinement with the link 694, but also by the pressure of the lever 698 through its fulcrum pivot pin on slide member 675. No shifting movement of lever 691 is possible as long as slide member 675 and its associated slide member 674 are thus held from shifting.

After the rivet heading operation has been completed, and the continued rotation of cam rollers 685 has caused a retraction of lever 698 and rivet heading jaw 671, cam groove 690 in which roller 692 is then engaged, will actuate the lever 691 for a clamp releasing and anvil jaw retracting operation when roller 692 reaches the outwardly offset portion 702 of cam groove 690. Immediately thereafter, the depressions 689 in cam rollers 685 will register with the supporting idle rollers 686, thereby permitting a depression of tubular slides 679 and all of the associated parts at the upper end thereof, including the rivet heading jaws and the clamping jaws. All parts of the machine will then be below the level of the element $m$, whereupon the conveyer 507 will again be actuated one step to advance said element and present another side bar element $m$ for a rivet heading operation upon the cross rivet of the spring hanger.

The side bars advanced from station 666 are next presented at station 705 for a planishing operation. The planishing machine at this station may be of ordinary construction, except that it is provided with means for advancing it to working position and retracting it after the planishing operation has been completed, and preparatory to the next advancing movement of conveyer 507. It is therefore not deemed necessary to illustrate or describe the planishing machine in detail.

After the planishing operation, each completed element $n$ is again advanced to station 706, where a transferring mechanism, similar to that at station 501, (Fig. 29), again transfers it to the line conveyer 226 from which the element was received at station 501. This line conveyer carries it to transferring station 707 where another transferring hoist, similar to that shown in Fig. 18, delivers the bar or element to cross conveyer 708.

Similarly, the elements carried by line conveyer 216 will be transferred to subdivision conveyer 506 in Department E and returned to the line conveyer 216 with the spring hangers attached, after which, they will be carried to station 709 and transferred to cross conveyer 708 upon which they will be deposited in positions midway between the right hand side bars or elements delivered to this conveyer from line conveyer 226.

DEPARTMENT F. AUXILIARY.

It will be observed that the completed side bar elements $n$ on line conveyer 226 and 216 will be conveyed along an auxiliary Department F before reaching cross conveyer 708. Department F contains sets of machines similar to those in Department D and it may also contain, at some of these stations, piercing machines similar to those in Department B, whereby, in case the number of machines in Departments B and D is inadequate or in case any of the machines in said departments become inoperative, the side bar elements may be transferred to, and passed through Department F and presented to substitute machines or to additional machines of similar character to those in Departments B and D.

Cross conveyer 708 carries both the right and left hand side bars or elements $n$ to an assembly conveyer 710. Conveyer 708 preferably extends underneath conveyer 710, whereby workmen on opposite sides of conveyer 710 may lift the right and left hand elements respectively and deposit them upon the assembly conveyer. For example, the left hand elements may be lifted by workmen standing at the left hand side of conveyer 710 and deposited thereon, while other workmen at the right hand side of conveyer 710 are similarly lifting a right hand element and depositing it upon the assembly conveyer in a position parallel to the left hand element and at a proper distance therefrom to permit the insertion of the cross bar elements as hereinafter explained.

The side bars $n$ may be automatically transferred to the assembly conveyer by means of hoists similar to those shown in Fig. 15, but I prefer to have this work done manually in order that the work may be inspected and corrections made, if necessary, before the bars enter the assembly departments.

*Cross bar forming departments.* (a)

The operations of blanking, piercing, and shaping the cross bars, and connecting gussets and brackets thereto are so similar to those above described with reference to the side bars, that detailed illustration and description of the various mechanisms employed are deemed unnecessary, except as to certain distinctive methods and mechanisms for handling the cross bars and presenting them to the operating machines.

The cross bars are relatively short and more easily manipulated than the side bars. The Blanking Department $a$, Piercing Department $b$, and Forming Department $c$ in the cross bar department correspond closely to Departments A, B, and C in the side bar department, both as to the nature of the operations performed, and the means for performing them. The cross bars are advanced from one department to another by a suitable line conveyer, but owing to their short length and light weight, it is not only possible to operate the line conveyer or conveyers either step by step or continuously, but it also is possible, in some of the departments, to employ turrets for presenting them successively to the various operating machines in such departments instead of using jigs which advance along straight trackways. The transferring operations may be either automatically or manually performed as may appear convenient in any given installation, and if desired conveying mechanism similar to that employed for the side bars may be used, both in the departments and in the connecting lines, the operating machines being grouped accordingly. But the arrangement illustrated is preferred.

Referring to Fig. 1, it will be observed that a series of blanking presses 750 are located adjacent to the front or receiving end of line conveyer 751. The material from which the cross bars are to be formed is fed into these blanking presses in the form of elongated strips or sheets from which each press cuts blanks successively.

It is not essential to this invention, whether the strip or sheet is fed to the blanking presses manually or automatically, but after each cutting operation of the press, the resulting blank may be transferred automatically from the press to the conveyer 751 by mechanism similar to that illustrated in Fig. 14, but preferably operating longitudinally of the matrix. Each of the blanking presses in Department $a$ may be assumed to be also similar to that illustrated in Fig. 14, but the punch and die of each press will, of course, correspond in shape to the contour of the blank to be formed by such press.

In Fig. 1, I have illustrated a series of blanking presses 750 in Department $a$. In this description, however, it will be assumed that only three of these presses are in operation, it being assumed that vehicle frames in which only three cross bars are employed are to be produced by the apparatus. Each press will therefore have its punch and die arranged to cut a blank of the required contour for forming one of these cross bars, and each press will have its blanks $r$, $r'$, $r''$ respectively delivered to the conveyer 751, on which the blanks are preferably disposed transversely.

In order that the blanks may be grouped upon the conveyer 751, with each group containing one cross bar blank for each cross bar in the frame to be constructed, conveyer 751 is advanced at each step a distance equal to the distance between centers of the blanking presses 750, plus, (or minus), a distance equal to the desired spacing between the blanks on conveyer 751. The conveyer may be provided with sets of electromagnets 752 to receive the blanks, and if desired, it may also be provided with doweling projections, whereby blanks deposited upon the conveyer with reasonable accuracy may be shifted to a limited extent and accurately positioned. Therefore, by doweling the conveyer at the several stations or stopping points, as heretofore described with reference to the side bar forming department, accuracy in presenting the blanks to the transfer hoists may be secured.

DEPARTMENT $b$.

*Cross bar piercing.*

The blanks $r$ of the respective groups will be successively presented at the receiving station 760 of a turret 761 in the piercing department, (Figs. 1, 43, and 44). The blank $r$ upon arriving at station 760, will be engaged by the electromagnets 764 of a transfer hoist similar to that shown in Fig. 29 for transferring side bars into Department E, except that the magnets 764 are supported from a horizontally swinging arm or beam 765 of this hoist by a magnet supporting cross rod 766 having magnet supporting arms 767, so disposed that, when the arm 765 is swung to the oblique position with reference to the conveyer in which it is shown in Fig. 43, the magnet carrying rod 766 will be disposed transversely to the conveyer and adapted to carry the magnets 764 into contact with the blank presented at station 760. When the hoist is raised and oscillated for a transferring operation, the blank will be swung over the table at 760 and inserted between a set of clamping jaws 772 and 773 supported from the turret by a slide 774. (Figs. 44 and 45.)

The lower clamping jaw 772 is rigidly connected with the slide 774. The upper clamping jaw 773 is pivotally connected with the lower jaw at 775 and is actuated into and out of clamping relation to the lower jaw by means of an operating hook arm 777 connected with the turret frame by a link 778 and adapted to transmit motion to the jaw 773 through bell crank 779 and toggle link 780, (Fig. 44). A coöperating hook rod 781 at station 760 is adapted to push upwardly on link 778 to actuate the jaws to clamping position. A similar hook rod at the turret delivery station 782 is utilized to adjust the clamping jaw 773 to releasing position by pulling downwardly on the hook 784 at the lower end of the rod or bar 777.

The clamping jaws 772 and 773 may have concave and convex surfaces respectively as shown in Fig. 45, whereby the blank may be indented and thus held rigidly in position. When in clamping position, the jaws 772 and 773 are held in such position owing to the substantial alinement of link 780 with the arm of the bell crank 779.

It will be observed in Fig. 43 that a pair of clamping jaws are provided for each section or segment of the turret. In the construction illustrated, each turret is provided with a horizontally rotating frame subdivided into twelve segments or sections, of which two sections are shown in Fig. 43. Each section carries a slide support or mounting 790, (Fig. 44), along which the jaw supporting slides 774 may be adjusted.

Doweling slides 791 and 792 are also employed, (Fig. 43). Slide 791 is provided with a slotted arm 793 longitudinally adjustable upon the slide and provided with doweling projections or pins 794, between which, one corner of the frame bar $r$ will be engaged during the final movement of the frame bar between the clamping jaws. The rear margin of the frame bar will be received by a doweling or locating projection 801. The blank $r$ is therefore accurately positioned between the clamping jaws before the movable jaws are actuated into clamping position. All the slides will, of course, be locked in fixed relation to the mounting 790 after having been properly adjusted.

The slide mounting 790 has a cross bar 786 secured to its under surface and adapted to be received between fixed fork arms 787 carried by a standard 788 through the head of which a doweling pin 789 may be forced upwardly into an aperture or socket in the slide mounting 790 when the turret is brought to rest, thereby accurately positioning the turret and particularly the mounting carried thereby.

After the blank has been delivered to the turret at the receiving station 760, doweling pin 789 will be retracted and the turret will be rotated one-twelfth of a revolution, thereby presenting the blank to the piercing machines 795 illustrated in Fig. 43. This movement of the turret presents another segment thereof at the receiving station to receive a succeeding blank $r$ which will then be advanced in turn to the piercing presses 795, the first mentioned blank being meanwhile advanced another step and presented to another set of piercing machines at the next turret station. The turret being divided into twelve segments, it is obvious that piercing machines may be located for operation upon blanks carried by ten of the segments, the other two segments being presented at the receiving and delivering stations 760 and 782 respectively. At the delivery station 782, a transferring hoist similar to that located at the receiving station 760 returns the pierced blank to the conveyer.

If desired, the movable clamping jaw 773 may be arranged to operate under resilient pressure, whereby a degree of accommodation is permitted in case of variation in the thickness of the blanks. This clamping mechanism is illustrated in Fig. 45 in which it will be observed that jaw 773 has a rearwardly projecting arm 796 pivoted at 775 to the lower jaw arm 774 and indirectly connected with toggle link 780 by a lever 797 pivoted to arm 796 at 798 and resiliently connected with the rear end of arm 796 by a hanger bolt 799 and compression spring 800 interposed between the headed lower end of the bolt and the under surface of arm 796 near its rear extremity. This type of clamping jaw may, if desired, be employed in side bar piercing Department B and in any other department where clamping jaws of similar character are employed.

The blanks $r'$ are similarly transferred at station 760' to turret 762 and return to the line conveyer at station 782'. In like manner, the blanks $r''$ are transferred to turret 763 at station 760'', and returned to the line conveyer at station 782''. The operations performed on the blanks $r'$ and $r''$ are similar to those performed on the blanks $r$, but it will be understood that in each case, the operating machines will be grouped about the turret in accordance with the requirements of the blank that is delivered to that turret.

DEPARTMENT C.

*Cross bar shaping.*

The pierced blanks delivered from turret 761 to the line conveyer 751 are advanced to station 805 where a transfer hoist similar to that disclosed in Fig. 29 delivers them to the feeder of a press 806, (Fig. 1), located on the opposite side of the conveyer in forming Department c. This press and its associated feeder is similar in all respects to that disclosed in Fig. 21, except that the gripping and supporting devices of the feeder, and also the plunger and matrix of the press, conform to the requirements of the cross bar blank. At the delivery end of the press feeder, the cross bar is again transferred back to the line conveyer by another hoist similar to that shown in Fig. 29.

The cross bar blanks $r'$ are delivered at station 760' in like manner to turret 762 of the piercing department, and after being pierced, are returned to the line conveyer and subsequently transferred into the forming Department c, where they are received by the feeder of a press 808, and after being passed through the press, are returned to the line conveyer.

In the same manner, the blanks r'' are delivered at station 760'' to turret 763, pierced, returned to the line conveyer, and delivered to the feeder of press 809, and after being passed through this press, are returned to the line conveyer. Idle turrets and piercing presses are indicated in Departments b and c in the general plan of the apparatus as illustrated in Fig. 1. These are not numbered, and are used only in case frames are being constructed which have more than three cross bars, or in case a turret or a portion of the working machinery at the active stations should fail to operate.

The various turrets and presses are so located with reference to the line conveyer 751 and the feeding and transferring mechanism is so proportioned and arranged as to preserve the grouping of the blanks upon the conveyer 751 throughout its length. The cross bars s, s', s'' delivered from the forming presses in Department c will therefore be grouped upon the line conveyer in the same manner that the blanks r, r', and r'' are grouped thereon.

DEPARTMENT d.

Cross bar lapping.

The cross bars s, on being advanced by the conveyer 751 to station 812, are delivered to a turret 813 in Department d by transfer mechanism similar to that illustrated in Fig. 43. The cross bars s' are similarly delivered at station 812', to a turret 814 and the cross bars s'' are in like manner delivered at station 812'' to turret 815. These turrets are similar to the one disclosed in Figs. 43 and 44, except that the clamping jaws are adapted to the requirements of the bars, the latter having been provided by the presses of Department c with upset side flanges. The clamping jaws utilized for the turrets in Department d may, however, be similar to those disclosed in Fig. 30.

The turrets in this department present the respective cross bars s, s', and s'' to lapping presses or folding machines adapted to fold or bend the projecting lips or flanges on the ends of the cross bars into positions whereby they are adapted to facilitate connecting the cross bars with the side bars in the assembly department. In this department also, additional piercing operations may be performed by machines suitable for this purpose, such, for example, as the machine shown in Fig. 33.

The folding or lapping press, however, is of special construction, and it is therefore illustrated in Figs. 46 and 47. This machine is made the subject of a separate application, and therefore only its general features will be herein described, the structure of the machine not being claimed herein. In the lapping press, a pair of yoke shaped slides 817 and 818 are mounted for opposite vertical movement on a supporting guide post 819. One arm of the lower slide 817 is extended and provided with a table 820 having an adjustably mounted, upwardly projecting, clamping jaw 821 adapted, when slide 817 is moved upwardly, to travel along the outer face of one of the side flanges of the presented cross bar.

The upper slide 818 is provided with a head plate 823 having a clamping jaw 824 mounted to slide in the head plate 823, whereby this jaw may approach and recede from jaw 821 when these two jaws are brought into opposing position. Jaw 821 is connected with an actuating wedge block 825, whereby the jaw 824 may be moved back and forth in the head groove. The inner face of the wedge block 825 is obliquely inclined and the outer face of jaw 821 is correspondingly inclined, the wedge block being in a position to bear upon and move along the upper face of jaw 821 when the yokes 817 and 818 are moved toward each other.

When the cross bar is presented to this press, the yokes 817 and 818 are retracted sufficiently to allow the cross bar to pass between the jaws 821 and 824, after which, said yokes move toward each other, jaw 821 engaging wedge block 825 during the final upward movement of yoke 817 and the final downward movement of yoke 818. Wedge block 825 is thus pushed slightly to the right, thereby actuating jaw 824 into clamping relation to the upturned flange of the side bar. This will be accomplished in proximity to one end of the side bar having its side flanges extended to form a projecting ear, such, for example, as is illustrated at ss in Fig. 47.

When slide 818 is moved downwardly to carry clamping jaw 824 to clamping position, an oscillatory lapping jaw 827 is simultaneously carried into position to bear upon the outer face of the projecting ear ss in close proximity to the upwardly movable wedge jaw 821. This lapping jaw is connected with a head disk 828 carried by an oscillatory shaft 829 journaled for oscillatory movement in the arms of the yoke 818, the arrangement being such that, after the cross bar flange has been engaged between clamping jaws 821 and 824, a one-quarter turn of shaft 829 will fold ear ss inwardly from the position in which it is shown in full lines in Fig. 47 to a position projecting inwardly at right angles thereto as indicated in Fig. 48.

The slides may be actuated from a crank wheel 830 through a connecting rod 831, shaft arm 832, rock shaft 833, arms 834 thereon, upper and lower links 835, levers 836, and links 837, the latter being pivoted to the respective slides 817 and 818 and connecting them with the lower and upper levers 836 respectively. The shaft 829 may be oscillated from a crank shaft 840 through crank 841, link 842, and arm 843 connected with a collar 844 splined to the shaft and adapted to allow the shaft to move vertically through it when the yoke 818 is actuated.

Crank wheel 830 and crank shaft 840 may each be driven from any suitable source of power through a pulley 845, shaft 846, tubular worm shafts 847, having worm threads 848 adapted to engage worm wheels mounted on crank wheel 830 and crank shaft 840 respectively, clutches indicated at 850 and 851 being employed to connect driving pulley 845 with either tubular worm shaft. It will be understood that the driving pulley will first be connected with crank wheel 830 for a clamping operation, after which, this crank wheel will be released and the pulley connected with crank shaft 840 for the lapping operation.

DEPARTMENT e.

*Cross bar gusset assembly.*

After the end finishing or lapping operations have been performed in Department d, the cross bars are returned to the line conveyer 751 by transfer hoists similar to that illustrated in Fig. 43. The conveyer 751 then advances these bars to Department e, where the bars t and t' are delivered to another set of turrets from stations 854 and 854' respectively, the transfer mechanism here employed being a modification of that illustrated in Fig. 43. It is desirable at these stations 854 and 854', to swing the bars during the transferring operation from a position with their side flanges projecting upwardly to a position on the turret with the side flanges projecting horizontally. Therefore the supporting post 769' of this transfer mechanism is tubular in form and contains a shaft 855 adapted to drive a shaft 856 on the horizontally swinging arm 765' through bevel gears at 857. Cross rod 766' is adapted to be oscillated in its supporting bearings by means of these shafts 855 and 856, the latter being operatively connected by bevel gears at 858 with the oscillatory cross rod 766'. The electromagnets 764' are formed to engage in the angles between one of the side flanges of the cross bar and the web, whereby the cross bar may be lifted, oscillated a one-quarter turn, and positioned upon supporting clamping jaws 859, carried by the turret 860, (or 861). The supporting clamping jaws 859 are associated with the movable clamping jaws 515', similar to those shown in Fig. 30, said clamping jaws being pivotally connected with a jaw actuating lever 521' as best shown in Fig. 49. This jaw actuating lever has one arm in slotted pivotal connection with a motion transmitting crank arm 863 connected with oscillatory shaft 863' and operated by means of an arm 864 loosely engaged by an actuating fork 864', the arrangement being such that a downward movement of the fork will swing the movable clamping jaw 515' to clamping position in which it is shown in Fig. 49, the upward movement of this fork, or of a similar fork, being adapted to swing the clamping jaw to releasing position.

After the cross bar has thus been delivered to a turret in Department e, and clamped to supporting jaws 859 thereon, said turret is rotated step by step in the same manner as heretofore described with reference to Departments b and d, and the cross bar is presented to gusset applying mechanism similar to that illustrated in Figs. 51 and 52, the positioned gussets being thereupon clamped to the cross bar and carried by the turret to rivet inserting and rivet heading mechanisms grouped about the turret, and which may be assumed to be similar in character to those disclosed in Figs. 25 to 28 inclusive.

The mechanism shown in Fig. 51 will ordinarily be located at the first turret stopping point beyond the receiving stopping point or station at which the cross bar is transferred to the turret, as illustrated in Fig. 50. This mechanism includes a gusset receiving head 865, preferably provided with electromagnetic clamping devices 865' adapted to hold the gusset v upon the head 865 in contact with a stop 865''. The head is supported by a rod 866 mounted to slide in a tubular upper portion of a swinging arm 867 pivoted to a suitable shaft at 867'. The lower end of the rod 866 is connected with the lower end of the swinging arm 867 by a set of toggle links 868 and 868', the end pivot pins of which are connected by a tension spring 870.

When the arm 867 is swung inwardly to the gusset receiving position, indicated by dotted lines in Fig. 51, a stop 871, carried by the base, engages toggle link 868' and straightens out the toggle against the tension of spring 870, thereby raising the head 865. The gusset v may then be applied either manually or mechanically and the electromagnet 865' energized to retain the gusset in position, after which, the arm 867 may be swung inwardly it oscillating upon the pivot shaft 867', thereby carrying the gusset between one of the side flanges of the cross bar and a clamping jaw 872 carried by the turret. When the gusset is pushed inwardly above this clamping jaw, and between it and the side flange of a presented cross bar, it will occupy the position indicated by the dotted lines at $v'$ in Fig. 51, the gusset being slightly tilted, as shown, in order that its inner margin will not strike the cross bar while it is being swung to this position.

When the gusset reaches the position indicated by dotted lines $v'$ in Fig. 51, the swinging arm 867 will be completing its forward movement in this direction, and immediately after the gusset reaches its dotted line position, toggle link 868' strikes stop 871', thereby tripping the toggle and allowing the spring 870 to pull shaft 866 and head 865 downwardly with the presented gusset $v$ into the position indicated by full lines in Fig. 51, the gusset being then in a horizontal position with its inner marginal portion resting upon clamping jaw 872. Thereupon magnet 865' may be deënergized, and an electromagnet 872' carried by jaw 872 may be energized to securely hold the gusset upon said jaw with its inner margin bearing against stops 872'' against which the side bar also bears.

After the gusset has thus been properly positioned upon clamping jaw 872, the presented side bar is clamped to the gusset by this clamping jaw, acting in coöperation with an upper clamping jaw 873, said clamping jaws being respectively connected with supporting levers 874 and 874', which have their rearwardly projecting arms connected with each other by toggle links 875 and 875'. These toggle links are actuated into and out of alinement by vertically movable hook rod 876, link 876', elbow crank 877, and link 877'. The arm 867 is swung to carry the head 865 into gusset receiving and gusset placing position respectively by means of a rod 878, elbow crank 878', and link 879.

It will be observed in Fig. 52 that the clamping jaw 872 is formed to engage the gusset near opposite margins thereof, leaving the central portions of the gusset, along the under side of the cross bar, exposed for the reception of connecting rivets. Therefore after the gusset has been positioned by the mechanism shown in Fig. 51, it is obvious that it may be presented step by step to rivet inserting and rivet heading machines, whereby the gusset may be permanently connected with the cross bar as above explained. When the cross bar has completed the circuit of the turret, it will have been provided with all necessary gussets or brackets, after which, it will be returned to the conveyer 751 by a transfer hoist similar to that illustrated in Fig. 50, but operating reversely.

DEPARTMENT $f$.

Cross bar bracket assembly.

In this description, it is assumed that the cross bars $t$, $t'$ are provided with gussets, thereby forming frame elements similar to those illustrated in Fig. 12. It may also be assumed that the cross bars $t$ are to be provided with brackets $w$ as illustrated in Fig. 13. This work may be done in connection with the turret 862 in Department $f$. The mechanism will be substantially the same as that employed for applying and securing the gussets, and further description is therefore deemed unnecessary. Where the brackets $w$ are applied to the central web, it may be desirable to carry the cross bars on the turret with the side flanges projecting upwardly, in which case, of course, the type of transfer hoist illustrated in Fig. 43 will be employed instead of the hoist illustrated in Fig. 50.

Assuming that it is desired to construct a frame in which no bracket is applied in Department $f$, the apparatus may be operated without supplying material from which to form the blanks $r''$ until a sufficient number of blanks $r$, $r'$, have been produced to fill the turrets 860 and 861, after which, material may also be supplied to the third blanking machine to produce the blanks $r''$. For example, if the turrets in Department $e$ have ten operating stations and stopping points, and no turret is being operated in either this department or Department $f$ for the blanks $t''$, then ten blanks $r$ and $r'$ will be formed before commencing to produce the blanks $r''$.

DEPARTMENT G.

The assembly conveyer and transferring mechanism.

The assembly conveyer 710 and its relation to the cross conveyers 708, 870, and 871 is best illustrated in Figs. 53, 54, and 55, the latter showing the assembly conveyer in cross section.

It will be observed in Fig. 54, that the side chains 880 of this conveyer are connected by cross flights 881 to which upwardly projecting forked members 885 are secured, the fork arms 886 and 887 diverging slightly at their outer extremities, and being adapted to receive the side bar elements $n$ between them.

A sufficient number of members 885 are provided to adequately support the side bars in substantially horizontal, parallel positions, the right and left hand elements being disposed, in the construction illustrated, adjacent to the left and right hand sides of the conveyer respectively, and being spaced apart at a little greater distance than the width of the frame to be completed. Positioning members 890 and 891 are secured to the cross flights 881 of the conveyer and adapted to bear upon the ends of the respective side bars when the latter are mounted upon the conveyer. These positioning members 890 and 891 are provided with inclined bearing faces adapted to guide the side bar longitudinally into an exact predetermined position with reference to the conveyer and with reference to the other side bar thereon.

Similarly, the conveyer is provided with sets of forked supporting members 895, adapted to receive the completed cross bars $u$, $u'$, $u''$, also manually delivered to the assembly conveyer from the conveyers 870 and 871. The members 895 are provided with inclined guiding fingers 896 in which the ends of the respective cross bars may slide into accurately positioned relation to the supporting members 895, the latter serving to determine the positions of these cross bars or elements with reference to the side bars or elements $n$, whereby, when the side bars and cross bars of any given set have been placed in the forked members 885 and 895, these frame elements will occupy a position of open or loose assembly, the side bars being separated from the ends of the cross bars as shown.

Assembly conveyer 710 is an endless chain or belt conveyer and is advanced step by step, carrying the assembled bars upon its upper surface to station 900, where all the bars of the presented set are simultaneously transferred to an assembly jig or clamping carrier on which they are clamped in assembled relation and advanced in Department H for connecting operations. Means for thus transferring sets of bars at station 900 are illustrated in Fig. 60, and comprise a crane, the car 902 of which travels along an overhead track 903 disposed transversely across conveyer 710 and the trackway 905 of the assembly department.

A frame 906 is suspended from the car 902 by means of levers 907, links 908, and hanger bars 909, the inner ends of the levers being connected by links 910 with a cross roller or rod 911, the position of which is controlled by a cam 912, or a set of similar cams, supported by a cross shaft 913. Frame 906 tends to drop by gravity and is prevented from doing so by the cam or cams 912 bearing upon the roller 911. It is therefore obvious that, when the cam 912 is rotated, roller 911 will move upwardly as it approaches the short radius of the cam and the frame will move downwardly, but, as the bearing radius of the cam increases in length, roller 911 will be forced downwardly and its motion transmitted to lift frame 906.

Frame 906 carries a set of frame bar gripping devices adapted to simultaneously engage all the frame bars of a set of bars presented at station 900. In the construction illustrated in Fig. 60, these gripping devices are not electromagnetic, but are adapted to mechanically engage the bars and clamp them in rigid relation to each other and to the frame 906.

By providing frame 906 with tubular hangers 915, having fixed depending clamping jaws 916 and movable clamping jaws 917 supported by levers 918 fulcrumed at 919 to the lower end of hanger 915, I am enabled to actuate the movable jaws by rods 920 extending through the hangers. The jaws 916 are formed to bear upon the flat or smooth side face of the frame bar to be engaged and also upon another face of the bar at right angles thereto, i. e., the top face of the upper side flange in the construction illustrated. The jaws 917 are adapted to swing inwardly between the side flanges when the operating rods 920 are drawn upwardly.

The clamping jaws which engage the cross bars are constructed in the same manner but are disposed at right angles to those which engage the side bars and are also so disposed as to engage the central portion, or portions, of the cross bars.

Any desired number of these clamping devices may be employed. I preferably provide at least two of them for each side bar and there will, of course, be at least one of them for each cross bar. The operating rods 920 of the movable jaws of the side bar clamping devices are actuated from cam shaft 913 through pinion 922, (Fig. 56), gear wheel 923, cam 924, (Fig. 58), connected to rotate therewith, arm 925, rock shaft 926, bevel gears 927, shaft 928, arms 929 thereon, (Fig. 60), links 930, and elbow cranks 931. The operating rods 920 of the cross bar clamps may be actuated directly from shaft 928 through arms 929 pivotally connected with the upper ends of the links 920.

Cam shaft 913 may be actuated from a shaft 935 disposed parallel to the trackway 903. The car 902 carries a depending bracket 936 having a vertical shaft provided with bevel gears 937 and 938 on its respective ends. Gear wheel 938 is in mesh with a bevel pinion 941 on cam shaft 913. With this arrangement, I am able to transmit motion to the cam shaft in any position of the car on trackway 903 from a shaft parallel to said track and mounted in stationary bearings along the trackway.

Car 902 is reciprocated along the trackway by a cable 945 running over pulleys 946, both ends of the cable being connected with an actuating drum.

The operation of the transfer crane above described is as follows: When a set of frame elements has been advanced along trackway 710 in Department G to station 900, the crane will have been adjusted at said station with the clamping devices in positions indicated in Fig. 60. The rotation of shaft 913 will thereupon present progressively shortening radii on cam 912 to roller 911, thus allowing frame 906 to descend until the clamping jaws 916 bear upon the frame bars with which they are alined. Thereupon cams 924 will oscillate shafts 926 to swing the movable clamping jaws 917 into clamping relation to the respective frame bars or elements. This clamping movement of the jaws 917 will take place while frame 906 is at the limit of its downward movement, the portion of the cam 912 concentric to shaft 913 at the shortest radius being then in engagement with the roller 911, whereby frame 906 is held in the stationary position pending the clamping operation.

When the clamping operation is completed, cam 912 will depress roller 911, lifting frame 906 with the engaged bars, and, when clear of conveyer 710, car 902 may then be actuated through the cables 945 to carry the set of frame elements or bars to a position above trackway 905. It will be observed that cam 912 is provided with a long radius portion also concentric with shaft 913. This portion bears upon roller 911 during the transferring movement of car 902.

When car 902 is brought to rest above trackway 905, the cam, or cams, 912 allow frame 906 to descend and deposit the frame bars upon a jig 950 in Department H and which is also presented at station 900 on trackway 905. This jig is provided with supporting clamping jaws 951 and 952 adapted to receive the side bar and cross bar elements respectively. When the frame elements are thus deposited upon the receiving jaws 951 and 952, motion will be transmitted from cam shaft 913 through the connections above described, and cams 924 to again oscillate shaft 926 and swing the movable jaws to open position, after which, frame 906 will be lifted and returned to its initial position above conveyer 710, leaving the transferred frame elements on jig 950 in the same positions with reference to each other that they occupied on assembly conveyer 710.

DEPARTMENT H.

*Clamping the elements in assembled relation on the jigs.*

After the supporting jaws 951 and 952 of assembly jigs 950 have received the frame elements, i. e., the side bars and cross bars respectively, all these elements are clamped to their respective supporting jaws by movable clamping jaws 960 and 960'. These jaws 960 and 960' preferably move into clamping relation with the side bar and cross bar elements respectively before the latter have been released by the clamping jaws 917 of the transferring crank.

After the frame elements have been released by the transferring crank, and the clamping jaws of the crane withdrawn therefrom, the side bar elements n are carried into binding pressure relation with the cross bar elements by an inwardly sliding movement of jaws 951 and securely held in such relation pending reaming, rivet inserting, and rivet heading operations to be performed at succeeding stations in Department H. The clamping operations, however, are performed at station 900.

The swinging clamping jaws 960 for engaging the side bars are supported by arms 975 from an oscillatory shaft 976, mounted in frame 965, the said shaft being connected by worm gear members 977 and 978 with a coupling member 980, whereby these clamping jaws may be swung into clamping position by jaw actuating mechanisms located at both sides of the jig trackway at station 900 and provided with couplings which are movable into and out of engagement with the couplings 980 carried by the jig.

Jaw closing mechanism suitable for my purpose is illustrated in Figs. 60, 61, and 62. Resiliently yielding driving coupling members 985, (one for each coupling member 980), are each supported in line with its mating member 980 and moved into engagement therewith after the frame bars have been deposited on the jig. Thereupon the driving member 985 is rotated by power derived from motor 998 through belt or chain 999, shaft 1000, train of gear wheels 1001 and 1002, vertical shaft 1003, pinions 1004, worm shaft 1005, chain 1010, sleeve 1011, clutch members 1012 and 1913, coiled spring 1014, and shaft 1015, the latter having a squared end 1020 socketed in the shank 1021 of coupling member 985.

The spring 1014 allows clutch member 1013 to yield rotatively. Another spring 1030 interposed between shoulder 1025 on coupling member 985 and a ring 1032, arranged in the base of the sleeve 986, and resting upon a collar flange 1033 on shaft 1015, allows the coupling member 985 to yield longitudinally. A stop ring 1026, fitted in the hollow member 986, limits the forward movement of the coupling member 985, under the pressure of spring 1030. The supporting sleeve 986 is employed to carry the coupling member 985 into and out of engagement with the jig coupling 980, this sleeve 986 being non-rotatively supported in the frame bearings, by means of a spline, as indicated in Fig. 62, and having an internal shoulder at 1034 adapted for thrust pressure on collar flange 1033.

The sleeve 986 is actuated in a longitudinal direction by cam wheel 992 operating through lever 993, and block 995, mounted on said sleeve, the cam groove 991 being formed to allow a continuously revolving cam to properly time the coupling periods. The cam is driven from worm shaft 1005 through worm 1006 and a worm wheel 1007 mounted on the cam shaft. Clutch member 1012 is also continuously driven, but clutch member 1013 will be rotated only when moved into engagement with member 1012.

After the movable jaw 960 has reached clamping position, continued rotation of coupling member 1013 and its supporting sleeve 1016 in the direction indicated by the arrow in Fig. 62 will wind up expansion spring 1014, and further rotation of shaft 1015 will then be impossible. The spring 1014, is connected at one end to the sleeve 1016, and at the other end by a pin 1019, to the collar 1018, which is clamped to the shaft 1015. However, the sleeve 1016 is normally held from moving outwardly on shaft 1015 by a stop pin 1040, seating in the angle of a shoulder 1041 at the outer end of said sleeve, and which normally prevents movement of the sleeve outwardly along shaft 1015. When shaft 1015 ceases to revolve and sleeve 1016 commences an independent rotary movement, shoulder 1041 will be carried away from stop pin 1040, allowing the latter to enter a recessed portion 1044 of the sleeve, the spring 1014 thereupon pushing said sleeve outwardly until clutch member 1013 is withdrawn from engagement with the clutch member 1012 if these clutch members have not previously been separated by the operation of cam wheel 992. Under any normal conditions, however, the operation of cam 992 will effect a separation of clutch members 1012 and 1013 before the stop pin enters the recess 1044.

By providing for a longitudinal yielding movement of coupling member 985 on its spring cushion 1030, the member 985 will spring into engagement with member 980 after rotation has commenced if not previously engaged. And by transmitting these rotary movements through spring 1014, it becomes unnecessary to instantly separate the couplings when the clamping jaw 960 reaches clamping position. Therefore, effective clamping operations may be performed notwithstanding variations in the thickness of the frame elements, or slight variations in motion transmission.

It will be observed that frame 987 is not only adjustable along the bed or slideway by means of the coöperating slides 1050 and 1051, but it is also vertically adjustable along standards 1052 carried by slide 1050. Screws 1055 are employed for this purpose.

The clamping jaws 960' for the cross bar elements are similarly operated, by means of corresponding driving members, as described with reference to the parts 985. The jaw supporting arms 975', oscillatory shaft 976', worm gear members 977' and 978', and coupling member 980' are similar to the parts 975 to 980 above described, but the coupling members 980' are connected with worm shaft 978' by shaft 1056 and bevel gear wheels 1057 and 1058, (Fig. 64), in order that these coupling members may be presented to the mating members pushed inwardly from the sides of the jig.

While cam wheel 990 has been described as continuously driven, it will be understood that it may be momentarily stopped and started by clutch mechanism associated with the motor and controlled by suitable timing mechanism as hereinafter described, whereby a definite starting point for cam rotation may be established for timing purposes.

*Binding the frame elements together.*

After the elements have been clamped to the supporting jaws 951 and 952, the jaws 951 are moved inwardly, as stated above, to carry the side bars into engagement with the ends of the cross bars. This movement is derived from a feed screw 1060 having threaded engagement with a feed nut 1061, and having swivel connection with the frame of the jig at 1062. The feed screw may be actuated by similar means to that above described for operating the swinging clamping jaws 960, a cam wheel 990 being utilized to actuate each feed screw 1060. The cam wheel groove 1065 controls lever 1066, the latter being operatively connected with a coupling carrying sleeve 1067, similar in structure and function to sleeve 986 above described. The rotary actuating shaft 1068 for this coupling is driven from sleeve 1011 through the belt or chain 1069, clutch connections 1012' and 1013' being employed similar to the members 1012 and 1013 above described. In Fig. 61, feed screw 1060 is coupled with these driving connections preparatory to the initial movement of jaws 951 which carry the side bars into engagement with the cross bars. By extending screw shaft 1060, providing it with right and left hand screw threads in its respective end portions, and arranging these threaded portions of the shaft in engagement with feed nuts 1061, the supporting jaws 951 on opposite sides of the jig may be simultaneously moved inwardly. But I preferably employ like mechanism on both sides of the trackway and actuate each clamping jaw independently.

The jig 950 preferably comprises a four-wheeled truck, the main frame of which supports the clamping jaws and their operating connections by means of a set of spacing members 1080, these members being adapted to be superposed in any required number and a sufficient number being used to support these jaws at a proper elevation with reference to the portion of the bar to be engaged.

The jigs are advanced along the trackway step by step, and at each station are accurately doweled by doweling pins 1085 which are moved vertically into and out of doweling position by means of a reciprocating frame 1086, levers 1087, and pin carrying, telescoping plunger rods 1088 and 1089, the member 1089 and the doweling pin being resiliently supported from the lower plunger 1088 by a compression spring 1090, (Fig. 61). Lever 1087 is provided with a stud 1091 engaged in a slot 1092, (Fig. 63), formed in an ear 1093 depending from the lower plunger member 1088.

Jig advancing mechanism.

Means for advancing the jigs are illustrated in Fig. 63, and consist of a set of reciprocating rods 1100 and 1101. A set of clutch levers 1102 and 1103 are provided with V-shaped projections 1104 adapted to enter corresponding notches 1105 in coupling heads 1107 mounted on the respective ends of each jig. The coupling heads 1107 of successive jigs are preferably arranged substantially in abutting contact at 1108 and the two operating levers 1102 and 1103 have their meeting ends connected in the form of a loose toggle at 1113, one of said levers having a cross pin loosely engaged in a slot in the extremity of the other lever, as clearly shown in Fig. 63. These levers 1102 and 1103 are pivoted to a bracket sleeve 1114 mounted on the jig advancing rod 1100, whereby, when the projections 1104 are in engagement with the coupling heads 1107, a longitudinal movement of actuating rod 1100 may be transmitted to the jigs. By retracting clutch levers 1102 and 1103 during each reverse movement of rod 1100, and by reciprocating said rod 1100 a distance equal to the length of one of the jigs it is obvious that the jigs may be thus advanced step by step and that each advancing step will be equal to the length of one of the jigs.

To move clutch levers 1102 and 1103 into and out of coupling position, I provide clutch operating levers 1115. These levers 1115 are pivotally connected with the bracket sleeve 1114 at 1116 and their lower ends are loosely connected at 1117 with the rod 1101, the latter being thus supported from the jig actuating rod 1100. The upper ends of the levers 1115 are connected by links 1118 with the levers 1102, the links 1118 and the upwardly projecting arms of levers 1115 being arranged to constitute a knee toggle adapted to utilize independent movements of rod 1101 to shift clutch projections 1104 into and out of engagement in the sockets 1105 of the jig supported coupling heads.

These independent movements of clutch operating rods 1101 are derived from the dowel pin actuating frame 1086 which has arms 1120 and 1121 projecting upwardly in the path of a depending arm 1122 connected with clutch operating rod 1101.

The arms 1120 and 1121 are so spaced that, during the final movement of the jig actuating rod 1100 in the direction indicated by the arrow in Fig. 63, arm 1122 will be brought into proximity to, or contact with, arm 1120, all of the parts being then in the Fig. 63 position. Thereupon frame 1086 is shifted to the left to actuate the doweling pins 1085 (Fig. 61) to doweling position, thereby locking the jigs at the stations to which they have been respectively advanced.

But when the parts are in the Fig. 63 position, a dowel actuating movement of frame 1086 is also transmitted through arms 1120 and 1122 and rod 1101 to also move the latter to the left from the position in which it is shown in Fig. 63, thereby swinging link 1118 to the right and drawing the clutch operating levers 1102 and 1103 downwardly and releasing their projections 1104 from the jig heads 1107.

During the jig stopping interval, jig actuating rod 1100 is retracted a distance equal to the length of one of the jigs, and during this retractive movement, rod 1101 moves freely with rod 1100, its depending arm 1122 being thus brought into proximity to the upwardly projecting arm 1121 on dowel operating frame 1086, whereby, when the doweling pins are retracted preparatory to the next forward stroke of rod 1100, said arm 1121 will engage depending arm 1122 and move rod 1101 forwardly independently of rod 1100. This motion will be transmitted to the clutch levers 1102 and 1103 to again couple rod 1100 to the jigs for the next jig advancing step in the direction indicated by the arrow in Fig. 63.

The means for actuating doweling frame 1086 and jig advancing rod 1100 will be hereinafter described. The rods 1100 and 1101 and also frame 1086 preferably extend throughout the length of this department, one set of these operating connections being associated with each trackway in the department. Rod 1100 is of sufficient size to provide the necessary strength for actuating the jigs, and it is preferably supported at intervals by rollers 1130 adapted to travel along supporting track rails 1131.

Reaming operations.

A jig advanced one stem from station 900 is stopped and doweled at a reaming station 1135. At this station reaming machines similar to those shown in Fig. 65 are employed to ream or drill out the registering holes in the meeting portions of the frame elements. The holes in the frame bars are those which were previously formed in the piercing Departments B and b respectively, (or at piercing stations in Departments E and e,) but the holes in brackets or gussets, if any, may have been independently formed preparatory to the attachment of such brackets and gussets in Departments D, d, and f.

The reaming operations are performed for the purpose of insuring accurate registry of the rivet holes in all contacting members, and also for the purpose of trimming the margins of such holes to accurate size and contour preparatory to rivet inserting operations.

Each reaming machine is provided with a set, or a plurality of sets, of oppositely movable, vertically actuated slides 1140 and 1141, and any required number of horizontally movable slides 1143. Each of these slides has an arm 1145 clamped thereto which supports a tool head 1146 containing the driving mechanism, which preferably comprises an individual electric motor located within the tool head, the shaft of the motor being provided with a reaming tool 1148.

When a jig is stopped and doweled at the reaming station, the horizontal slides are moved inwardly by pinions 1150 and racks 1151. The vertical slides 1140 and 1141 are actuated in opposite directions by a pinion 1155, in mesh with racks 1156 and 1157 respectively. These racks are respectively connected with the slides 1140 and 1141. The actuating pinions 1150 and 1155 of the several slides have their shafts 1160 extended and provided with driving pinions 1170 and 1171 respectively, both of these pinions being in mesh with an oscillatory driving gear segment 1173 actuated by connecting rod 1175.

The motors which actuate the reaming tools may, of course, be operated continuously, and it is merely necessary to push the rotating reaming tools into the rivet holes to the required distance and then retract them and subsequently retract the slides 1140, 1141, and 1143 preparatory to the next advancing movement of the jigs, whereby the frame at the reaming station is moved to a rivet inserting station now to be described, and a succeeding frame presented to the reaming station for a reaming operation.

It is desirable that all of the reaming operations shall be performed simultaneously at a single station. This is possible for the reason that the reaming machines may be mounted in close proximity to each other upon the tool carrying slide of one machine and operated simultaneously. It is, therefore, obvious that there is no possibility of a shifting of the frame elements between reaming operations, such as might occur if the operations were performed successively or at different stations.

I prefer to use reaming tools which are substantially drills and while I have preferred to form holes in the frame elements preparatory to assembling them, in order to expedite the work of drilling or reaming holes to the desired size and required registry, I do not regard the preliminary piercing or hole forming operation as essential, and the reaming tools may therefore be regarded as drilling tools or equivalents for drilling tools so far as my method is concerned.

*Rivet inserting operations.*

After the reaming operations are completed upon the frame elements carried by any given jig, that jig is then advanced to a rivet inserting station 1190 provided with rivet inserting machines similar to those employed in Department D and illustrated in Fig. 25. The machines at station 1190 insert rivets through the registering holes of the frame elements and, as previously explained, the rivets 2001, Fig. 82, are preferably anchored in position by longitudinal ribs or beads 2002 formed on the shank of each rivet and adapted to bite into the material at the margins of the holes when the rivets are driven home. Whenever the character of the frame to be constructed is such that it is not convenient to insert all the rivets at station 1190, additional stations may be provided at which rivet inserting machines differently grouped may be utilized to complete the rivet inserting operations, when the jig arrives at such station, or stations. Ordinarily, however, it will be possible, with machines such as are illustrated in Fig. 25, to insert all the rivets simultaneously at one station, since the rivet feeding chutes and guiding tubes take up but little space and may be arranged in close proximity to each other.

By clamping the frame elements to the frame supporting members on the carrier, and by employing doweling pins on the clamping jaws, it is possible to not only hold the individual frame bars from shifting during reaming or drilling and rivet inserting operations, but to a large extent also during the rivet heading operations. It will be observed that I also hold the cross bars of the frames in positions exactly at right angles to the side bars. The spaces inclosed between the bars are, therefore, in exact conformity to the design. By drilling all the rivet holes simultaneously, and thus securing perfect accuracy and simultaneous registration of rivet holes throughout the frame, and by inserting and anchoring all rivets before commencing the heading operations, I not only utilize the inserted rivets to assist the clamps and doweling pins in holding the frame elements against shifting movements, but I also maintain the rivets with their axes coinciding with the axes of the rivet holes, since each rivet is anchored and held in such position and it will not get out of position if the frame bar elements are wholly prevented from shifting. In most frames, connecting rivets are inserted in groups, the rivet holes in each group being usually in close proximity.

*Rivet heading machines.*

Rivet heading machines 1200 are located at stations 1201, 1202, 1203, and 1204 respectively. These machines are all similar to the rivet heading machines employed in Department D and illustrated in Figs. 25 and 28, and it will not be necessary to describe their structure in detail, except as to certain special features shown in Fig. 66.

It will be observed, however, that the rivet heading machines located at these stations 1201 to 1204 respectively are differently grouped at each station. Each heading machine is arranged to operate upon a different rivet, or set of rivets, previously inserted at station 1190 and such other rivet inserting stations as may have been provided for any given installation. By thus grouping the rivet heading machines at different stations, it is possible to provide a sufficient number of stations, whereby all of the machines may be operated simultaneously, or substantially so, without interference with each other, and inasmuch as they are all operated during the jig stopping interval, the time required for all riveting operations is no greater than that required for a single operation. By grouping the machines differently at successive stations, all the rivets may be headed either at one station or another, and the work of each machine may be reduced to the simple operation of heading a single rivet.

In ordinary motor driven vehicle frames, the side bars are disposed with the marginal flanges turned inwardly and receive the cross bar frame elements between them as illustrated in Figs. 66 and 67. The rivets connecting the side bar and cross bar elements are usually vertically disposed, and are inserted downwardly through the upper flange and upwardly through the lower flange, the rivet heading operations being performed between these flanges. Therefore it is necessary that the rivet heading mechanism be not only formed to carry the rivet heading jaws into the angles formed by these frame bars preparatory to a rivet heading operation, but it is also necessary to retract these jaws after the rivet heading operation and preparatory to lifting the swinging jaw carrying head out of the way in time for the next jig advancing movement. Therefore the rivet heading machine illustrated in Fig. 66 differs from that illustrated in Figs. 25 and 28 in that the machine shown in Fig. 66 has its rivet heading jaws 410′, 412′, and clamping jaws 411′ so positioned that, when the head 408′ is swung downwardly preparatory to a rivet heading operation, these jaws will be presented in position where an outwardly shifting movement of the head 408′ will carry the jaws between the interacting frame elements or into the angle formed by these elements with the jaws 410′ and 412′ into position to engage the rivet when the jaws are moved toward each other for a rivet heading operation.

The jaw carrying head 408′ is raised and lowered in the same manner as heretofore described with reference to the machine shown in Figs. 25 and 28 and the cam wheel 420′ with its associated parts may be assumed to correspond with the similar parts in said previously described views. But for the purpose of bodily shifting the head 408′ to carry the jaws from the full line position of Fig. 66 to a position where they can close upon the rivet in the position indicated by dotted lines in said figure, I provide the cam supporting shaft 1205 with an additional cam wheel 1206 having a cam groove 1207 in which a roller carried by lever 1208 loosely engages. The other end of lever 1208 is connected with a slide block 1209 mounted to travel in a curved slot or guideway 1210 in a bracket 1211 connected with the standard 407′. The connections between lever 1208 and slide block 1209 comprise the link 1212 and elbow crank 1213. The pivot shaft 409′, upon which the head 408′ swings, is supported upon a horizontally movable slide 1214 adapted to travel along the top or cap plate of the standard 407′, said cap plate being formed to constitute a slideway.

The arrangement of the parts above described is such that, when the cam wheel 1206 revolves, an inward movement of the roller carrying end of lever 1208 toward cam shaft 1205 will tend to swing the downwardly projecting arm of elbow crank 1213 in the direction of the jig. But inasmuch as bracket 1211 is fixed to the standard 407′, it serves as a fulcrum and therefore the head 408′ and slide 1214 will move in the opposite direction. The arrangement of the parts is such that this movement will take place after the rivet heading jaws 410′ and 412′ have been presented in the full line position of Fig. 66 and the jaws will be carried into position for a rivet heading operation.

When the jaws are in rivet heading position, they are closed by mechanism similar to that disclosed in Figs. 25 and 28, after which, the jaws are opened and a reverse movement of slide 1214 is derived from cam wheel 1206, whereby the parts are returned to the full line position of Fig. 66. The head 408' is then raised to the position of the head 408 in Fig. 28 to permit an advance of the presented frame to the next station. It will be understood that rivet heading machines designed to operate in the angles of the presented frame elements will be obliquely positioned upon their supporting beds, whereas the similar machines which connect gussets and brackets with the side bars and cross bars at a substantial distance from the apices of the angles formed by these bars, may be disposed transversely to the jigs and trackway. Obliquely positioned and transversely positioned machines are illustrated in Fig. 59, wherein the different grouping of the machines at successive stations is also shown. Only a few machines are illustrated at each station in Fig. 59, although a much larger number can be used if the nature of the work so requires.

The rivet heading machines must be sufficiently large and heavy to withstand the strains imposed under heavy pressures exerted during the heading operations, the rivets being headed while cold. By my improved method, however, I am enabled to provide as many rivet heading stations as there are rivet holes in any group on either side or in any portion of the frame, and owing to the accurate positioning of the carriers and of the several machines, each rivet heading operation may be performed without interfering with or disarranging the rivets previously inserted in adjacent holes.

Further, by simultaneously heading a number of rivets in different portions of the frame at one station, the offsetting stresses developed in one rivet heading operation, or by rivet heading operations on one side of the frame, will usually be offset by counteractive stresses in other simultaneous rivet heading operations, or upon the other side of the frame.

*Shifting operations.*

As in several of the departments heretofore described, it is desirable to provide parallel trackways 905 and 1218 respectively, and to transfer the jigs from one trackway, or set of trackways, to the other, thereby avoiding the necessity of having departments of excessive length. This may be conveniently accomplished in the assembly department by providing an end station 1219 in which track sections 1220 are mounted upon an endless conveyer 1221 disposed transversely to the trackway 905. Successive sets of tracks on the conveyer are adapted for simultaneous alinement with trackways 905 and 1218 respectively. Therefore jigs advanced upon the tracks alined with trackway 905 may be transferred by this conveyer into position for delivery to trackway 1218. The final set of jig actuating levers 1103 in trackway 905 will be between station 1201 and station 1219 when releasing a jig delivered from trackway 905 to track sections 1220 on said conveyer 1221. The initial set of jig actuating levers 1103 in trackway 1218 will be similarly positioned between station 1219 and station 1202 when engaging a jig to remove it from the conveyer apron. The projections 1104 on these levers will engage the jigs adjacent to the inner side of conveyer 1221.

When the jigs arrive at station 1225, their movable clamping jaws 960 are actuated to releasing position and the side bar supporting jaws 965 are moved outwardly to release the completed frame. The mechanism for accomplishing this result is like that disclosed in Fig. 61, but is operated reversely from the jaw setting mechanism described in connection with station 900.

After the jaws 960 and 951 have been retracted, the completed frames may be transferred by a transfer hoist 1227 to a belt conveyer 1228, whereby the frames may be conveyed to any suitable point of delivery. It is not material whether this conveyer operates continuously or step by step, provided it advances each frame sufficiently to carry it out of the path of the next frame delivered. The transfer hoist 1227 is similar to that illustrated in Fig. 29 and described in connection with Department E, but the transfer hoist 1227 is preferably provided with two vertically movable posts and two parallel arms corresponding functionally with the posts and arms 508 and 509 respectively as illustrated in said Fig. 29.

The subdivision of the work of heading the rivets in this department, whereby each heading machine may operate upon a single rivet, and may therefore be simplified and easily manipulated, and whereby the machines may be differently grouped at successive stations, and whereby all rivet heading operations required by the frames may be simultaneously performed, although performed on different frames in different stages of advancement, is an exceedingly important feature of my invention, the multiplication of these rivet heading stations and the grouping of the individually acting machines at these stations being probably more important than the multiplication of like machines and the grouping thereof at separate stations in any other department, since it is essential to the high degree of efficiency and maximum output of my apparatus that the frame elements be connected in Department H in substantially the same time as that required for performing each of the other individual operations, from the blanking of any given bar to its delivery to the final assembly department.

Conveyer driving mechanism.

In the particular construction illustrated, separate motors are largely employed to actuate the various conveyers and the working machines and transfer mechanisms in the separate departments. The electric motor 1250 and motion transmitting connections shown in Fig. 68 are used to operate the jigs in Piercing Department B, but the motor itself, with associated clutch and timing mechanism, may be regarded as typical of all conveyer driving mechanisms.

The motor 1250 may run continuously. It drives a shaft 1251 through pinion 1255 and gear wheel 1256, the shaft 1251 having fast and loose clutch members 1252 and 1260 respectively. Electromagnetic means are employed to move clutch member 1252 into engagement with a coöperating clutch member 1260 when the jigs are to be actuated, whereby motion may be transmitted to the jig actuating shafts 95 and 95'' through pinion 1261, train of gears 1262 to 1266 inclusive, crank 1267, connecting rod 1268, rack 1269, pinion 1270, clutch members 1271 and 1272, (Fig. 69), and gear members 1273 on shaft 1310, 1274 and 1275 on shaft 1320, and gear 1276, one of the latter being fast on one of the shafts 95' or 95''.

The rod 177 which actuates the doweling pins for positioning the jigs in the piercing department, (Fig. 19), is operated from the crank 1267 through a projection 1280 thereon which is adapted to engage swinging arms 1282 and 1283 depending from an oscillatory rod 1284. The arrangement is such that, when the crank 1267 is in the Fig. 68 position, it will engage and actuate arm 1282 in one direction until the projection 1280 passes underneath this arm. This movement will oscillate rod 1284 to a point where the other arm 1283 will be in the path of projection 1280 and will be engaged by it when the crank 1267 has completed a half turn from the Fig. 68 position. When the crank has completed such half turn, projection 1280 will engage and oscillate arm 1283 and shaft 1284 in the opposite direction, thereby returning arm 1282 to a position with its lower end in the circular path traveled by projection 1280, whereby, when the latter returns to the Fig. 68 position, it will again engage and oscillate this arm 1282 and shaft 1284. This intermittent oscillatory movement of shaft 1284 is utilized to alternately actuate and retract the doweling pins through an upwardly projecting arm 1296 carried by rod 1284, sliding rod 1291, elbow crank 1292, and link 1293, the latter connecting one arm of the elbow crank with the vertical rod 177 associated with the doweling pins as illustrated in Fig. 19.

It will be understood that when the sliding rod 1291 is moved to the right in Fig. 69, the dowel pin actuating rod 177 will be drawn downwardly, thus setting the doweling pins 176 in jig engaging position as shown in Fig. 19. An opposite movement of sliding rod 1291 will, of course, retract the doweling pins.

To actuate the clutch member 1271, a vertically disposed rod 1300 is provided with an arm 1301 pivoted at 1302 to an upwardly projecting stud carried by the rod 1291 and this vertical rod 1300 transmits motion to clutch member 1271 through clutch shifting arms 1305, (Fig. 70), loosely engaged in an annular groove formed in clutch member 1271. When the sliding rod 1291 is shifted to the left from the Fig. 69 position, motion will be transmitted through the vertical rod 1300 to move clutch member 1271 into engagement with clutch member 1272, thereby coupling pinion 1270 with gear wheel 1273, the latter being loose on shaft 1310 which supports these gear members.

In Figs. 68, 69, and 70, the driving clutch members 1252 and 1271 respectively are each retracted, clutch member 1271 having been retracted by the movement of swinging arm 1282 to its Fig. 69 position, in which, projection 1280 is about to pass underneath the end of said arm 1282. The doweling pins 176, (Fig. 19), will have been set in doweling position by the swinging movement of the arm 1282 to its Fig. 69 position and the retraction of the main clutch member 1252 prevents further movement of any of the parts which this clutch controls. But when this clutch member 1252 is again shifted to motion transmitting position, the crank 1267 will complete a one-half turn, thereby moving rack bar 1269 to the left in Fig. 68 without actuating the jigs, clutch member 1271 having been retracted as above explained.

On completion of the half turn movement of crank 1267 from its Fig. 68 position, the projection 1280 engages and actuates the swinging arm 1283 to move the sliding rod 1291 in the opposite direction, (i. e., to the left in Fig. 69), thereby retracting the doweling pins and simultaneously oscillating the vertical rod 1300 to move clutch member 1271 into engagement with its coöperating member 1272. This engagement of the clutch members 1271 and 1272 will, of course, occur upon completion of a half turn of crank 1267 from its Fig. 68 position. During the remaining half turn of crank 1267, the rack bar 1269 will return to its Fig. 68 position, and motion will be transmitted through gear wheels 1273 to rotate the jig actuating shafts 95 and 95''.

From the foregoing description, it will be understood that the main clutch 1252 controls all of the motion transmitting connections driven by the continuously rotating shaft 1251. The crank 1267 performs the triple function of reciprocating the rack 1269 to actuate the jigs, shifting the clutch member 1271 whereby the jigs are actuated in one direction only, and of operating the doweling pins; the last two of said functions being performed through the crank projection 1280, and the swinging arms 1282 and 1283 and their associated connections.

The shaft 1320, upon which the pinion 1274 and bevel gear wheel 1275 are mounted, may be extended throughout the length of the piercing department and provided with a plurality of bevel gear wheels 1275, each of which drives one of the vertical shafts 95, (or 95″), there being one vertical shaft 95, (or 95″), for each jig operating gear wheel 61, 61′. Shaft 1291 may also extend throughout the length of the department and is operatively connected with each dowel pin actuating rod 177. Inasmuch as gear wheels 61 and 61′ operate the jigs on both trackways, and the doweling pins for both trackways are actuated by the vertical rods 177, it is obvious that the jig movements and dowel pin movements for both trackways in the department are derived from the single mechanism shown in Fig. 68. It is not material to my invention, or at least it is not essential that the functions of the motor 1250 should be limited to the conveying mechanism in the piercing department nor to that and the associated line conveyer. But I prefer to employ like motors and similar clutch mechanisms for each conveyer. The transfer mechanisms will ordinarily be operated during the conveyer stopping intervals, and these will therefore be driven by separate motors or by the motors used to drive the department machines, as hereinafter described.

I have stated that the cross bar conveyer 751 may be operated step by step or continuously. But it will ordinarily be found quite important to have the conveyer driving mechanism operate in definite cycles, and to fix a starting point for each cycle, which has a definite time relation to the movements of the cross conveyers to which this conveyer delivers the complete elements. If conveyer 751 is operated in this manner, it may be provided with means for controlling the transfer hoists associated with it, and these, in turn, may control the turret movements as hereinafter explained in describing the relay system of control illustrated in Fig. 78.

*Driving mechanism for operating the department machines.*

In each department, the operating machines are driven by mechanism similar in many particulars to that employed for driving the conveyers as above explained. In Fig. 71, the machine driving mechanism is illustrated as the actuating mechanism of the piercing machines shown in Fig. 19, but similar driving mechanisms may be employed to operate the machines in all departments, and for actuating all separately driven transferring and feeding mechanisms.

It will be observed, in Fig. 19, that the oscillatory shafts 162 are provided with actuating arms 1340, the swinging ends of which are pivotally secured to connecting bars 1341. the lower ends of which are connected with the crank 1342. This crank is intermittingly driven from a continuously operating motor 1344 through pinion 1345, gear wheel 1346, shaft 1347, clutch members 1348 and 1349, and gear wheel 1350, the latter being mounted upon the crank shaft 1351 which carries crank 1342.

By shifting clutch member 1348 to motion transmitting position after the similar clutch member 1252, (Fig. 68), has been retracted, and by retracting clutch member 1348 before clutch member 1252 is again moved to motion transmitting position, it is obvious that the piercing machines and the conveyers in the piercing machine department may be operated in alternation, and that all of the machines and conveyers in all departments may, if desired, be similarly operated. It is also obvious that the line conveyers may be actuated and controlled by similar mechanism, or if desired, these conveyers may be directly driven from the jigs or conveyer advancing mechanism of the associated department through motion transmitting connections adapted to impart the required degree of movement within the interval allowed for conveyer movements.

It would be possible to allow clutch member 1348, (Fig. 71), to remain in motion transmitting position after clutch member 1252, (Fig. 68), has been moved to motion transmitting position, and pending the first half turn of crank 1267, provided that clutch member 1348 is retracted before crank 1267 completes its half turn and actuates swinging arm 1283, thereby moving clutch member 1271, (Fig. 69), into motion transmitting position. But with the construction shown in Figs. 68 to 78 inclusive, the main clutch members 1252 and 1348 will be operated strictly in alternation, the form of electrical control shown in Fig. 78 being such that no movement of the conveyer operating mechanism, controlled by clutch member 1252, will be permitted while the driving mechanism of the operating machines, controlled by clutch member 1348, is in motion.

The transferring mechanisms may be operated by separate motors having driving connections similar to the mechanism illustrated in Fig. 71, but where convenient to do so, I preferably utilize the same driving mechanism which operates the department machines to also operate the transfer mechanisms associated with that department. For example, in Fig. 77, I have illustrated means for transmitting motion from the crank shaft 1351 of Fig. 71 to the transferring or reversing mechanism illustrated in Fig. 17 and used to shift the jigs from one trackway to the other in the piercing department.

It will be observed in Fig. 77 that the crank shaft 1351 is provided with a gear wheel 1352 which transmits motion to the trunnion 185 of the transferring mechanism shown in Fig. 17 through gear wheel 1353, shaft 1354, bevel gears 1355 and 1356, shaft 1357, and bevel gear wheels 1358 and 1359, the latter being mounted on the trunnion 185. The intermeshing gears of the above described train are of such relative dimensions that a single revolution of crank shaft 1351 will transmit the one-half revolution to the trunnion 185 required for the transfer of jigs from one trackway to the other in the piercing department.

In some of the departments where the operating machines are provided with tools which require to be manipulated into and out of operating position preparatory to any given operation upon the work, a substantially continuous transmission of motion from the motor is permissible, the conveyer advancing movements taking place in the intervals during which such operating tools are being swung into and out of operating position. For example, the bracket feeding mechanism shown in Fig. 24, includes a bracket feeding turn table associated with a transferring picker adapted to withdraw brackets from the turn table and place them in position upon a presented frame bar. It is obvious that the frame bars may be advanced by the jigs while the picker arm 335 is being presented to the turn table and operated for the removal of a bracket therefrom. Therefore the driving mechanism of the picker and its associated rotative transferring devices may be so timed and controlled by the cam wheels 320 and 342 shown in Fig. 24, that the clutch mechanism illustrated in Fig. 71 will only be required under normal conditions, to provide for a momentary stop in order to exactly fix the time of starting each new cycle of operation. For this purpose, therefore, I have illustrated the clutch members 1348′ and 1349′ of Fig. 71 associated with the shaft of the motor 315 in Fig. 24. The clutch operating and controlling mechanisms are omitted from Fig. 24 for the sake of clearness in that illustration.

By providing such clutch mechanism or equivalent controlling devices for the Fig. 24 mechanism, it is obvious that, even if there should be no stopping interval under normal conditions, yet whenever a failure in operation occurs in any portion of the apparatus, whereby delay results in maintaining the sequence of operations herein described within the predetermined time intervals, the clutch member 1348′ in Fig. 24 will be retracted, thereby stopping the operation of the turn table and its associated picker and transferring mechanism. The manner in which this is accomplished, while allowing a substantially continuous operation under normal conditions, will be apparent from the description of the relay system of electrical control hereinafter set forth.

For a reason similar to that above given for operating the mechanism shown in Fig. 24 continuously, or substantially so, under normal conditions, it is also possible to make the operation of the rivet heading mechanism shown in Fig. 25 substantially continuous, although using electrically controlled clutches, whereby the swinging head 408 may be stopped in a raised position pending the advancement of the jigs in this department. For this purpose, I have illustrated, in Fig. 25, a pinion 1361 mounted on a shaft 1347′ which corresponds with the shaft 1347 of Fig. 71 and is provided with similar clutch mechanism arranged to control motion transmission from gear wheel 445 to pinion 446, gear wheel 445 being loose on its supporting shaft and connected with the pinion 446 through the clutch mechanism.

In Fig. 36, the gear wheel 636 is mounted upon a shaft 1347″ which carries controlling clutches and mechanism similar to that illustrated in Fig. 71, whereby the hanger placing mechanism shown in Fig. 36 is definitely controlled.

In like manner, all of the machines in all of the operating departments may be controlled, whether the described movements are normally continuous or not.

The means for controlling the shifting movements of clutch member 1348 of Fig. 71 and the similar clutch members employed in all departments, and also the clutch members 1252 of the conveyer controlling mechanisms, such as are illustrated in Fig. 68, will now be described.

*The electrically controlled synchronizing mechanism.*

As heretofore indicated, three systems of control are possible, whereby the required succession of operations may be maintained throughout the apparatus.

1. It is possible to operate the line conveyers and department machines constantly if the transferring mechanism for delivering materials into and out of the several departments and the intermediate mechanism for advancing the materials step by step within the departments are operated during the retractive movements of the constantly operating machines. But in such an apparatus, it would be difficult to maintain that exact coördination between the conveying, transferring, and operating mechanisms within the departments, and in successive departments, which is necessary to prevent any possible interference of one mechanism with another by reason of the failure of one mechanism or tool to operate, or by reason of defective or delayed working in any portion of the apparatus.

2. It is also possible to actuate all conveyers, including both the department and line conveyers, in simultaneous step movements, and to operate all the working machines simultaneously in the intervals between the conveyer movements, the transferring and feeding operations being so timed that these devices will remove material from the conveyers and deposit material thereon during the conveyer stopping intervals and will deliver material to the machines or machine feeders and remove it from them during their respective stopping intervals.

The advantage of this mode of operation is that definite starting points may be established throughout the entire apparatus, and this method of control is illustrated diagrammatically in Fig. 78, although if consistently followed throughout the apparatus, unnecessary delays may result and excessive power is required at the moment of starting all the conveyers and also at the moment of starting all the machines. This method of control is illustrated in Fig. 78 as applied to the blanking and piercing departments. It is particularly adapted for use in the piercing department, where a considerable number of like machines are grouped at various stations, at each of which, piercing operations are performed simultaneously. This method depends upon operating each device in a definite cycle and establishing simultaneous starting points alternately for the conveying cycles and the operating cycles. Therefore this method may be conveniently termed the "simultaneous cycle method of control."

3. The third method of control utilizes what may be conveniently termed a "relay system," whereby the commencement of any given conveying, transferring, feeding, or machining operation is made dependent upon the completion of another operation which is precedent both in character and in time, to a point where a delivery of the material at the proper time is possible, and regardless of the time required to retract the first operating tool or machine to neutral position or to the predetermined starting point. In this method of control a series of operations may be performed within a time interval which is standardized with reference to another single operation, or group of operations, but the time required for the individual operations in the series may be different, and one movement may start before the preceding one is completed, wherever two coöperating and successively acting mechanisms may be in motion at the same time without interference.

For example, it is not material to this method of control whether the forming presses in the shaping Department C perform shaping operations simultaneously with the piercing operations performed by the piercing machines in Department B, if all the operations within Department C are standardized with reference to those in Department B in such a manner that the blanks may be shaped in Department C as fast as they are pierced and delivered to such department from Department B. Also, the plungers of the forming press in Department C may commence their downward movement before the feeder delivers the blank, and the delivery end of the feeder may remove the blank before the retraction of the plunger is complete, the controlling devices being utilized merely to insure delivery of the blank to the press while there is sufficient clearance, and to insure the removal of the shaped bar after clearance has been provided by the retraction of the plunger and before the next blank is deposited.

Efficiency in an apparatus embodying this invention and employing the relay system of control depends upon standardizing the total operations in each department with reference to the total operations of each of the other departments in such a manner that each department will receive and deliver the material at the proper time and successively at standard intervals which do not involve extended periods of inaction in any of the departments. Each department may therefore have its own timing schedule, subject only to the requirements that the work in that department shall be completed upon each blank or element within the standard time interval.

The principal advantages of the relay system of control is that it allows the different operations within the department to overlap in time, as above explained. It avoids peak loads on the power station, such as would result from starting all machines or all conveyers at exactly the same time. And it allows more extended intervals within which the larger and heavier mechanisms may complete their cycles.

The simultaneous cycle method of control as applied to Departments A and B.

In Figs. 68 to 78 inclusive, I have disclosed means whereby each working cycle throughout Departments A and B may be commenced simultaneously, and whereby the conveyers will start simultaneously after the last working operation has been fully completed in both departments.

The movable motor clutch members 1252, (Fig. 68), and 1348, (Fig. 71), are mechanically actuated into and out of motion transmitting position, but the mechanisms for operating these clutch members are electrically controlled and made inter-dependent in such a manner that the clutch members 1252 of the conveyer operating mechanisms are moved into and out of motion transmitting position in alternation with the movements of the machine operated clutch members 1348, the latter being retracted preparatory to the movement of the conveyer driving clutch members into motion transmitting position, and vice versa.

By simultaneously setting all of the clutch members 1252, (Fig. 68), in motion transmitting position, all of the conveyers may be started simultaneously. After all of these clutch members 1252 have been retracted, all of the clutch members 1348 of the type shown in Fig. 71 may be simultaneously set in motion transmitting position, thus starting all of the department machines, the transferring, and the loading mechanisms simultaneously. This is accomplished by employing a mechanical clutch operating mechanism in connection with electrical controlling and synchronizing mechanism.

The conveyer controlling mechanism shown in Fig. 68 largely in dotted lines is quite similar to that shown in full lines in the machine controlling mechanism disclosed in Fig. 71. It will therefore be first described with reference to Fig. 71, and the same reference characters will be used to designate corresponding parts illustrated in Fig. 68, with the exception that prime marks will be employed to distinguish the parts shown in Fig. 68 from the similar parts shown in Fig. 71.

In Fig. 71, it will be observed that clutch member 1348 is connected with a shifting collar 1365 by a set of links and levers 1366, 1367, and 1368 which are shown in clutch setting position. The clutch shifting collar 1365 is actuated by a forked shifting arm 1375 connected by a slide rod 1377 and a link 1378 with an actuating lever 1379 located within a suitable housing 1364. Laterally projecting arms 1381 and 1382 on the clutch operating lever 1379 are connected by links 1384 with slide bars 1385 and 1386 respectively. These slide bars are adapted for vertical movement in suitable guides 1387, whereby the slides may be reciprocated into and out of clutch setting or motion transmitting position.

A continuously reciprocating main slide 1400, actuated from an extension 1405 of shaft 1347, is adapted to move vertically along a guideway 1401. Shaft 1405 carries an eccentric at 1407 operatively connected with slide 1400 through connecting member 1408.

Dogs 1410 and 1411 are pivotally secured to the lower end of slide 1400 and are connected with each other by a spacing rod 1412 which holds the dogs at such distances from each other that, when the dog 1411 is in engagement with the notched upper end of slide 1386, the dog 1410 will extend downwardly along one side of slide 1385, and vice versa.

After slide 1400 has actuated slide bar 1386 to the position in which it is shown in Fig. 71, the latter will tend to remain in that position while slide 1400 continues to reciprocate. This is due to the fact that the links and levers 1366, 1367, and 1368 automatically lock in clutch setting position to such an extent that power is required to retract the shifting collar 1365.

The pivoted dogs 1410 and 1411 are swung in one direction by an electromagnet or solenoid 1420 which, when energized, holds the spacing rod and dogs in the Fig. 71 position against the tension of a compression spring 1421. A stop collar 1419 limits the movement of the rod in one direction, and a head 1422 limits its movement in the other direction. In Fig. 71, the stop collar 1419 is in abutting contact with one end of the solenoid 1420, the dog 1411 being in line with slide bar 1386 as above described, but when solenoid 1420 is deënergized, spring 1421 pushes the spacing rod 1412 in the opposite direction until the head 1422 contacts with bracket 1423. This movement will, of course, take place when the main slide 1400 is raised and dog 1410 will thereupon be pushed into line with slide bar 1385 preparatory to the next downward movement of the main slide, which then utilizes the power of shaft 1347 to shift lever 1379 to clutch retracting position.

During this movement, clutch member 1348 is not only retracted, but a set of brake levers 1430 are actuated to immediately stop the motion of clutch member 1349. The power receiving ends of the brake levers are connected by toggle links 1431 with the rod 1377 as best shown in Figs. 75 and 76.

Each of the electromagnetic devices or solenoids 1420 of the machine operating clutch mechanisms shown in Fig. 71 are included in an electrical circuit of a battery 1440 or other source of electrical energy, (Fig. 78), said circuit also including a timing switch associated with the same clutch mechanism, a master switch associated with one of the Fig. 68 conveyer operating clutch mechanisms, (preferably the mechanism for driving conveyer 1), and a set of circuit breakers, one associated with each of the conveyer actuating clutch mechanisms. The circuit breakers are connected in series, and therefore all of them must be adjusted to circuit closing position before any of the solenoids 1420 can be energized.

Similarly, each solenoid or electromagnetic device 1420' associated with a conveyer operating clutch mechanism, (Fig. 68), is included in an electrical circuit of battery 1440, which also includes a timing switch associated with such clutch mechanism, a master switch associated with one of the machine operating clutch mechanisms, (Fig. 71), and a set of circuit breakers, one for each Fig. 71 mechanism, and all connected in series. In this manner, the energizing of the solenoids 1420 of the Fig. 68 conveyer operating mechanism may be made dependent upon a completion of the operating cycle of every department machine and transferring and loading mechanism in the apparatus, whereas the operation of such machines, transferring and loading mechanisms, may, in turn, be made dependent upon a completion of the advancing movements of all conveyers and jigs in the apparatus, and of the doweling operations, whereby these parts are positioned in proper relation to the machines.

The above mentioned circuit breakers and also the timing switches of the respective clutch mechanisms are illustrated in Figs. 68 and 71 respectively, one of the timing switches being also shown in Figs. 72 and 73. A master switch is illustrated in Figs. 73 and 74 and the circuit connections are illustrated in Fig. 78, which shows, conventionally, the arrangement of the circuits of the timing switches, the master switches, and the circuit breakers throughout the blanking and piercing departments.

*The circuit breakers.*

The circuit breaker 1445 associated with the conveyer operating clutch mechanism (Fig. 68) comprises a resilient arm having a contact member 1446, which is pushed into engagement with a terminal 1447 by the clutch operating lever 1379' when the latter is swung to the clutch retracting position in which it is shown in said Fig. 68. The circuit breaker 1450 associated with the machine operating clutch mechanism shown in Fig. 71 is similarly constructed, being provided with a contact member 1451 adapted to be pushed into engagement with terminal 1452 by the clutch operating lever 1379 of this mechanism when the latter is swung to clutch retracting position. In Fig. 71, the circuit breaker 1450 is shown in circuit breaking position, the clutch 1348 in this figure being in motion transmitting position. The circuit breakers are so positioned that each tends by its own resiliency to move to circuit breaking position.

*The timing switches.*

The timing switches associated with the Fig. 68 and Fig. 71 clutch mechanisms may be substantially alike. In Fig. 68, the timing switch is located within a housing 1455 and includes a rotary segment 1456, carried by a shaft 1457 driven from gear 1262, through shaft 1458 and a train of gear wheels 1459, 1460, 1461, and 1462. The length of the contact segment 1456 is a little in excess of a half circle, and it is adapted to successively establish electrical connection with oppositely disposed terminal brushes 1463 and 1464. It contacts with each brush before leaving the other, whereby it may not only be electrically connected with these brushes 1463 and 1464 respectively in alternation, but will always be in connection with one or the other.

In Fig. 71, the timing switch is located in a housing 1470 and is like that employed in the mechanism shown in Fig. 68. It includes a rotary contact segment 1471 adapted to alternately establish contact with brushes 1472 and 1473 respectively. Motion is transmitted to the rotary member or segment 1471 from the crank shaft 1351 through the gear wheels 1475 and 1476, the latter being mounted on the shaft 1477 which carries the rotary member or segment. The rotary member or segment 1471 is permanently connected with a source of electrical energy, i. e., the battery 1440 in Fig. 78, through a brush 1478 which bears upon the hub 1479 with which the segment is both mechanically and electrically connected. This is also true of the Fig. 68 timing switch as will be apparent in Fig. 78.

When the timing segment 1471 leaves brush 1472, the circuit of the associated solenoid 1420 will be broken and the clutch member 1348 will thereupon be retracted as above explained. In like manner, in Fig. 68, the circuit of solenoid 1420' will be broken when segment 1456 moves out of contact with brush 1463, thus stopping all of the Fig. 68 mechanisms driven by clutch member 1252. In both cases, however, these circuits may be reëstablished through the brushes 1473 and 1464 respectively with the aid of the master switch as hereinbefore explained.

*The master switches.*

One of the master switches is shown in Figs. 73 and 74. In Fig. 73, it is illustrated as associated with the timing switch which is also shown in Fig. 71. Its rotary member is mounted upon the shaft 1477 and includes a hub 1485 having an arm 1486 provided with a contact segment 1487 adapted for alternate electrical connection with the brushes 1488 and 1489 respectively, said brushes being oppositely disposed. Battery 1440, (Fig. 78), is permanently connected by brush 1491 with the hub 1485 of the rotary member. This switch electrically connects the battery with brush 1488 at or prior to the time that the segment 1471 of the associated timing switch leaves brush 1472, and inasmuch as clutch member 1348 is thereupon retracted as above explained, it is obvious that the timer shaft 1477 will stop with the master switch segment 1487 in contact with brush 1488, thereby connecting up certain circuit elements upon which the circuits of solenoids 1420' of the Fig. 68 mechanisms depend, as hereinafter explained in describing the circuits illustrated in Fig. 78.

A similar master switch is employed in connection with the clutch mechanism, (Fig. 68), which controls the movements of conveyer 1 in the blanking department, this master switch being like that shown in Fig. 78 except that it is mounted upon shaft 1457 of the Fig. 68 timer switch. Two master switches, one associated with the blanking machine clutch mechanism, and the other with the clutch mechanism of the initial conveyer 1, may serve for the entire apparatus, whereby circuits through the clutch controlling solenoids 1420' and 1420 of both the Fig. 68 conveyer operating clutch mechanisms and the Fig. 71 machine operating clutch mechanisms may be connected up in alternation.

In the construction shown in Fig. 78, the master switches are mounted upon the timer switch shafts associated with one of the blanking machines and with conveyer 1 respectively. Therefore the contact segment 1487 of the master switch is short enough so that the electrical connection with brush 1488 will be broken before this segment establishes electrical connection with brush 1489. Therefore it is obvious that all machine circuits are dependent, not only upon the conveyer master switch, but upon all conveyer timer switches and circuit breakers, all conveyer circuits being, in a similar manner, dependent upon the machine master switch and all machine timer switches and circuit breakers.

*The electrical circuits.*

The circuits may be traced in Fig. 78 through the blanking and piercing departments as follows:

In Fig. 78, it is assumed that the machines in Departments A and B are in operation. The circuit of battery 1440 is established through the solenoids 1420 of the machine clutch mechanism as follows:

For the blanking machine indicated at A, this circuit extends from battery 1440 through lines 1500, 1500$^a$, 1500$^b$, the solenoid 1420 associated with the blanking machine, timing switch segment 1471, lines 1500$^c$, and 1500$^d$, master switch arm 1486' associated with the clutch mechanism of conveyer 1, the conveyer contacts 1446' and 1447', switch arm 1445', line 1500$^e$, and line 1500$^f$ back to the battery. Line 1500$^e$ connects all the contacts 1446' and 1447' and all the switch arms 1445' in series.

Similarly, the controlling circuits of the piercing machines in the piercing department are established through the solenoids 1420 associated with such machines, by lines 1500$^a$ and 1500$^g$ to the solenoid and through the respective timing switch segments 1471 to line 1500$^h$, 1500$^j$, 1500$^d$, and thence through the master switch 1486, 1486' of the initial conveyer 1 back to the battery through the conveyer contacts 1447' and 1446' and the circuit breaker 1445' as above described with reference to the blanking machine circuit.

In the Fig. 78 diagram, only one blanking machine is indicated at A. Additional blanking machines would be connected in the same manner across line 1500$^a$ to line 1500$^d$. The reversing mechanisms in the piercing department for transferring the jigs from one trackway to the other at the respective ends of the department are indicated in the diagram as provided with separate clutch mechanisms and timing switches, and these are connected across the line 1500$^a$ to the line 1500$^j$ in the same manner as above described with reference to the blanking and piercing machines.

The transferring mechanisms for delivering blanks to the line conveyer 11, including the loading and unloading machines for delivering blanks to the piercing department and returning them to this line conveyer and also the transfer hoist for delivering blanks to the cross conveyer of the forming press department are indicated in the diagram as connected, in like manner, across line 1500$^b$ to line 1500$^d$ through the solenoids and rotary timing switches associated with these mechanisms.

With the circuits arranged as illustrated in Fig. 78, each machine will remain in operation until its rotary timing switch 1471 moves out of contact with brush 1472 and into contact with brush 1473. As soon as the contact is broken with brush 1472, the associated solenoid will be deënergized and lever 1379 will thereupon swing to clutch releasing position, also releasing the associated circuit breaker 1450. This movement, however, will affect only the particular machine, or set of machines, controlled by the clutch mechanism in which the timing switch has broken the circuit through its associated solenoid. The other machines will continue in operation until their timing switches have also broken the circuits through their respective solenoids, and eventually each and all of the machine controlling solenoids will have become deënergized.

During the period that the department machines and transferring machines are in operation, it is not possible for any conveyer to start for the reason that the machine contacts 1451 and 1452 are all in series, and it is therefore necessary for all of the machine controlling clutch levers 1379 to move to clutch releasing position and operate the associated circuit breaker 1450 to circuit closing position before the conveyer circuits will be established through their clutch controlling solenoids.

But when the last clutch operating lever 1379 is in clutch releasing position, the circuit of the battery 1440 will be established through lines 1511, 1511ª, 1511ᵇ, conveyer controlling solenoids 1420′, timing switch segments 1456, contact brushes 1463, 1464 lines 1511ᶜ, 1511ᵈ, 1511ᵉ, master switch arm 1486 associated with the timing mechanism of the initial blanking press, and thence through line 1511ᶠ and all the series contacts of the department machines and transfer hoists back to the battery through line 1511ᵍ. The clutch operating levers 1379′ of the various conveyers will then be swung to set the clutch members 1252 in motion transmitting position, and the circuit breakers 1445 associated with the conveyers will be released and allowed to swing to circuit breaking position, whereby the series contacts 1446 and 1447 of all conveyer clutch mechanisms are separated, thus making it impossible to again start any machine in any department until the last conveyer has been stopped with its associated circuit breaker in circuit closing position.

If the relay system of control is utilized, it may still be desirable to utilize the system of control illustrated in Fig. 78 to establish starting periods for the sets of operations to be performed in each department, whereby deliveries from one department may be delayed until the operations in the next department have been completed, and whereby the rate of travel along the different lines traversed by the cross bar and side bar elements may be regulated in such a manner as to equalize the deliveries to Department G, the relay system being used merely to control the succession of operations within the respective departments. In such case, the timing switches may be employed within the departments similar to those above described, but with the contacts so arranged that the movement of one mechanism will close the circuit through the controlling magnet of the next in such a manner as to avoid delays and yet allow to each mechanism a time interval within which to complete its cycle of operation. Such a relay system is made the subject of a separate application and further description herein is therefore deemed unnecessary.

*Modified forms of construction.*

In the drawings, Figs. 1 to 78 inclusive illustrate but one form of apparatus in which my invention may be embodied, and the terms of description employed herein and in the appended claims are used as such without any intention of limiting the scope of my invention to the structural details disclosed, and without any intention of excluding myself from the benefit of the full range of equivalents to which I am legally entitled. In general, I have avoided showing modifications, for the reason that, to do so, would greatly increase the length of the specification and would also tend to create confusion. It is desirable, however, to show one possible modified form of the clutch mechanism and electromagnetic clutch shifting devices disclosed in Fig. 71, and therefore, in Figs. 79, 80, and 81, I have shown such a modification as applied to control the operation of the riveting head and riveting jaws shown in Fig. 25.

In Fig. 79, a shaft 1520, corresponding with that which carries pinion 446 in Fig. 25, is provided with a pinion 446″ having the same function as the pinion 446 in said Fig. 25. Gear wheel 445″ is constantly driven, but is loose on the shaft 1520. An oscillatory shaft or rod 1521 is supported by the frame in a position parallel with the shaft 1520, and an arm 1523 loosely rotative about this shaft 1521 is oscillated from an eccentric hub 1524 of gear wheel 445″ through the connecting member 1525. The arm 1523 is provided with projecting clutch dogs 1530 and 1531 respectively, one on each side of the arm, and each adapted for engagement with counterpart clutch dogs 1533 and 1535 respectively carried by the walls of a slide 1536 which is splined to the oscillatory shaft 1521, the arrangement being such that, by shifting the slide longitudinally along shaft 1521, the clutch dogs 1533 and 1535 may be alternatively brought into the path of the dogs 1530 or 1531. The slide 1536 is actuated by a shifting lever 1538 pivoted to the frame at 1539. This lever 1538 is adapted to be moved in one direction by a spring 1540 and in the other direction by an electromagnetic device or solenoid 1542, corresponding functionally with the electromagnetic device 1420 in Fig. 71. The spring 1540 serves to retract shifting lever 1538 when the electromagnet or solenoid is deënergized.

The oscillatory shaft 1521 is provided with a fixed arm 1542 adapted to operate a single toothed clutch member 1543 through link 1544 and elbow crank 1545, whereby the clutch member 1543 may be shifted along the shaft 1520 into and out of position for engagement with a counterpart clutch member 1550, carried by the gear wheel 445''. Clutch member 1543 is splined to shaft 1520, and inasmuch as pinion 446'' rotates with this shaft, it is obvious that, when the clutch members 1543 and 1550 are in engagement, motion will be transmitted from the gear wheel 445'' to pinion 446'' in the same manner as heretofore described with reference to Fig. 25. That is to say, the mechanism disclosed in Fig. 79 accomplishes the same functions as the Fig. 71 mechanism applied to control motion transmission from the continuously revolving gear wheel 445'' to the intermittently revolving pinion 446''.

The mechanism disclosed in Fig. 79 is preferred on account of its simplicity and reliability and for the further reason that square jawed single toothed clutch members such as the members 1543 and 1550 can be operated with absolute timing exactness. In the construction shown, the clutch member 1543 is provided with a notch at 1552 in which frame projection 1553 is adapted to engage when the clutch member 1543 is retracted. This projection 1553 remains in engagement during the shifting operation until member 1543 has been moved far enough for engagement with its counterpart member 1550.

With the parts in the position in which they are illustrated in Fig. 79, it will be obvious that, if solenoid 1542 is energized, slide 1536 will be shifted to the left, thereby carrying dog 1533 into the path of dog 1530. The timing switches heretofore described will be so arranged that this movement will take place at a time when arm 1523 is raised. The succeeding downward movement of arm 1523 will thereupon transmit motion through dog 1533 to oscillate shaft 1521 in a direction to cause a shifting movement of clutch member 1543 into position for engagement with clutch member 1550. This shifting movement of clutch member 1543 will be timed to occur when the teeth on these clutch members are approximately 180 degrees apart. Therefore there will be ample time to complete the clutch shifting operation before the jaws engage. This time cannot exceed the time required for one revolution of gear wheel 445'', and with accurate timing, only a one-half revolution of this gear wheel will take place after the shifting operation before the main transmission to shaft 1520 commences. Similarly, when the solenoid 1542 is deënergized, spring 1540 will retract clutch member 1543, and this will be so timed that the notch 1552 will be in position for registry with frame projection 1553, thereby instantly stopping the rotation of shaft 1520.

*Adaptability.*

It will be understood from the foregoing description that my apparatus may include any desired number of element forming lines of travel, dependent upon the number of bars or elements to be formed and assembled, and also upon the characteristics of the elements themselves. For example, in the drawings, I have shown two lines of travel for the right hand and left hand side bar elements respectively, and only one line of travel, (a main line conveyer), for the cross bar elements, each kind of cross bar, however, being delivered to a different set of turrets for operations in correspondence with its requirements. A larger number of cross bars, or variations in their characteristics, might require the addition of conveyers, blanking presses, and turrets operating along parallel lines.

It will be further understood that, in using my apparatus for the construction of frames of different type from that illustrated, additional operating machines may be required within some or all departments, and a regrouping of the machines at the respective department stations may also be made as required. For example, the number of piercing machines shown in Fig. 16 may be multiplied by merely adding machines along the slide-way or bed in conformity to the requirements of any given frame bar. The number of active stations may be multiplied, the apparatus being provided with a sufficient number of stations to meet the maximum contemplated requirements. The same is true of all other departments, it being merely necessary to provide a line of travel of sufficient length within each department, and a main line of travel of sufficient length to allow the use of a contemplated maximum number of departments and a maximum number of stations within the departments, and to arrange the transferring mechanisms in such a manner that the materials will pass any station or department which is not being utilized in the construction of a particular type of frame.

Further, it will be observed that the transferring mechanisms illustrated are all capable of being readily adjusted in accordance with the requirements of the materials to be handled. For example, the loading mechanism shown in Figs. 16 and 18 includes a bar or rod 77 along which the magnetic supporting arms may be adjusted and increased or diminished in number, each arm being connected with the bar by means of a collar adapted to slide along the bar for the purpose of adjustment. These collars may be held in any desired position of adjustment by friction or by any other suitable means, such as an ordinary set screw. The collars may also be rotated upon the bar or rod in order to hold the magnetic supporting arms at any desired angle. Similar adjustments are possible wherever necessary or desirable in all of the transferring and loading mechanisms to meet the requirements of different types of bars or frame elements.

In Fig. 25, the riveting head, together with the upper portion of the standard, may be raised or lowered and may be adjusted to any desired angle. In Fig. 54, chain links may be substituted, whereby the supporting and positioning rests may be adapted to the requirements of any given kind of work. Similarly, the supporting and clamping members of the jigs shown in Fig. 63 may be adjusted not only by the slides 1080 heretofore described, but adjustment of the supporting clamping members may also be moved along the main reach bar 950, wherever the slide adjustments do not meet all requirements. It is obvious, in Fig. 61, that the actuating mechanisms for the side bar supporting jaws and for the clamping jaws may be adjusted both longitudinally and transversely along the bed to meet all requirements. Similar adaptability will be apparent throughout the apparatus without further description, it being, of course, understood that the dies and punches of the blanking and shaping presses will be made removable so that their dies and punches may be interchanged.

As has been hereinbefore mentioned, it will be understood that the manufacturing process disclosed herein embodying a part of my invention, may be carried out by other means and mechanisms than those illustrated, and I do not desire to be limited to the means and mechanisms shown and described.

By sub-dividing the cycle of time wherein which all of the operating parts must complete their functions, and operating in synchronism all of the mechanisms, either preparing or fabricating, and transferring or conveying, I am enabled to turn out completed automobile frames or other structural units upon a schedule which contemplates the production of a given number of finished units per minute.

I claim—

1. The combination of means for automatically blanking, piercing, shaping, and finishing sets of work elements, mechanically operated feeding devices for receiving said elements, and adapted to automatically clamp them in assembled relation, and coöperating devices for permanently connecting them with each other.

2. The combination of successively acting, automatic blank cutting, piercing, and shaping devices, means for assembling the product of said devices in sets and clamping them together in assembled relation, and means for automatically and permanently connecting the elements with each other.

3. The combination of successively acting, automatic blank cutting, piercing, and shaping devices, means for assembling the products of said devices in sets and clamping them together in the assembled relation, and means for automatically and permanently connecting the elements with each other, all in a series of simple, subdivided operations performed successively upon a given set of blanks and simultaneously upon sets of blanks in different stages of development.

4. The combination of a multiple series of groups of devices each adapted to automatically perform a simple cycle of operations which, taken with the operations performed by the devices in the other groups, are adapted to produce sets of complete structural elements ready for assembly, means for advancing material step by step along series of groups of operating devices and presenting such material to the respective groups of devices during the stopping intervals, means for assembling the completed elements in sets, and means for automatically and permanently connecting them with each other in a series of subdivided operations performed within intervals corresponding in duration with the stopping intervals of the advancing elements in the process of formation.

5. The combination with a set of blank cutters adapted to simultaneously cut sets of blanks, means for automatically advancing the blanks step by step along predetermined lines of travel leading to an initial assembly station, means for piercing, shaping, and finishing said blanks in the form of substantially complete structural elements by successive operations in the intervals between said advancing movements, means for loosely supporting said completed elements in sets at the ends of said lines of advancement, each set comprising the elements of a single structure, means for automatically supporting, positioning, and clamping said elements in assembled relation and again advancing the sets of elements step by step, and means for automatically performing element connecting operations in the intervals between such advancing movements.

6. Apparatus for forming and uniting structural elements, including the combination with a set of element forming mechanisms connected for successive timed operations upon the elements, of intermediately acting transferring devices, adapted to advance the elements from one mechanism to the next in successive stages of completion, and means for positioning the elements after each transfer for operation thereon by the mechanism to which it is presented.

7. Apparatus for making metal structures, including the combination with a series of blanking, shaping, and perforating mechanisms, rivet inserting and heading mechanisms, of means for automatically delivering element forming material in successive stages of completion from each of said mechanisms to the next, and means for positioning the elements in assembled relation and holding them in such relation during the rivet inserting and heading operations.

8. Apparatus for making metal structures, including the combination of periodically operating, automatically acting, and substantially synchronized element blanking, shaping, and perforating mechanisms, rivet inserting and heading mechanisms, alternately acting means for automatically feeding materials from one mechanism to another, and means for positioning the elements in assembled relation and holding them in such relation during the rivet inserting and heading operations.

9. Apparatus for making metal structures, including the combination of a set of blanking, piercing, shaping, and riveting mechanisms, means for continuously actuating the same in predetermined cycles of timed operations, and a set of conveying and transferring devices connecting said mechanisms and adapted to deliver material from one to another in a series of timed and synchronized movements corresponding with the retraction periods in the operating cycles of said mechanisms.

10. Apparatus for forming and uniting structural elements including the combination with a set of element forming mechanisms, of conveying mechanism, for transferring material from one forming mechanism to the next, and means for stopping the conveying mechanism with the elements in successive stages of completion, said conveying mechanism being provided with devices for holding the elements in predetermined positions for element forming operations by said mechanisms.

11. Apparatus for forming and uniting structural elements, including the combination with a set of element forming mechanisms, of conveying mechanism, provided with devices for holding material in a predetermined position thereon, loading mechanism adapted to automatically deliver material to the conveying mechanism in such position, and means for stopping the conveying mechanism successively and in predetermined positions for element forming operations.

12. Apparatus for forming and uniting structural elements, including the combination with a multiple series of element forming mechanisms, of conveying mechanisms, each adapted to present material to the element forming mechanism of an associated series, means for successively presenting the material to said mechanisms and holding it in such positions pending the forming operations, means for receiving the elements delivered by the conveying mechanisms from the respective forming mechanisms and positioning them in predetermined assembled relation to each other, and means for automatically and permanently connecting the elements so assembled.

13. Apparatus for forming and uniting structural elements, including the combination of a multiple series of element forming mechanisms, and a single series of element connecting mechanisms, and means for delivering completed elements in a succession of sets of such elements from the several series of element forming mechanisms to the receiving end of the element connecting series of mechanisms.

14. Apparatus for forming and uniting structural elements, including the combination of intermittently operating element forming and connecting mechanisms, all adapted for a cycle of operations within a standardized interval, means for conveying materials successively from one mechanism to another in a series of step by step movements substantially in alternation with the working movements of said mechanisms.

15. Apparatus for forming and uniting structural elements, including the combination of intermittently operating, element forming and connecting mechanisms, all adapted for a cycle of operations within a standardized time interval, mechanism for conveying materials in successive stages of development and presenting them successively to said mechanisms in a series of step by step movements, means controlled by the conveying mechanisms for starting the element forming and connecting mechanisms, and means controlled by the element forming and connecting mechanisms for starting the conveying mechanisms.

16. Apparatus for forming and uniting structural elements, including the combination of intermittently operating, element forming and connecting mechanisms, all adapted for a cycle of operations within a standardized time interval, mechanism for conveying materials in successive stages of development and presenting them successively to said mechanisms in a series of step by step movements, means controlled by the conveying mechanism for starting the element forming and connecting mechanisms, and means controlled by the element forming and connecting mechanisms for starting the conveying mechanisms, said controlling means being inoperative to start the conveying mechanisms until after the last element forming or connecting mechanism in the series has completed its cycle of operation.

17. Apparatus for forming and uniting structural elements, including the combination of intermittently operating, element forming and connecting mechanisms, each adapted for a cycle of operations within the same standardized time interval required by each of the other mechanisms, conveying mechanism for advancing materials successively from one mechanism to another in a series of step by step movements, continuously operating, power supplying means for driving the respective mechanisms, and means for connecting and disconnecting the power transmitting devices of the element forming and connecting mechanisms and periodically and alternately disconnecting the transmitting devices of the conveying mechanism.

18. Apparatus for forming and uniting structural elements, including the combination of intermittently operating sets of element forming mechanisms, intermittently operating groups of element connecting mechanisms, and intermittently operating conveyer mechanisms adapted to advance sets of materials successively from one set of forming mechanisms to another, additional conveying mechanisms adapted to receive materials from the first mentioned conveying mechanisms and to present them successively in assembled relation to the element connecting mechanisms, and means for operating the element forming and connecting mechanisms in alternation with the advancing movement of the conveyer mechanisms.

19. Apparatus for forming and uniting structural elements, including the combination of intermittently operating sets of element forming mechanisms, intermittently operating groups of element connecting mechanisms, and intermittently operating conveyer mechanisms adapted to advance sets of materials successively from one set of forming mechanisms to another, additional conveying mechanism adapted to receive materials from the first mentioned conveying mechanisms and to present them successively in assembled relation to the element connecting mechanisms, and means for operating the element forming and connecting mechanisms in alternation with the advancing movement of the conveyer mechanisms, including electrically controlled power transmitting connections and timing switches, each operated by one mechanism to control the operation of another.

20. Apparatus for forming and uniting structural elements, including the combination of intermittently operating, element forming, connecting, and conveying mechanisms adapted to successively form sets of elements and connect them in assembled relation, and electrically controlled means for starting each of said mechanisms and stopping the same upon completion of a predetermined cycle of operation.

21. Apparatus for forming and uniting structural elements, including the combination of intermittently operating, element forming, connecting, and conveying mechanisms adapted to successively and automatically form sets of elements and connect them in assembled relation, and electrically controlled means for starting each of said mechanisms and stopping the same upon completion of a predetermined cycle of operation, the starting means for the conveying mechanism being dependent upon the operation of the stopping means for each of the forming and connecting mechanisms.

22. Apparatus for forming and uniting structural elements, including the combination of intermittently operating, element forming, connecting, and conveying mechanisms adapted to successively form sets of elements and connect them in assembled relation, and electrically controlled means for starting each of said mechanisms and stopping the same upon completion of a predetermined cycle of operation, the starting means for the conveying mechanism being dependent upon the operation of the stopping means for each of the forming and connecting mechanisms, and the starting means for each forming and connecting mechanism being dependent upon the operation of the stopping means associated with each conveying mechanism.

23. Apparatus for forming and uniting structural elements, including automatically acting element forming, connecting, transferring mechanisms, and conveying mechanisms, means for periodically actuating the forming, connecting, and transferring mechanisms in a predetermined order, and each in a cycle of active and retractive movements, and means for actuating the conveying mechanisms in the intervals between the active movements of the transferring mechanisms, said conveying mechanisms being adapted to advance materials along series of forming and connecting mechanisms and said transferring mechanisms being adapted to deliver the materials from one conveying mechanism to another.

24. Apparatus for forming and uniting structural elements, including the combination of a set of blanking presses adapted to simultaneously and periodically cut sets of blanks from sheet metal, means for automatically converting said blanks into frame elements, an endless element conveying series of positioning jigs, each adapted to support a set of elements in a position of open assembly, an endless series of element supporting and clamping jigs, each adapted to hold the elements in fixed assembled relation, means for automatically connecting said elements with each other while held in fixed assembled relation, means for automatically delivering sets of elements from the positioning jigs to the clamping jigs, and means for automatically removing the connected elements from the clamping jigs upon completion of the connecting operations.

25. Apparatus for forming and uniting structural elements, including the combination of an endless series of positioning jigs adapted to receive elements in a position of open assembly, an endless series of element supporting and clamping jigs adapted to bind such sets of elements in fixed, assembly relation, automatic means for permanently connecting the elements with each other while in such fixed, assembled relation, and automatic means for transferring sets of elements from the positioning jigs to the clamping jigs without disturbing their assembly relation.

26. Apparatus for forming and uniting structural elements, including the combination of an endless series of supporting and clamping jigs, each adapted to hold a set of elements in assembled relation, and means for permanently connecting elements of each set with each other while held by their supporting jig in such assembled relation.

27. Apparatus for forming and uniting structural elements, including the combination of an endless series of supporting and clamping jigs, each adapted to hold a set of frame elements is assembled relation, means for automatically connecting elements of each set with each other while held by their supporting jig in such assembled relation, means for automatically advancing the jigs step by step, and means for automatically delivering sets of elements to successive jigs at one of the stopping points and removing the permanently connected elements from the jigs at another stopping point.

28. Apparatus for forming and connecting structural elements, including the combination of an endless series of supporting and clamping jigs, each adapted to hold a set of frame elements in assembled relation, means for automatically connecting elements of each set with each other while held by their supporting jig in such assembled relation, means for automatically advancing the jigs step by step, means for automatically delivering sets of elements to successive jigs at one of the stopping points and removing the permanently connected elements from the jigs at another stopping point, and automatically acting mechanism for binding the elements in assembled relation and to the jigs at the first stopping point of each jig following delivery of a set of elements thereto, and similar mechanism for releasing the elements at the stopping point next preceding the delivery point.

29. Apparatus for forming and connecting structural elements, including the combination of an endless series of supporting and clamping jigs, each having supporting jaws adapted to receive a set of frame elements in a position of open assembly and a set of clamping jaws adapted to bind the elements to their respective supporting jaws, means for actuating the jigs step by step, means for automatically delivering sets of elements to the supportnig jaws at one stage of jig advancement, automatically acting devices for subsequently actuating the clamping jaws to clamping position and then actuating some of the supporting jaws to move the elements carried thereby into engagement with the other elements in a position of final assembly, and other automatically acting means operative at other stages of jig advancement and adapted to permanently connect the elements with each other.

30. Apparatus for making metal structures, including the combination of a series of groups of blanking, piercing, shaping, and assembling mechanisms, of a series of conveyers each adapted to present frame making materials to groups of operating machines of similar character in step by step advancing movements, and automatically acting transferring mechanisms adapted to deliver the materials from one conveyer to another and reposition them upon the receiving conveyer in correspondence with the requirements of the operating machines with which that conveyer is associated.

31. The combination of a series of intermittently operating, element forming mechanisms, each adapted for a cycle of operations, mechanism for conveying materials and presenting them successively to said element forming mechanisms in a series of step by step movements, controlling devices adapted to utilize the conveying mechanism to regulate the number of cycles of operation of the other mechanisms, and means for utilizing the operating mechanisms to regulate the cycles of the conveyer mechanisms.

32. The combination of a series of groups of element forming mechanisms, each such mechanism in each group adapted for a cycle of operations, conveying mechanism for delivering material from one operating mechanism to another in each group and from one group of mechanisms to another, means controlled by the conveying mechanism for equalizing in number the operations performed by the other mechanisms, and means controlled by said other mechanisms for similarly limiting the conveyer movements.

33. The combination of a series of groups of element forming mechanisms, each such mechanism in each group adapted for a cycle of operations, conveying mechanism for delivering material from one operating mechanism to another in each group and from one group of mechanisms to another, means for controlling the operating cycles of said conveyers and of the other mechanisms, whereby all of them may be started in a predetermined order adapted to permit them to operate without interference with each other in a progressive advancement of materials from the receiving to the discharge end of the apparatus.

34. Apparatus for connecting structural elements, including an assembly jig having cross bar supporting members, and relatively movable side bar supporting members, clamping devices associated with the respective supporting members and adapted to bind the bars thereto, means for automatically advancing the jig step by step to facilitate clamping and frame bar connecting operations, means for actuating the clamping members in one stage of advancement and subsequently actuating the side bar supporting members to carry side bars thereon into assembled relation to the cross bars, and means for releasing the clamping devices after the connecting operations have been performed upon the bars.

35. Apparatus for connecting structural elements, including an assembly jig having cross bar supporting members, relatively movable side bar supporting members adapted to be actuated into bar receiving and bar assembling positions, clamping devices operatively associated with the respective supporting members, means for advancing the jig step by step, means for actuating the clamping devices to clamping position in one stage of jig advancement and subsequently actuating the side bar supports to carry the side bars into assembled relation to the cross bars, and apparatus adapted to perform connecting operations on the frame bars in another stage of jig advancement.

36. Apparatus for connecting structural elements, including an assembly jig having cross bar supporting members, in combination with relatively movable side bar supporting members adapted to be actuated into bar receiving and bar assembling positions, clamping devices operatively associated with the respective supporting members, means for advancing the jig step by step, means for actuating the clamping devices to clamping position in one stage of jig advancement and subsequently actuating the side bar supports to carry the side bars into assembled relation to the cross bars, and groups of operating tools adapted to simultaneously perform connecting operations upon the bars on both sides of the jig in other stages of jig advancement 37. Apparatus for connecting structural elements, including the combination of a frame clamping jig, means for positioning sets of cross bar members thereon, means for positioning side bar members in assembled relation to the cross bar members, and means for clamping said side bar members in fixed relation to said cross bar members when in position.

38. Apparatus for connecting structural elements, including the combination of a supporting jig adapted to receive and support sets of cross bar members thereon, side bar supporting devices, means for actuating them to carry side bars into assembled relation to the cross bar members, and means connected with the jig for holding the side bar members in said assembled relation.

39. Apparatus for connecting structural elements, including the combination of a jig provided with holding devices adapted to receive and retain cross bar and side bar elements in assembled relation, means for positioning cross bar members on said jig, and means for subsequently positioning side bar members thereon.

40. Apparatus for connecting structural elements, including the combination of a jig provided with holding devices adapted to receive and retain cross bar and side bar elements in assembled relation, and means for supporting and moving side bar members into assembled relation to the cross bar members after the latter have been placed in position upon the jig.

41. Apparatus for connecting structural elements, including the combination of an endless series of conveying devices adapted to receive successive sets of cross bar and side bar frame elements and hold them thereon in assembled relation, means for moving the side bar elements into such relation from the respective sides of the conveying devices, means for advancing the conveying devices step by step, and sets of element connecting tools adapted to engage the elements from the respective sides of the conveying devices, at some of the stopping points.

42. Apparatus for connecting structural elements, including the combination of an endless series of conveying devices adapted to receive successive sets of cross bar and side bar frame elements and hold them thereon in assembled relation, means for moving the side bar elements into such relation from the respective sides of the conveying devices, means for advancing the conveying devices step by step, and sets of element connecting tools adapted to engage the elements from the respective sides of the conveying devices, at some of the stopping points, said tools being differently grouped at the respecting stopping points and adapted to operate upon different portions of the presented elements.

43. Frame making apparatus, including the combination of means for simultaneously cutting sets of frame bar blanks from sheet metal strips, mechanism for advancing said blanks step by step along predetermined paths leading to an initial assembly station, means for piercing, shaping, and finishing said blanks in sets of frame elements in the intervals between said advancing movements, mechanism for successively receiving, supporting, positioning and clamping sets of said elements in assembled relation, and again advancing them step by step, and automatically acting, element connecting devices adapted to operate upon the assembled elements in the intervals between such step by step advancing movements, all of said devices being arranged and adapted to perform the required blanking, piercing, shaping, finishing, clamping, and connecting operations simultaneously upon successive sets of elements.

44. Frame making apparatus, including the combination of sets of blanking, piercing, and shaping devices arranged in multiple series, and a single series of element connecting devices, means for automatically advancing blanks from the blanking devices and presenting them successively to the piercing and shaping devices to form frame elements, and means for assembling said frame elements and automatically presenting them in step by step advancing movements to the element connecting devices, all of said devices being adapted for operation in substantially the same time as that required for said blanking operations.

45. Frame making apparatus, including the combination of means for holding frame elements in assembled relation, element connecting devices arranged in groups and differently arranged within each group, means for advancing the assembled frame elements and presenting them to the respective groups of connecting devices successively in positions for a simultaneous operation upon the presented elements by all of the connecting devices of the group to which they are presented.

46. Frame making apparatus, including the combination of means for holding frame elements in assembled relation, groups of element connecting devices each adapted to perform a simple operation upon the frame elements within a predetermined time limit substantially equal to that required for each of the other operations necessary to connect such elements, and means for advancing the elements while holding them in the assembled relation and presenting them successively to the respective groups of element connecting devices.

47. Frame making apparatus, including the combination of means for holding frame elements in assembled relation, groups of element connecting devices each adapted to perform a simple operation upon the frame elements within a predetermined time limit substantially equal to that required for each of the other operations necessary to connect such elements, means for advancing the elements while holding them in the assembled relation and presenting them successively to the respective groups of element connecting devices, and means operatively connected with the element advancing and connecting devices for automatically maintaining an alternate operation thereof.

48. Frame making apparatus, including the combination of means for holding frame elements in assembled relation, actuating mechanism adapted to advance the elements step by step while held in such relation, and groups of automatically acting, intermittently operating, element connecting devices arranged with those in the respective groups in positions for operation upon the elements at the several stopping points along the line of advancement.

49. Frame making apparatus, including the combination of means for holding frame elements in assembled relation, actuating mechanism adapted to advance the elements step by step while held in such relation, and groups of automatically acting, intermittently operating, element connecting devices arranged with those in the respective groups in positions for operation upon the elements at the several stopping points along the line of advancement, the elements in one group being differently positioned from those in other groups, whereby operations may be performed at the different stopping points in different and closely adjacent portions of the frame.

50. Frame making apparatus, including the combination of means for holding frame elements in assembled relation and automatically advancing them step by step while in such relation, element connecting devices located on opposite sides of the line of advancement and arranged with some of said devices at each stopping point positioned for simultaneous operation upon the elements.

51. Frame making apparatus, including the combination of means for holding frame elements in assembled relation and automatically advancing them step by step while in such relation, element connecting devices located on opposite sides of the line of advancement and arranged with some of said devices at each stopping point positioned for simultaneous operation upon the elements, each of said connecting devices being adapted to automatically move into and out of position for operation upon the elements during the intervals between said advancing movements.

52. Frame making apparatus, including the combination of means for holding frame elements in assembled relation, means for advancing said elements step by step while in such relation and accurately positioning them at each stopping point, rivet inserting devices at one of the stopping points, rivet heading devices at succeeding points, and means for automatically operating all of the rivet inserting and rivet heading devices simultaneously during each stopping interval, whereby connecting operations may be performed upon successive sets of frame elements at the different stopping points.

53. Frame making apparatus, including the combination of means for holding frame elements in assembled relation, means for advancing said elements step by step while in such relation and accurately positioning them at each stopping point, rivet inserting devices at one of the stopping points, rivet heading devices at succeeding points, and means for automatically operating all of the rivet inserting and rivet heading devices simultaneously during each stopping interval, whereby connecting operations may be performed upon successive sets of frame elements at the different stopping points, each of said rivet heading devices being adapted to perform a single rivet, heading operation and said devices being differently grouped at the respective stopping points to permit them to operate upon the presented elements without interference with each other.

54. Frame making apparatus, including the combination of means for holding frame elements in assembled relation, and a group of rivet inserting devices adapted to simultaneously connect all of the elements with each other by the insertion of rivets through registering holes in the interlapping portions of such elements.

55. Frame making apparatus, including the combination of means for automatically positioning and clamping frame elements in assembled relation, and riveting devices adapted to automatically connect said elements with each other after the clamping operation has been performed.

56. Frame making apparatus, including the combination of means for automatically supporting, positioning, and clamping frame elements in assembled relation and advancing them step by step while in such relation, doweling devices adapted to accurately position the element supports at each stopping point, and automatically acting drilling, rivet inserting, and rivet heading devices grouped at the respective stopping points for independent simultaneous operation upon the elements during each stopping interval.

57. Frame making apparatus, including the combination of means for automatically supporting, positioning, and clamping frame elements in assembled relation and advancing them step by step while in such relation, doweling devices adapted to accurately position the element supports at each stopping point, and automatically acting drilling, rivet inserting, and rivet heading devices grouped at the respective stopping points for independent, simultaneous operation upon the elements during each stopping interval, each of said drilling, rivet inserting, and rivet heading devices being adapted for operation during each stopping interval in substantially the same time as that required for the operation of each of the other devices.

58. Frame making apparatus, including the combination of means for automatically supporting, positioning, and clamping frame elements in assembled relation and advancing them step by step while in such relation, doweling devices adapted to accurately position the element supports at each stopping point, and automatically acting drilling, rivet inserting, and rivet heading devices grouped at the respective stopping points for independent, simultaneous operation upon the elements during each stopping interval, each of said drilling, rivet inserting, and rivet heading devices being adapted for operation during each stopping interval in substantially the same time as that required for the operation of each of the other devices, and the rivet heading devices being differently grouped at successive stopping points and so positioned that all of them may be simultaneously operated, each without interference with any other.

59. Frame making apparatus, including the combination of means for holding sets of frame elements in assembled relation, means for advancing said sets step by step, groups of automatically acting devices adapted to perform element connecting operations in the respective stages of said step by step advancing movement and in the intervals between advancing movements, and means for automatically forming sets of frame elements and presenting one set of such elements ready for assembly during each of said element advancing intervals.

60. Frame making apparatus, including the combination of a set of assembly jigs adapted to support, position, and clamp frame elements in assembled relation, means for advancing said jigs successively in step by step movements, means for forming sets of frame elements and delivering one set of such elements to one of the jigs in each interval between jig advancing movements, and groups of element connecting devices arranged with those in each group adapted for separate and simultaneous operation upon a set of elements in one stage of jig advancement.

61. Frame making apparatus, including the combination of a set of assembly jigs adapted to support, position, and clamp frame elements in assembled relation, means for advancing said jigs successively in step by step movements, means for forming sets of frame elements and delivering one set of such elements to one of the jigs in each interval between jig advancing movements, and groups of element connecting devices arranged with those in each group adapted for separate and simultaneous operation upon a set of elements in one stage of jig advancement, each of said element connecting devices being adapted to perform its functions in substantially the same time as that required for the simplest operation in the series, and the number of jig stopping points and groups of connecting devices being multiplied sufficiently to permit all of said devices to operate simultaneously at successive stopping points without interference with each other for the completion of all the required connecting operations.

62. Frame making apparatus, including the combination of means for advancing sets of blanks step by step along a predetermined line of travel, means for positioning the blanks in the intervals between the step by step advancing movements, groups of operating mechanisms at the blank stopping and positioning stations adapted to automatically and separately perform simple operations upon the blanks during the respective stopping intervals, whereby the blanks are progressively made ready for assembly at the successive stations in the series, a series of assembly jigs each adapted to receive and hold a set of completed frame elements in assembled relation, means for advancing the jigs step by step, and means for automatically connecting the frame elements with each other in a series of subdivided operations performed in the intervals between jig advancing movements.

63. The combination with automatic frame assembling and connecting mechanisms, of sets of blanking, piercing, and shaping presses adapted to form sets of frame elements ready for assembly, and means for synchronizing the operation of the presses with that of the frame assembling and connecting mechanisms in such a manner as to deliver sets of elements to the latter at intervals equal to those required for the assembling and connecting operations.

64. The combination with automatic frame assembling and connecting mechanisms, of sets of blanking, piercing, and shaping presses adapted to progressively form sets of elements ready for the assembling and connecting operations, means for automatically advancing material from one press to another in each set, and means for synchronizing the operations of all of the presses of the assembling and connecting mechanisms in such a manner as to deliver sets of completed elements at intervals substantially equal to those required for the assembling and connecting operations.

65. Synchronizing mechanism for intermittently acting metal working and work advancing apparatus, including the combination with a set of operating mechanisms, power transmitting connections for separately actuating said mechanisms each in a definite cycle which includes a single working operation, conveying devices adapted to deliver materials from one operating mechanism to another, power transmitting connections therefor, and means for controlling the power transmitting connections, adapted to make the operation of all conveying devices dependent upon completion of all working operations, and all working operations dependent upon completion of all conveying movements.

66. Step by step work forming and conveying apparatus, including the combination with a set of operating mechanisms, of conveying devices adapted to deliver materials from one operating mechanism to another, means for utilizing each operating mechanism to control the movements of all of said conveying devices, and means for utilizing each conveying device to control the movements of all the operating mechanisms.

67. Synchronizing mechanism for step by step apparatus, including the combination with a set of operating mechanisms, power transmitting connections for separately actuating said mechanisms each in a definite cycle including a single working operation, conveying devices adapted to deliver materials from one of said mechanisms to another, power transmitting connections therefor, and means for controlling the power transmitting connections, to actuate all of the operating mechanisms for a single cycle, and to then actuate all of the conveying devices, each for a single work advancing movement preparatory to a succeeding working cycle and after the last operating mechanism has completed its preceding working cycle.

68. Apparatus for automatically and repeatedly forming and connecting work elements in a continuous succession of subdivided operations, including the combination of a series of operating mechanisms, each having a definite cycle, conveying devices adapted to advance materials from one of said mechanisms to another, means for starting said operating mechanisms simultaneously, means for stopping each such mechanism upon completion of its cycle, means for starting the conveying devices upon completion of the cycle of the last operating mechanism, and means for again simultaneously starting all of the operating mechanisms simultaneously upon completion of the last conveying movement.

69. Means for controlling and synchronizing the operation of element forming, assembling, and connecting mechanisms and work advancing mechanisms, including the combination with such mechanisms, of power transmitting connections, means controlled by each mechanism for disconnecting its power transmitting connection upon completion of a single operation, means controlled by each work advancing mechanism for starting the operating mechanism to which it delivers work, and means controlled by each operating mechanism for starting the work advancing mechanism to which it delivers work.

70. Means for controlling and synchronizing the operation of element forming, assembling, and connecting mechanisms and work advancing mechanisms, including the combination with such mechanisms, of power transmitting connections, means controlled by each mechanism for disconnecting its power transmitting connection upon completion of a single operation, means controlled by each work advancing mechanism for starting the operating mechanism to which it delivers work, and means controlled by each operating mechanism for starting the work advancing mechanism to which it delivers work, together with means controlled by one of the operating mechanisms and one of the work advancing mechanisms for timing all the other operations in the series.

71. Apparatus for forming and connecting structural elements, including a series of working stations, each adapted to support operating mechanisms in variously grouped relation and in variable numbers, and conveying mechanism adapted to advance work elements from one station to another and to successively present them to the grouped operating mechanisms at such stations.

72. Apparatus for forming and connecting structural elements, including a series of working stations, each adapted to support operating mechanisms in variously grouped relation and in variable numbers, and conveying mechanisms adapted to advance work elements from one station to another and to successively present them to the grouped operating mechanisms at such stations, said conveying mechanism having adjustable work supporting and clamping devices adaptable to the requirements of work elements of differing character.

73. Apparatus for forming and connecting structural elements, including a series of working stations, operating mechanisms adjustable and interchangeable at the respective stations, conveying devices provided with adjustable work element supporting and clamping devices, and adjustable transferring devices adapted to deliver work elements from one conveying device to another; said conveying devices being adapted to successively advance and present work elements to the operating machines at associated working stations.

74. The combination of means for automatically blanking, piercing, shaping, and finishing sets of elements, with supporting devices for the elements adapted to receive them in a position of assembly, automatically acting devices adapted to clamp and hold such elements together in assembled relation, and power driven means for permanently uniting the said elements while so clamped and held.

75. The combination of means for producing sets of completed elements, with devices for presenting the elements in a position of assembly, devices for clamping the elements in assembled relation, and means for permanently connecting the elements into a rigid structure, while so clamped.

76. Apparatus for manufacturing automobile or other frames from pressed steel frame elements, the said apparatus comprising means for producing sets of frame elements, in combination with automatically operated means for clamping the said frame elements in assembled relation, and means for permanently connecting the said frame elements together while so clamped, to constitute a unitary structure.

77. Frame making apparatus, comprising separate lines of mechanisms, each such line being composed of machines adapted for successive operations upon frame element forming materials to progressively perfect the latter and deliver the completed frame elements at a point of assembly, means for clamping the assembled frame elements in proper relation to each other, and means for permanently uniting the said frame elements while so clamped to constitute a unitary and rigid structure.

78. Apparatus for progressively producing duplicate sets of elements for assembling into structural units of like design, the said apparatus comprising mechanisms arranged and adapted for the progressive treatment to completed form of element forming materials to prepare them for assembly, and means for operating each of the said mechanisms cyclically in brief periods for development of a set of elements through a succession of said periods and delivery of a set of completed elements in each said cyclic period.

79. The combination of preparing mechanisms for severally doing work on the respective elements of a set of elements to complete them for fabrication, and means for operating the said mechanism cyclically for brief periods to accomplish the production of a set of elements in each period; fabricating devices for effecting positive connection of the elements a set, and means for operating the said devices cyclically in brief periods corresponding with the operating periods of the said mechanisms; with means for conveying the said elements from the said mechanisms to the said devices in the intervals of the cyclic operation of said mechanisms and devices, thereby to accomplish the production of a complete structural unit in each cyclic period.

80. Frame making apparatus, comprising separate lines of mechanisms, each line of such mechanisms being composed of independently operable machines for successively and progressively acting upon frame element materials and delivering the latter when completed to a point of assembly, and means for permanently connecting the assembled frame elements, to constitute a unitary and rigid structure.

81. The method of forming frames, consisting in clamping sets of frame elements to sets of supporting members, with the elements in a position of open assembly, moving some of said supports in a direction to carry their elements into assembled relation to the other elements, holding the elements in assembled relation, and advancing them in synchronized advancing and stopping intervals, and connecting the elements with each other during the stopping intervals.

82. The method of forming frames, consisting in conveying a series of assembled frame elements in timed step-by-step advancing movements, and subjecting the elements to like connecting operations at different stopping points, and at different points on the elements, whereby the connecting operations may be subdivided into a series of simple unitary operations, each capable of being performed during a short stopping interval of definite duration, substantially equal to the time required for each and all of the connecting operations to be performed.

83. The method of forming frames, consisting in successively assembling sets of frame elements and holding them in assembled relation, advancing said sets of assembled elements in a series, and in step-by-step movements, holding all of the advancing sets in position for connecting operations during and in the intervals between said step movements, and simultaneously operating groups of rivet inserting and rivet heading tools at the various stopping points, for rivet inserting and rivet heading operations upon the respective elements.

84. The method of forming frames consisting of clamping frame elements in assembled relation, moving them in timed step-by-step advancing and stopping intervals, and progressively uniting the frame elements at their meeting points during the stopping intervals while the same are clamped together.

85. The method of forming frames, consisting in advancing frame element carriers in a continuous series, and performing frame clamping operations, rivet inserting operations, and rivet heading operations upon the elements conveyed by the carriers, successively as to each set of frame elements, and simultaneously as to successive sets of such elements in the series.

86. The method of forming frames, consisting in successively assembling sets of apertured frame members and temporarily clamping them in assembled relations, advancing said assembled elements step by step while thus clamped and securing them in predetermined fixed positions in the intervals between the step by step movements, simultaneously moving sets of rivet inserting and rivet heading devices into working position with reference to said sets of frame elements in each of said predetermined fixed positions, simultaneously actuating all of said devices, for rivet inserting and rivet heading operations and subsequently retracting said devices pending another advancement of the successive sets of assembled elements.

87. The method of forming frames, consisting in separately mounting the elements upon supporting carrier members, doweling and clamping the elements in predetermined positions on the carrier members, moving the elements into assembled relation while clamped and doweled upon the carrier members, advancing the carrier members step by step and securing them in predetermined fixed positions in the intervals between their step by step movements, and performing connecting operations upon said elements in each of the intervals between said step by step movements.

88. The method of forming frames, consisting in separately mounting frame elements upon supporting carrier members, doweling and clamping the elements in predetermined positions on the carrier members, moving the elements into assembled relation and holding them therein while clamped and doweled upon the carrier members, advancing the carrier members step by step and securing them in predetermined fixed positions in the intervals between their step by step movements, moving groups of element connecting devices into position for simultaneous operation upon the elements in each of said predetermined fixed positions, actuating said devices for element connecting operations, and then retracting them preparatory to the next advancing movement of the carrier members.

89. A method of assembly, consisting in temporarily securing sets of elements in assembled relation, and advancing the sets step-by-step while thus secured, inserting connecting rivets and anchoring them in position in the elements of advanced sets, and heading the rivets of additionally advanced sets.

90. A method of assembly, consisting in temporarily binding sets of elements in assembled relations and advancing the sets successively in a continuous series while thus bound, inserting connecting members in the advanced sets of assembled elements, and subsequently securing the connections after the elements have been farther advanced, and then releasing the elements from the temporary binding.

91. A method of assembly, consisting in utilizing mechanical supporting and guiding devices to temporarily bind sets of elements in assembled relation with mechanical accuracy, advancing the sets of mechanically supported elements while held in accurately assembled relation, and progressively permanently connecting said elements in different stages of advancement.

92. A method of assembly, consisting in temporarily securing elements together, advancing the assembled sets of elements in a series of regularly spaced sets, while thus secured, and subjecting them to successive sets of like operations, at different points.

93. A method of assembly, consisting in clamping sets of elements to supporting members and to each other in assembled relation, advancing the sets of clamped elements step-by-step in a regular series of spaced sets, subjecting the elements of each set to a series of like operations simultaneously performed at the same stopping point, and to another series of such operations in different portions of the elements at another stopping point, and then subjecting them to different sets of operations, the first of said operations preparing the elements for connection, and the succeeding operations progressively connecting them in permanent assembly, and subsequently releasing the connected elements from their supports.

94. The method of forming frames, consisting of clamping frame elements in assembled relation in supporting carriers, moving the carriers in timed step-by-step advancing and stopping intervals while thus clamped, and permanently uniting the assembled frame elements during the stopping intervals.

95. The method of forming frames, consisting of clamping sets of frame elements in assembled relation in movable supporting carriers, advancing the carriers to bring the assembled frame elements while thus clamped to a position of rest at the point where the said elements are to be united, and permanently uniting the assembled frame elements while in such position of rest.

96. A method of assembly, consisting in clamping sets of elements to supporting members in predetermined positions, moving said members in a direction to carry the elements into full assembly position, automatically advancing the assembled sets of elements, and subjecting them to successive sets of like operations, at different points, and to successive sets of different operations at the same points, while said elements are clamped to the supporting members held thereby in assembled relation.

97. A method of fabricating automobile frames, which consists in assembling frame elements in sets, temporarily securing in assembled relation the elements of each set, advancing the assembled sets of elements in a regular succession of sets while thus secured, and subjecting the sets of assembled elements in the advancing succession of sets to progressive connecting operations performed at different points upon the set of elements and at different points in the line of advance, to permanently unite the elements of each set into a rigid and unitary structure.

98. The process of making fixed structural units, which consists in conveying materials along separate lines of travel, automatically blanking structural elements from such materials and converting the said element blanks into elements of completed form, all in a series of sub-divided operations performed upon the said materials at successive stages of its advancing movement, automatically clamping the finished elements in assembled relations, and progressively uniting the assembled elements into a permanent structure during the continued advancing movement thereof.

99. The process of constructing vehicle frames, consisting in separately forming side bar blanks and cross bar blanks, automatically feeding the respective blanks along separate lines of travel and perforating, shaping and completing them as frame elements at successive stages of their movement along such lines, delivering them from their respective lines of travel to a common point of assembly, assembling the frame elements, clamping them in assembled relation, advancing them along a single line of travel and permanently uniting them during successive stages of said last mentioned movements.

100. The process of making automobile frames, consisting of conveying material along a line of travel, automatically blanking, piercing and shaping the elements of such frames each in a series of sub-divided operations performed on said material at successive stages of its advancing movement, assembling the completed elements, automatically clamping them in assembled relation, and again advancing them and progressively uniting them in permanent assembly.

101. The process of making automobile frames, which consists in automatically blanking structural elements and converting the said element blanks into completed frame elements, all in a series of sub-divided operations performed synchronously in a time cycle of brief duration, feeding the element forming materials for progressive preparation in the intervals of the said cycles of operation, assembling the finished elements, and permanently uniting them by connecting operations performed in the same time cycles.

102. The process of making automobile frames, which consists in progressively preparing a set of completed frame elements by a series of sub-divided operations performed in sequence in time cycles of brief periodicity, assembling the completed elements in the relative positions which they occupy in the finished structure, and progressively fabricating the said elements into a permanent structure by a series of sub-divided connecting operations performed in the same time cycles.

103. The process of making automobile frames, which comprises the steps of blanking structural elements, progressively perforating, shaping, and finishing the element blanks to constitute completed frame elements, clamping the completed elements in the respective positions which they occupy in the product, inserting connecting rivets in the perforations formed in the elements, and heading the rivets to unite the elements into a permanent and rigid structure,—such steps consisting of a series of sub-divided synchronous operations automatically performed in sequence in brief time cycles of substantially equal duration,—and conveying the material operated upon in step-by-step feeding movement in the intervals of the preparing, clamping, and fabricating operations, to permit the successive performance of the said operations.

104. The process of progressively preparing duplicate sets of elements for assembling into structural units of like design, which consists of conveying material along lines of travel, automatically blanking, piercing, shaping and finishing such material as completed elements in a series of sub-divided operations performed at successive stages of its advancing movement, all of such operations being synchronously performed in a time cycle of brief periodicity, whereby a set of elements is completed and delivered in assembled relation in each said time cycle.

105. The process of progressively preparing duplicate sets of elements for assembling into structural units of like design, which consists of conveying material along converging lines of travel, automatically blanking, piercing, shaping, and finishing such material as completed elements in a series of sub-divided operations performed at successive stages of its advancing movement, all of such operations being synchronously performed in a time cycle of brief periodicity, whereby a complete set of elements is produced and delivered in assembled relation in each said time cycle.

106. The process of joining structural elements, consisting in providing said elements with perforations, assembling the elements and utilizing some of said perforations for doweling or positioning said elements in correct assembly relation to each other with other perforations at the juncture of the elements in alinement, inserting rivets in said alined perforations, and spreading the rivets to unite the elements into a permanent structural unit.

107. The process of progressively uniting elements into a permanent structural unit, which consists in providing said elements with perforations, assembling the elements and clamping them in correct assembly relation to each other with the perforations at the juncture of the elements in alinement, inserting rivets in the said perforations, and spreading the rivets to connect the elements; the clamping, rivet inserting, and rivet spreading operations being performed automatically in brief time cycles in the intervals of which the clamped elements are moved step-by-step to permit the succession of operations described.

108. The process of making frames, which process consists in sub-dividing the work to be performed in the manufacture of such frames into a series of simple operations to be performed in succession on the frame elements, each operation requiring substantially the same time interval for its performance; advancing the frame elements in step-by-step movements, and performing said sub-divided operations simultaneously upon like elements in the successive stages of advancement of the said elements.

109. In a metal working machine, the combination with a set of tools adapted to operate upon work in different stages of development, separate carriers adapted to act successively to present the work to different tools in different stages of work development, and means for mechanically transferring the work from one carrier to another, whereby the several carriers and tools may perform their functions continuously.

110. Apparatus for preparing a set of elements for assembly into a fixed structural unit, such apparatus comprising separate lines of intermittingly operating mechanisms, each line of such mechanisms being composed of machines adapted for progressive treatment of element material to prepare it for assembly, and means for operating all of the said machines cyclically for a brief period for the production of a set of elements through a succession of such periods of cyclic operation and the delivery of a set of elements in assembled relation during each said cyclic period.

111. Frame making apparatus, comprising separate lines of mechanisms, each line of such mechanisms being composed of machines for successively acting upon frame element material to prepare it for assembly, means for intermittingly actuating each of said machines in a time cycle for brief duration common to all of such machines for the progressive preparation of a set of elements through a succession of such cyclic operations and the delivery of a set of completed elements in assembled relation in each said time cycle, and means for permanently connecting the assembled elements to constitute a unitary and rigid structure.

112. Frame making apparatus, comprising separate lines of mechanisms, each line of such mechanisms being composed of machines for successively acting upon frame element material to prepare and deliver the latter at a point of assembly, means for intermittingly actuating each of said machines in a time cycle of brief duration common to all of such machines for the progressive preparation of a set of elements through a succession of such cyclic operations and the delivery of a set of completed elements in assembled relation in each said time cycle, means for clamping the frame elements in assembled relation, and means for permanently connecting the assembled elements to constitute a unitary and rigid structure.

113. Frame making apparatus, comprising separate lines of mechanisms, each line of such mechanisms being composed of machines for successively acting upon frame element material to prepare and deliver the latter at a point of assembly, means for intermittingly actuating each of said machines in a time cycle of brief duration common to all such machines for the progressive preparation of a set of elements through a succession of such cyclic operations and the delivery of a set of completed elements in each said time cycle, and means for permanently connecting the assembled elements to constitute a unitary and rigid structure, said connecting means operating in the time cycle of the preparing means.

114. The combination of element preparing mechanisms, all operative cyclically during a brief period to complete elements progressively by successive cyclic operations, one set of elements in each period of such operation; with element fabricating devices, each operative cyclically in the same brief periods for progressive fabrication of the elements to completion of a fixed structural unit in each period of operation, and means for operating said mechanisms and devices.

115. The combination of element preparing mechanisms, all operative cyclically during a brief period to complete elements progressively by successive cyclic operations, one set of elements in each such period; with element fabricating devices, each operative cyclically in the same brief periods for progressive fabrication of the elements to completion of a fixed structural unit in each period of operation, means for operating said mechanisms and devices, and means for transferring the elements from the preparing mechanisms to the fabricating devices.

116. The combination with element fabricating devices each operated cyclically in brief periodicity for progressive fabrication of the elements to completion of a unit per operating period; sets of element preparing mechanisms, the mechanism of each set cyclically operative in brief periodicity, to produce complete elements progressively, a set per operating period; means for operating said devices and mechanisms; and means automatically operating in the intervals of the cyclic movements described for transferring each set of elements from said preparing mechanisms to said fabricating devices.

117. Apparatus for progressively producing a plurality of fixed structural units of like design, comprising mechanisms for progressively treating and forming element material to complete them for assembly in a unit structure, each of said mechanisms operating cyclically in brief periods for development of a set of elements in each cyclic period, and means for permanently connecting each set of elements to form a unitary structure, said connecting means operating in consonance with said mechanisms to deliver a completed structural unit in each cyclic period.

118. Apparatus for progressively producing a plurality of fixed structural units of like design, comprising mechanisms for progressively treating and forming element materials to complete them for assembly in a unit structure, each of said mechanisms operating cyclically in brief periods for development of a set of elements in each cyclic period, and coöperating means for permanently connecting each set of elements to form a unitary structure.

119. Apparatus for progressively producing a plurality of fixed structural units of like design, comprising mechanisms for progressively treating and forming element materials to complete them for assembly in a unit structure, each of said mechanisms operating cyclically in brief periods for development of a set of elements in each cyclic period, means for clamping the elements in assembled position, and means for permanently connecting each set of elements to form a unitary structure, said connecting means operating in consonance with said mechanisms to deliver a completed structural unit in each cyclic period.

120. Apparatus for progressively producing a plurality of fixed structural units of like design, comprising mechanisms for progressively treating and forming element materials to complete them for assembly in a unit structure, each of said mechanisms operating cyclically in brief periods for development of a set of elements in each cyclic period, coöperating means for permanently connecting each set of elements to form a unitary structure, said connecting means operating in consonance with said mechanisms to deliver a completed structural unit in each cyclic period, and means for advancing the element materials in different stages of completion from mechanism to mechanism and to the connecting means for the successive operations described.

121. In an apparatus for producing structural units from assembled sets of elements, an assembling mechanism comprising movable side and cross bar supporting members, means for clamping the bars upon their supporting members, and means for actuating the supporting members to bring the bars into assembled relation.

122. In an apparatus for producing structural units from assembled sets of elements, an assembling mechanism comprising devices for holding the said sets of elements in a position of open assembly, and means for moving the said sets of elements into positions of complete assembled relation.

123. In an apparatus for producing structural units from assembled sets of elements, an assembling mechanism comprising devices movable into positions to receive the said sets of elements and thereafter into positions to bring the said sets of elements into assembled relation, and means for operating the said devices as described.

124. In an apparatus for producing structural units from assembled sets of elements, an assembling mechanism comprising movable devices for receiving the set of elements in a position of open assembly, clamping means upon the said devices adapted to hold the several elements of each set in their respective positions of assembly, and means for actuating the said receiving devices to carry the clamped elements into a position of complete assembly.

125. In an apparatus for producing structural units from assembled sets of elements, an assembling mechanism comprising devices movable to receive and clamp a set of elements, and means for actuating the said devices to bring the elements into assembled positions, in combination with means to connect the set of clamped elements into a permanent and fixed structural unit.

126. In an apparatus for assembling and connecting a set of elements into a fixed structural unit, movable devices adapted to assemble a set of elements, and means for actuating the said movable devices to bring the elements into a position of assembly, in combination with means for progressively uniting the said elements by successive connecting operations performed thereon.

127. In an apparatus for automatically assembling and uniting a set of elements into a fixed structural unit, movable devices operating cyclically in brief periods upon the respective elements to bring the latter into assembly position, and means for so actuating the said devices, in combination with means operating cyclically in brief periods for progressively uniting the said elements through a succession of connecting operations performed thereon at different points.

128. A frame making apparatus, comprising means for clamping the frame elements in assembled relation and automatically advancing them step by step while so clamped, and connecting devices arranged adjacent the line of movement of the clamping means and adapted to perform connecting operations upon the clamped frame elements in the intervals of the advancing movement of the said means.

129. Means for clamping frame elements in assembled relation and automatically advancing them step by step while so clamped, in combination with connecting devices at each side of the line of movement of the clamping means, and means for simultaneously actuating the connecting devices in the intervals of the advancing movement of the clamping means to perform connecting operations upon the clamped frame elements at each side of the frame.

130. Apparatus for preparing a set of elements for assembly into a structural unit, such apparatus comprising sets of mechanisms, each of which sets of mechanisms is arranged and adapted for reception of element forming material and progressive treatment thereof to completion to prepare it for assembly, and means for operating each of said mechanisms cyclically with brief periodicity for development of a set of elements through a succession of said periods and delivery of a set of said elements in assembled relation in each cyclic period.

131. In an installation for making structural units, the combination of mechanisms for severally doing work on the respective elements of a set to prepare and assemble them for fabrication; means for operating said mechanisms cyclically in brief periods to accomplish the completion of a set of elements at each said period; fabricating devices for effecting positive connection of the elements of a set; and means for operating said devices cyclically in brief periods corresponding with the periods of the first said mechanisms, thereby to accomplish production of a complete structural unit per period.

132. In an installation for making structural units, the combination of a plurality of groups of mechanisms, each group for working on a respective element of a set to prepare and assemble said elements for fabrication and the several mechanisms of each group arranged for successive operation on such element; means for operating each said mechanisms cyclically in brief periodicity to accomplish progressive development of each element over a plurality of such periods and production of a set of completed elements per period; a group of fabricating devices for effecting positive connection of the elements of a set by sequentially operating each said device cyclically in brief periodicity corresponding with that of the first said mechanisms, thereby to accomplish production of a complete structural unit per period.

133. In an installation for making structural units, the combination of groups of automatically and successively acting mechanisms, each group for respectively working on an element of a set to effect completion thereof; means appurtenant to each said group of mechanism for presenting the respective element to said mechanisms successively, means for operating each said mechanism cyclically in brief periodicity; a group of fabricating devices arranged for successive operation on an element set; means for presenting an assembled element set to said devices successively; and means for operating each of said devices cyclically in periodicity corresponding to that of the first said mechanisms, all to accomplish production of a complete structural unit per period.

134. The combination with element fabricating devices each operated cyclically in brief periodicity for progressive fabrication of the elements of a set to completion of a unit per period; sets of element preparing mechanisms, the mechanisms of each set cyclically operative in brief periodicity, to complete said elements progressively and assemble them, a set per period; and means for so operating said devices and mechanisms.

135. The combination with element fabricating devices each operated cyclically in brief periodicity for progressive fabrication of the elements to completion of a unit per period; sets of element preparing mechanisms, the mechanisms of each set cyclically operative in brief periodicity, to complete said elements progressively a set per period; means for operating said devices and mechanisms, and means for transferring each set of elements from said preparing mechanisms to said fabricating devices.

In testimony whereof I affix my signature in the presence of two witnesses.

REUBEN STANLEY SMITH.

Witnesses:
WALTER E. SMITH,
HERBERT FRESTON.